US012646636B2

(12) United States Patent
Galligan et al.

(10) Patent No.: US 12,646,636 B2
(45) Date of Patent: Jun. 2, 2026

(54) HIGH-CURRENT FLEXIBLE CONDUCTIVE CIRCUITS WITH CONNECTORS

(71) Applicant: CelLink Corporation, San Carlos, CA (US)

(72) Inventors: Lewis Richard Galligan, Novi, MI (US); Andrew Fisher, Ortonville, MI (US); Kevin Coakley, Belmont, CA (US); Muthu Sebastian, Mountain View, CA (US); Jean-Paul Ortiz, White Lake, MI (US); Arturo Cantu-Chavez, Pflugerville, TX (US); Mark Terlaak, Howell, MI (US); Will Findlay, San Carlos, CA (US); Gary Cook, San Carlos, CA (US); James Jeon, San Carlos, CA (US); Mohammad Rizwanullah, San Carlos, CA (US)

(73) Assignee: CelLink Corporation, San Carlos, CA (US)

( * ) Notice: Subject to any disclaimer, the term of this patent is extended or adjusted under 35 U.S.C. 154(b) by 0 days.

(21) Appl. No.: 19/356,470

(22) Filed: Oct. 13, 2025

(65) Prior Publication Data

US 2026/0106053 A1 Apr. 16, 2026

Related U.S. Application Data

(60) Provisional application No. 63/768,736, filed on Mar. 7, 2025, provisional application No. 63/756,860, filed (Continued)

(51) Int. Cl.

*H01B 7/08* (2006.01)
*H01B 3/30* (2006.01)

(Continued)

(52) U.S. Cl.

CPC ........... *H01B 7/0861* (2013.01); *H01B 3/307* (2013.01); *H01B 7/04* (2013.01); *H01B 7/0807* (2013.01); *H01B 7/28* (2013.01)

(58) Field of Classification Search

CPC ................................ H01B 7/0861; H01B 7/04

See application file for complete search history.

(56) References Cited

U.S. PATENT DOCUMENTS 3,750,278 A 8/1973 Baker et al.
4,818,840 A 4/1989 Booth et al.

(Continued)

FOREIGN PATENT DOCUMENTS

CN 203715762 U 7/2014
EP 3496180 A1 6/2019

(Continued)

OTHER PUBLICATIONS

"Products: Contacting Solutions for Printed Circuit Boards", Wurth Elektronik ICS GmbH & Co. KG, 2025; Retrieved on Sep. 30, 2025 at https://www.powerelement.com/en/products.

(Continued)

*Primary Examiner* — Neil Abrams
(74) *Attorney, Agent, or Firm* — Polygon IP, LLP

(57) ABSTRACT

A flexible conductive assembly includes a flexible shielded high-current circuit having first and second circuit portions, each with conductive layers and an electromagnetic shield. Contacts are mechanically and electrically coupled to the conductive layers and extend into a connector housing. The housing incorporates electromagnetic shield portions electrically joined to the circuit shields, and a wire seal that protects against environmental ingress while maintaining electrical isolation. By combining flat conductor layers, integrated shielding, and sealed connector structures, the assembly provides a compact, lightweight, and reliable (Continued)

flexible shielded circuit for transmitting high currents with reduced electromagnetic emissions.

20 Claims, 53 Drawing Sheets

Related U.S. Application Data on Feb. 11, 2025, provisional application No. 63/706,091, filed on Oct. 11, 2024.

(51) Int. Cl.
*H01B 7/04* (2006.01)
*H01B 7/28* (2006.01)

(56) References Cited

U.S. PATENT DOCUMENTS 5,262,594 A 11/1993 Edwin et al.
5,387,113 A * 2/1995 Dickerson .............. H01R 12/62 439/98
5,645,932 A 7/1997 Uchibori
6,010,771 A 1/2000 Isen et al.
6,036,809 A 3/2000 Kelly et al.
6,332,909 B1 12/2001 Teshima et al.
6,787,732 B1 9/2004 Xuan et al.
6,881,923 B2 4/2005 Battaglia
6,992,001 B1 1/2006 Lin
7,497,004 B2 3/2009 Cote et al.
7,633,035 B2 12/2009 Kirmeier
8,510,934 B2 8/2013 Brand et al.
8,931,166 B2 1/2015 Marttila
9,214,607 B1 12/2015 Andrews
9,671,352 B2 6/2017 Woo et al.
9,692,030 B2 6/2017 Schüssler et al.
9,730,333 B2 8/2017 Li et al.
10,008,403 B2 6/2018 Rumsby et al.
10,842,025 B1 11/2020 Lane
2001/0006766 A1 7/2001 O'Brien et al.
2002/0046856 A1 4/2002 Alcoe
2002/0050489 A1 5/2002 Ikegami et al.
2003/0062347 A1 4/2003 Song et al.
2006/0032665 A1 2/2006 Ice
2007/0171129 A1 7/2007 Coleman et al.
2007/0193027 A1 8/2007 Takakusaki et al.
2008/0017971 A1 1/2008 Hollis
2008/0083715 A1 4/2008 Kirmeier
2008/0128397 A1 6/2008 Gandhi
2009/0007421 A1 1/2009 Chen et al.
2010/0031996 A1 2/2010 Basol
2011/0001670 A1 1/2011 Coleman et al.
2011/0089212 A1 4/2011 Schmid et al.
2012/0164490 A1 6/2012 Itoi et al.
2012/0171527 A1 7/2012 Hiroma
2012/0227907 A1 9/2012 Arakawa et al.
2013/0055555 A1 3/2013 Forster et al.
2013/0260191 A1 10/2013 Takahashi et al.
2014/0268780 A1 9/2014 Wang et al.
2015/0023584 A1 1/2015 Rudin
2015/0228956 A1 8/2015 Schüssler et al.
2015/0270190 A1 9/2015 Kim et al.
2016/0181579 A1 6/2016 Geshi et al.
2016/0207287 A1 7/2016 Kim
2016/0315304 A1 10/2016 Biskup
2016/0366768 A1 12/2016 Matsuda
2017/0012331 A1 1/2017 Ng et al.
2017/0214033 A1 7/2017 Takano et al.
2018/0034023 A1 2/2018 Newman et al.
2018/0205048 A1 7/2018 Enomoto et al.
2018/0294536 A1 10/2018 Kruszelnicki
2019/0097204 A1 3/2019 Liposky et al.
2019/0181419 A1 6/2019 Suba et al.
2019/0296281 A1 9/2019 Elsberry
2019/0312251 A1 10/2019 Matthews
2019/0341585 A1 11/2019 Shi et al.
2020/0220120 A1 7/2020 Day et al.
2021/0066683 A1 3/2021 Lane
2021/0086306 A1 3/2021 Lane
2021/0091363 A1 3/2021 Lane
2021/0092837 A1 3/2021 Lane
2021/0092851 A1 3/2021 Lane
2021/0092853 A1 3/2021 Lane
2021/0092854 A1 3/2021 Lane
2022/0247134 A1 8/2022 Hagi et al.
2023/0087124 A1* 3/2023 Nie ...................... G02B 6/4243 385/14
2023/0136576 A1 5/2023 Prasad et al.
2023/0378700 A1* 11/2023 Bohan ................ H01R 13/6597

FOREIGN PATENT DOCUMENTS

KR 20150058939 A 5/2015
WO 2019150740 A1 8/2019

OTHER PUBLICATIONS

Nagarajan Palavesam et al; "Roll-to-roll processing of film substrates for hybrid integrated flexible electronics" Flexible and Printed Electronics, Feb. 2018.

* cited by examiner

*Cross-section at line A*

Cross-sections at line B

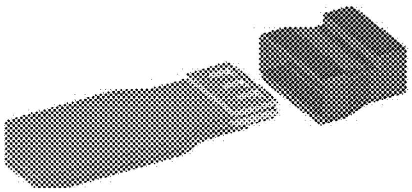

Male blade terminals with insert molding are welded to circuit portions and inserted into single piece housing

Silicone seals are positioned on circuit portions

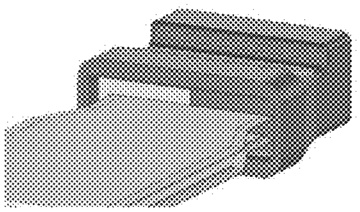

Silicone seals are positioned within single piece housing

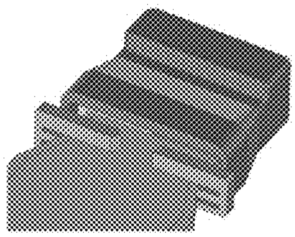

Plastic cap pieces are positioned on circuit portions

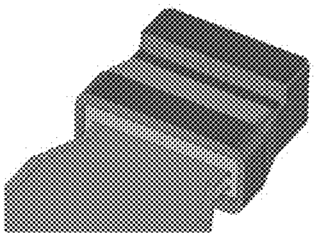

Plastic cap pieces are positioned in single piece housing

Volume between silicone seals and plastic cap pieces is filled with epoxy through ports in the plastic caps

*FIG. 27B*

HIGH-CURRENT FLEXIBLE CONDUCTIVE CIRCUITS WITH CONNECTORS

CROSS-REFERENCE TO RELATED APPLICATIONS

This application claims the benefit under 35 U.S.C. § 119 (e) of U.S. Provisional Patent Application 63/706,091 by Kevin Coakley, titled: "Flexible Interconnect Circuits Comprising Spring Contacts", filed on 2024 Oct. 11, U.S. Provisional Patent Application 63/756,860 by Kevin Coakley, titled: "Flexible Interconnect Circuits Comprising Spring Contacts", filed on 2025 Feb. 11, and U.S. Provisional Patent Application 63/768,736 by Lewis Richard Galligan, titled: "High-Current Flexible Conductive Circuits with Connectors", filed on 2025 Mar. 7, all of which are incorporated herein by reference in their entirety for all purposes.

FIELD OF TECHNOLOGY

This patent application relates generally to flexible conductive circuits, and more specifically to high-current flexible conductive circuits.

BACKGROUND

Electrical power and control signals are typically transmitted to individual components of a vehicle or any other machinery or system using multiple wires bundled together in a harness. In a conventional harness, each wire may have a round cross-sectional profile and may be individually surrounded by an insulating sleeve. The cross-sectional size of each wire is selected based on the material and the current transmitted by this wire. Furthermore, resistive heating and thermal dissipation are concerns during electrical power transmission, requiring even larger cross-sectional sizes of wires in a conventional harness. In addition, electromagnetic shielding of wire harnesses is desired in some applications to prevent electronic interference with other components. Electromagnetic shielding adds further bulk and weight to wire harnesses. These concerns become increasingly relevant as the transmitted current increases. As a result, harnesses can be rather bulky, heavy, and expensive to manufacture. Yet, automotive, aerospace, and other industries strive for smaller, lighter, and less expensive components. In addition, there is an increasing desire for transmission of higher currents as electric vehicles are developed with increasing battery capacity, and the charging time accepted by vehicle operators decreases. What is needed are shielded flexible wire harnesses capable of transmitting higher currents with less harness weight and with better heat dissipation properties.

SUMMARY

Clause 1. A flexible conductive assembly comprising: a flexible shielded high-current circuit comprising a first conductive portion and a second conductive portion, wherein each of the first conductive portion and the second conductive portion comprises a first conductive layer, a circuit electromagnetic shield, a first contact mechanically and electrically coupled to the first conductive layer of the first conductive portion, and a second contact mechanically and electrically coupled to the first conductive layer of the second conductive portion; and a connector comprising a housing comprising a first housing portion, a first electromagnetic shield portion, and a wire seal, wherein: the first electromagnetic shield portion is electrically coupled to the circuit electromagnetic shield of each of the first conductive portion and the second conductive portion and at least partially surrounds the first contact and the second contact, and each of the first conductive portion and the second conductive portion at least partially protrudes into the housing and is sealed, relative to the housing, by the wire seal.

Clause 2. The flexible conductive assembly of clause 1, wherein: each of the first conductive portion and the second conductive portion further comprises a first insulating layer, a second insulating layer, a third insulating layer, and a second conductive layer, the first insulating layer, the first conductive layer, the second conductive layer, the second insulating layer, the electromagnetic shield, and the third insulating layer are stacked along a stacking axis, the first conductive layer and the second conductive layer directly interface and form a stack positioned between the first insulating layer and the second insulating layer, and the electromagnetic shield is positioned between the second insulating layer and the third insulating layer and is configured to block electromagnetic emissions produced by the stack while transmitting an electric current.

Clause 3. The flexible conductive assembly of clause 2, wherein the stack is configured to transmit an electric current of more than 400 Amperes.

Clause 4. The flexible conductive assembly of clause 2, wherein each of the first conductive layer and the second conductive layer comprises aluminum.

Clause 5. The flexible conductive assembly of clause 2, wherein each of the first conductive layer and the second conductive layer has a thickness, measured along the stacking axis, of at least 500 micrometers.

Clause 6. The flexible conductive assembly of clause 2, wherein the first conductive layer and the second conductive layer have the same thickness.

Clause 7. The flexible conductive assembly of clause 2, wherein each of the first insulating layer and the second insulating layer comprises polypropylene (PP).

Clause 8. The flexible conductive assembly of clause 7, wherein each of the first insulating layer and the second insulating layer further comprises polyethylene (PE) such that the polypropylene (PP) forms a first sublayer while the polyethylene (PE) forms a second sublayer directly interfacing the first sublayer.

Clause 9. The flexible conductive assembly of clause 8, wherein the polyethylene (PE) of each of the first insulating layer and the second insulating layer further forms a third sublayer directly interfacing the first sublayer such that the first sublayer is positioned between the second sublayer and the third sublayer.

Clause 10. The flexible conductive assembly of clause 9, wherein the first sublayer has a larger thickness than each of the second sublayer and the third sublayer.

Clause 11. The flexible conductive assembly of clause 2, wherein the third insulating layer is formed from a polyethylene terephthalate (PET).

Clause 12. The flexible conductive assembly of clause 2, wherein the third insulating layer has a thickness of 20-150 micrometers.

Clause 13. The flexible conductive assembly of clause 2, wherein each of the first insulating layer and the second insulating layer has a thickness of 100-400 micrometers.

Clause 14. The flexible conductive assembly of clause 2, wherein the electromagnetic shield is a metal sheet having a thickness, measured along the stacking axis, of 20-150 micrometers.

Clause 15. The flexible conductive assembly of clause 14, wherein the metal sheet of the electromagnetic shield is formed from aluminum.

Clause 16. The flexible conductive assembly of clause 2, wherein the electromagnetic shield of the first conductive portion is mechanically and electrically coupled with the first electromagnetic shield portion.

Clause 17. The flexible conductive assembly of clause 16, wherein the electromagnetic shield of the second conductive portion is mechanically and electrically coupled with the first electromagnetic shield portion.

Clause 18. The flexible conductive assembly of clause 16, wherein the electromagnetic shield of the first conductive portion comprises a shield wing protruding from between the second insulating layer and the third insulating layer.

Clause 19. The flexible conductive assembly of clause 18, wherein the first electromagnetic shield portion comprises a weld tab and the shield wing is mechanically and electrically coupled with the weld tab by a weld.

Clause 20. The flexible conductive assembly of clause 1, wherein the flexible shielded high-current circuit has a thickness of less than 10 millimeters or even less than 5 millimeters.

Clause 21. The flexible conductive assembly of clause 1, wherein at least a portion of the first contact extends away from the first conductive portion in a direction perpendicular to a plane parallel with a portion of the first conductive portion.

Clause 22. The flexible conductive assembly of clause 1, wherein each of the first contact and the second contact is formed from copper.

Clause 23. The flexible conductive assembly of clause 1, wherein: the connector further comprises a blocker positioned between the first contact and the wire seal, the first contact is welded to the first conductive layer of the first conductive portion of the flexible shielded high-current circuit, and the second contact is welded to the first conductive layer of the second conductive portion of the flexible shielded high-current circuit.

Clause 24. The flexible conductive assembly of clause 1, wherein the housing comprises a first housing portion and a second housing portion removably attached to each other and enclosing the first contact, the second contact, the first electromagnetic shield portion, and a portion of each of the first conductive portion and the second conductive portion extending into the connector.

Clause 25. The flexible conductive assembly of clause 24, wherein the housing further comprises a ring seal for sealing and attaching the connector when connecting to an external device.

Clause 26. The flexible conductive assembly of clause 24, wherein the first housing portion comprises an opening providing access to a portion of the first contact and a portion of the second contact.

Clause 27. The flexible conductive assembly of clause 24, wherein the housing further comprises a cover seal compressed between the first housing portion and the second housing portion.

Clause 28. The flexible conductive assembly of clause 24, wherein the housing further comprises a circuit seal enclosing a portion of each of the first housing portion, the second housing portion, the first conductive portion, and the second conductive portion.

Clause 29. The flexible conductive assembly of clause 28, wherein: the circuit seal comprises a blocker and a wire seal, and a portion of the blocker is positioned between the first conductive portion and the second conductive portion and a portion of the blocker extends from the first housing portion to the second housing portion.

Clause 30. The flexible conductive assembly of clause 29, wherein the first housing portion, the second housing portion, and blocker each comprise a set of ribs interfacing and compressed against the first conductive portion or the second conductive portion.

Clause 31. The flexible conductive assembly of clause 1, wherein: the first housing portion comprises connector alignment protrusions, the first contact comprises connector alignment notches, and the connector alignment protrusions protrude into a volume defined by the connector alignment notches.

Clause 32. The flexible conductive assembly of clause 1, wherein the flexible conductive assembly further comprises a first terminal position assurance (TPA) device positioned between the first contact and the second conductive portion and mechanically coupled with the first housing portion, thereby securing the first contact to the first housing portion.

Clause 33. The flexible conductive assembly of clause 1, wherein the connector further comprises a second electromagnetic shield portion positioned between the first housing portion and the second housing portion and electrically coupled with the first electromagnetic shield portion.

Clause 34. A method 1000 of forming a flexible conductive assembly comprising a flexible shielded high-current circuit, the method 1000 comprising: welding a first contact to a first conductive layer of a first conductive portion comprising an electromagnetic shield, a first insulating layer, a second insulating layer a third insulating layer, and a second conductive layer, wherein the first insulating layer, the first conductive layer, the second conductive layer, the second insulating layer, the electromagnetic shield, and the third insulating layer are stacked along a stacking axis; welding a second contact to a first conductive layer of a second conductive portion comprising an electromagnetic shield, a first insulating layer, a second insulating layer, a third insulating layer and a second conductive layer, wherein the first insulating layer, the first conductive layer, the second conductive layer, the second insulating layer, the electromagnetic shield, and the third insulating layer are stacked along a stacking axis; positioning the first contact within a first housing portion comprising a first electromagnetic shield portion, a first connector opening, and a second connector opening such that a portion of the first contact extends into the first connector opening and a portion of the first conductive portion extends out of the first housing portion; welding the electromagnetic shield of the first conductive portion to the first electromagnetic shield portion; positioning the second contact within the first housing portion such that a portion of the second contact extends into the second connector opening and a portion of the second conductive portion extends out of the first housing portion; welding the electromagnetic shield of the second conductive portion to the first electromagnetic shield portion; and attaching a second housing portion comprising a second electromagnetic shield portion with first housing portion such that the second electromagnetic shield portion is positioned between a portion of the second conductive portion and the second housing portion and the second electromagnetic shield portion electrically contacts the first electromagnetic shield portion.

Clause 35. The method 1000 of clause 34, wherein the electromagnetic shield comprises a shield wing protruding from between the second insulating layer and the third insulating layer, the first electromagnetic shield portion comprises a weld tab, and welding the electromagnetic shield to the first electromagnetic shield portion comprises welding the shield wing to the weld tab.

Clause 36. The method 1000 of clause 34, wherein the first housing portion comprises connector alignment protrusions, the first contact comprises connector alignment notches, the second contact comprises connector alignment notches, and the connector alignment protrusions extend through the connector alignment notches upon positioning of the first contact and the second contact in the first housing portion, thereby restricting the movement of the first contact and the second contact relative to the first housing portion to one axis.

Clause 37. The method 1000 of clause 34, wherein: the housing further comprises a cover seal, and attaching the second housing portion to the first housing portion comprises compressing the cover seal between the first housing portion and the second housing portion.

Clause 38. The method 1000 of clause 34, further comprising, before attaching the second housing portion to the first housing portion, the method further comprising positioning a blocker between the first conductive portion and the second conductive portion and between the first housing portion and the second housing portion.

Clause 39. The method 1000 of clause 38, wherein: the first housing portion, the second housing portion, and the blocker each comprise a set of ribs, and attaching the second housing portion to the first housing portion comprises compressing each set of ribs against the first conductive portion or the second conductive portion.

Clause 40. The method 1000 of clause 34, wherein the first contact and the second contact are offset relative to each other along a primary axis (X-axis) of the flexible conductive assembly.

Clause 41. The method 1000 of clause 34, further comprising, after positioning the first contact in the first housing portion and before positioning the second contact in the first housing portion, positioning a first terminal position assurance (TPA) device over the first contact and coupling the first terminal position assurance (TPA) device with the first housing portion, wherein, after positioning the second contact, the first terminal position assurance (TPA) device is positioned between the first contact and the second conductive portion.

Clause 42. The method 1000 of clause 41, further comprising, after positioning the second contact and before attaching the second housing portion to the first housing portion, positioning a second terminal position assurance (TPA) device over the second contact and coupling the second terminal position assurance (TPA) device with the first housing portion, wherein, after attaching the second housing portion to the first housing portion, the second terminal position assurance (TPA) device is positioned between the second contact and the second electromagnetic shield portion.

Clause 43. The method 1000 of clause 34, wherein attaching the second housing portion to the first housing portion comprises interlocking the first housing portion and the second housing portion.

Clause 44. The method 1000 of clause 43, wherein the first housing portion comprises latch protrusions, the second housing portion comprises a latch, and the latch interlocks with the latch protrusions.

Clause 45. A flexible shielded high-current circuit comprising: a first insulating layer; a second insulating layer; a first conductive layer having a plane and at least partially protruding between the first insulating layer and the second insulating layer and comprising a trace contact portion extending past at least one of the first insulating layer and the second insulating layer; a lamella contact comprising a base portion and a spring portion monolithic with the base portion; a stiffening unit positioned such that the trace contact portion is positioned between the stiffening unit and the base portion, and a connector carrier stacked with the stiffening unit and the second insulating layer such that the stiffening unit is positioned between the second insulating layer and the connector carrier, wherein: the first insulating layer, the first conductive layer, and the second insulating layer are stacked such that the first conductive layer is positioned between the first insulating layer and the second insulating layer to form a wire; the base portion directly interfaces and is mechanically attached and electrically connected to the trace contact portion forming a trace-contact interface, and the spring portion is configured to flex relative to the base portion at least in a direction substantially perpendicular to the trace-contact interface.

Clause 46. The flexible shielded high-current circuit of clause 45, wherein the stiffening unit directly interfaces and is mechanically attached to the second insulating layer.

Clause 47. The flexible shielded high-current circuit of clause 46, wherein the stiffening unit is mechanically attached to the second insulating layer with an adhesive.

Clause 48. The flexible shielded high-current circuit of clause 47, wherein the adhesive is a pressure-sensitive adhesive (PSA).

Clause 49. The flexible shielded high-current circuit of clause 45, further comprising: a shield enclosure formed from a conductive material and having a shield enclosure opening; a first shield layer comprising a first shield layer insulator, a first shield layer conductor, and a first shield layer adhesive; and a second shield layer comprising a second shield layer insulator, a second shield layer conductor, and a second shield layer adhesive, wherein: the first shield layer insulator and the second shield layer insulator are each formed from an electrically insulating polymer film, the first shield layer conductor and the second shield layer conductor are each formed from an electrically conductive foil, the first shield layer adhesive and the second shield layer adhesive are each formed from a pressure-sensitive adhesive, the first shield layer conductor is positioned between the first shield layer insulator and the first shield layer adhesive, and the first shield layer adhesive is positioned between the first shield layer conductor and the first insulating layer, the second shield layer conductor is positioned between the second shield layer insulator and the second shield layer adhesive, and the second shield layer adhesive is positioned between the second shield layer conductor and the second insulating layer, the shield enclosure, the first shield layer conductor and the second shield layer conductor are electrically connected, and the spring portion protrudes from the shield enclosure opening.

Clause 50. The flexible shielded high-current circuit of clause 49, wherein the shield enclosure, the first shield layer conductor, and the second shield layer conductor are electrically connected by clinching.

Clause 51. The flexible shielded high-current circuit of clause 45, wherein the lamella contact comprises a core formed from a copper alloy and a surface layer formed from one or more of tin and silver.

Clause 52. The flexible shielded high-current circuit of clause 45, wherein the lamella contact comprises a core comprising a copper alloy and a surface layer formed from one or more of copper, tin, and silver.

Clause 53. The flexible shielded high-current circuit of clause 45, wherein the first conductive layer comprises aluminum.

Clause 54. The flexible shielded high-current circuit of clause 45, wherein each of the first conductive layer and the lamella contact has a current rating of 20-600 Amps.

Clause 55. The flexible shielded high-current circuit of clause 45, wherein first conductive layer is more than one trace and each trace is mechanically attached and electrically connected to the base portion.

Clause 56. The flexible shielded high-current circuit of clause 45, wherein trace contact portion extends past both the first insulating layer and the second insulating layer.

Clause 57. The flexible shielded high-current circuit of clause 45, wherein: the wire has a width $W_i$ measured in the plane of the first conductive layer, the second insulating layer has width $W_s$ measured in the same plane and direction as $W_i$ and in a portion of second insulating layer directly interfacing stiffening unit, the first conductive layer has a width $W_t$ measured in the same plane and direction as $W_i$, $W_i$ is greater than $W_s$, and $W_s$ is greater than $W_t$.

Clause 58. The flexible shielded high-current circuit of clause 45, wherein base portion is welded to trace contact portion with one of an ultrasonic weld, a spot weld, and a laser weld.

Clause 59. The flexible shielded high-current circuit of clause 58, wherein base portion is laser welded to trace contact portion.

Clause 60. The flexible shielded high-current circuit of clause 45, wherein: the wire comprises an alignment opening having a shape, the connector carrier comprises at least one wire alignment protrusion having a cross-sectional shape in a plane parallel with the plane of the first conductive layer, the shape of the alignment opening corresponds with the cross-sectional shape of the at least one wire alignment protrusion, and the alignment opening and the at least one wire alignment protrusion are positioned such that the alignment opening aligns with the at least one wire alignment protrusion when the wire is stacked with the connector carrier.

Clause 61. The flexible shielded high-current circuit of clause 49, wherein the first conductive layer has at least one conductor cutout having a shape passing through a thickness of the first conductive layer in a direction perpendicular to the plane of the first conductive layer positioned such that the first conductive layer is electrically isolated from the shield enclosure, the first shield layer, and the second shield layer.

Clause 62. The flexible shielded high-current circuit of clause 45, wherein: stiffening unit has an edge comprising a first alignment notch having a shape, connector carrier comprises at least one stiffener alignment protrusion having a shape in the plane of the first conductive layer, the shape of the first alignment notch corresponds with the shape of the at least one stiffener alignment protrusion, and the first alignment notch is aligned with the at least one stiffener alignment protrusion when the connector carrier is stacked with the stiffening unit and the second insulating layer.

Clause 63. The flexible shielded high-current circuit of clause 45, wherein stiffening unit has a thickness measured perpendicular to the plane of first conductive layer of 2-8 millimeters.

Clause 64. The flexible shielded high-current circuit of clause 49, wherein the conductive material of the shield enclosure is a copper alloy.

Clause 65. The flexible shielded high-current circuit of clause 45, wherein the connector carrier is formed from a material selected from the list consisting of acrylonitrile butadiene styrene (ABS), nylon, polycarbonate (PC), polystyrene (PS), and polyethylene (PE).

Clause 66. The flexible shielded high-current circuit of clause 45, wherein the stiffening unit is formed from a non-conductive material that is either a polycarbonate or a composite comprising a fiberglass cloth and an epoxy resin.

Clause 67. The flexible shielded high-current circuit of clause 49 further comprising: a third insulating layer; a fourth insulating layer; an second conductive layer at least partially protruding between the third insulating layer and the fourth insulating layer and comprising an additional trace contact portion extending past at least one of the third insulating layer and the fourth insulating layer; an additional spring contact comprising an additional base portion and an additional spring portion monolithic with the additional base portion; and an additional stiffening unit positioned such that the additional trace contact portion is positioned between the additional stiffening unit and the additional base portion, wherein: the third insulating layer, the second conductive layer, and the fourth insulating layer are stacked such that the additional conductive trace is positioned between the third insulating layer and the fourth insulating layer to form an additional wire, the additional base portion directly interfaces and is mechanically attached and electrically connected to the additional trace contact portion forming an additional trace-contact interface, the additional spring portion is configured to flex relative to the additional base portion at least in a direction substantially perpendicular to the additional trace-contact interface, the additional wire is positioned in the connector carrier such that the spring portion and the additional spring portion face away from the connector carrier in the same direction and are not in electrical contact with one another, the connector carrier comprises a connector carrier opening configured such that, when additional wire is positioned against connector carrier such that second conductive layer is positioned between connector carrier and additional stiffening unit, additional spring contact protrudes through connector carrier opening, and the connector carrier is positioned within the shield enclosure such that lamella contact and the additional spring contact both protrude through the shield enclosure opening.

Clause 68. The flexible shielded high-current circuit of clause 67, further comprising: a shield enclosure formed from a conductive material and having a shield enclosure opening and an additional shield enclosure opening; a first shield layer comprising a first shield layer insulator, a first shield layer conductor, and a first shield layer adhesive; and a second shield layer comprising a second shield layer insulator, a second shield layer conductor, and a second shield layer adhesive, wherein: the first shield layer insulator and the second shield layer insulator are each formed from an electrically insulating polymer film, the first shield layer conductor and the second shield layer conductor are each formed from an electrically conductive foil, the first shield layer adhesive and the second shield layer adhesive are each formed from a pressure-sensitive adhesive, the first shield layer conductor is positioned between the first shield layer insulator and the first shield layer adhesive, and the first shield layer adhesive is positioned between the first shield layer conductor and the first insulating layer, the second shield layer conductor is positioned between the second shield layer insulator and the second shield layer adhesive, and the second shield layer adhesive is positioned between the second shield layer conductor and the fourth insulating layer, the shield enclosure, the first shield layer conductor and the second shield layer conductor are electrically connected, the spring portion protrudes from the shield enclosure opening, and the additional spring portion protrudes from the additional shield enclosure opening.

Clause 69. The flexible shielded high-current circuit of clause 68, further comprising an outer shell having an edge, a wire opening adjacent to the edge, and an interface opening and positioned over the shield enclosure such that the wire protrudes through the wire opening.

Clause 70. The flexible shielded high-current circuit of clause 69, wherein the first shield conductor layer, the second shield layer conductor, and shield enclosure are mechanically connected by clinching.

Clause 71. The flexible shielded high-current circuit of clause 69, further comprising a silicone seal positioned around the wire and adjacent to the edge of the outer shell.

Clause 72. The flexible shielded high-current circuit of clause 71, further comprising a molded end cap positioned around the silicone seal and adjacent to the edge of the outer shell, thereby providing strain relief for the wire.

Clause 73. The flexible shielded high-current circuit of clause 69, further comprising a high voltage interlock shunt extending from the outer shell in a direction parallel to the direction that the spring portion protrudes from the shield enclosure opening.

Clause 74. The flexible shielded high-current circuit of clause 69, further comprising an interface seal positioned adjacent to the interface opening.

Clause 75. A busbar header, comprising: an inner header section configured to partially protrude through a battery pack cover opening of a battery pack cover; a first busbar positioned on the inner header section; a second busbar positioned on the inner header section such that it is not in electrical contact with first busbar; a first bus bar cover positioned on the first busbar and comprising a first plurality of cover openings; a second bus bar cover positioned on second busbar comprising a second plurality of cover openings; and an outer header section comprising a plurality of alignment risers, wherein: the outer header section is positioned on the inner header section such that a portion of the battery pack cover is positioned between the outer header section and the inner header section, thereby mechanically attaching busbar header to battery pack cover, and the plurality of alignment risers is positioned on an opposite side of the outer header section from the inner header section.

Clause 76. The busbar header of clause 75, wherein the outer header section and the inner header section are mechanically connected by a plurality of fasteners.

Clause 77. The busbar header of clause 76, wherein each of the plurality of fasteners is a threaded fastener.

Clause 78. The busbar header of clause 76, further comprising a plurality of compression limiters positioned adjacent to the fasteners and configured to limit a minimum distance between inner header section and outer header section.

Clause 79. The busbar header of clause 75, further comprising a header gasket positioned between inner header section and battery pack cover.

Clause 80. The busbar header of clause 75, further comprising a high voltage interlock receptacle.

Clause 81. The busbar header of clause 75, further comprising a header shield positioned on the inner header section and electrically isolated from first busbar and second busbar.

Clause 82. The busbar header of clause 75, wherein the plurality of alignment risers comprises a plurality of alignment protrusions.

Clause 83. An assembly comprising: a flexible shielded high-current circuit comprising a first insulating layer, a second insulating layer, a first conductive layer having a plane, a trace contact portion, a lamella contact, a first shield layer, a second shield layer, a stiffening unit, and a shield enclosure formed from a conductive material and having a shield enclosure opening, a connector carrier, and an outer shell; and a busbar header comprising an inner header section, a first busbar positioned on the inner header section, a first bus bar cover positioned on the first busbar and comprising a first plurality of cover openings, and an outer header section comprising a plurality of alignment risers, wherein: the lamella contact comprises a base portion and a spring portion monolithic with the base portion, the spring portion comprises a plurality of arch portions, extending parallel to each other and arching over the base portion, the first insulating layer, the first conductive layer, and the second insulating layer are stacked such that the first conductive layer is positioned between the first insulating layer and the second insulating layer to form a wire, the first shield layer, the wire, and the second shield layer are stacked such that the wire is positioned between the first shield layer and the second shield layer, the base portion directly interfaces and is mechanically attached and electrically connected to the trace contact portion forming a trace-contact interface, the spring portion is configured to flex relative to the base portion at least in a direction substantially perpendicular to the trace-contact interface, the first conductive layer at least partially protrudes between the first insulating layer and the second insulating layer and comprises a trace contact portion extending past at least one of the first insulating layer and the second insulating layer, the stiffening unit is positioned such that the trace contact portion is positioned between the stiffening unit and the base portion, the connector carrier is formed from a non-conductive material, positioned within the shield enclosure, and stacked with the stiffening unit and the second insulating layer such that the stiffening unit is positioned between the second insulating layer and the connector carrier, the spring portion protrudes from the shield enclosure opening, the inner header section is configured to partially protrude through a battery pack cover opening of a battery pack cover, the outer header section is positioned on the inner header section such that a portion of the battery pack cover is positioned between the outer header section and the inner header section, thereby mechanically attaching busbar header to battery pack cover, the plurality of alignment risers is positioned on an opposite side of the outer header section from the inner header section, the plurality of alignment risers comprises a plurality of alignment protrusions, and the outer shell is positioned adjacent to the outer header section such that lamella contact protrudes through the first plurality of cover openings and contacts the first busbar.

Clause 84. The assembly of clause 83, wherein the stiffening unit is mechanically attached to the second shield layer.

Clause 85. The assembly of clause 83, wherein: the flexible shielded high-current circuit further comprises a third insulating layer, a fourth insulating layer, an second conductive layer, an additional spring contact, an additional stiffening unit, the third insulating layer, the second conductive layer, and the fourth insulating layer are stacked such that the second conductive layer is positioned between the third insulating layer and the fourth insulating layer to form an additional wire, the additional wire is positioned between the wire and the second shield layer, the additional spring contact comprises an additional base portion and an additional spring portion monolithic with the additional base portion, the additional base portion directly interfaces and is mechanically attached and electrically connected to the second conductive layer forming an additional trace-contact interface, the additional spring portion is configured to flex relative to the additional base portion at least in a direction substantially perpendicular to the additional trace-contact interface, the additional spring portion comprises a plurality of additional arch portions extending parallel to each other and arching over the additional base portion, the additional stiffening unit is positioned such that the additional trace contact portion is positioned between the additional stiffening unit and the additional base portion, the additional spring contact protrudes through shield enclosure opening, the busbar header further comprises a second busbar positioned on the inner header section such that it is not in electrical contact with first busbar, and a second bus bar cover positioned on second busbar comprising a second plurality of cover openings, and the additional spring contact protrudes through the second plurality of cover openings and contacts the second busbar.

Clause 86. The assembly of clause 85, wherein: the busbar header has a distance WH defined as the distance, measured in a direction perpendicular to the plane of the first conductive layer, between a surface of the first busbar adjacent to the first bus bar cover and a surface of the second busbar adjacent to the second bus bar cover, the flexible shielded high-current circuit has a distance WL defined as the distance, measured in a direction perpendicular to the plane of the first conductive layer, between the lamella contact and the additional spring contact, and the ratio of WH/WL is between 0.9-1.1.

Clause 87. The assembly of clause 83, wherein the number of openings in the first plurality of cover openings is equal or greater than the number of plurality of arch portions.

Clause 88. The assembly of clause 83, wherein: each arch portion of the plurality of arch portions has a width measured in the plane of the first conductive layer of WA, the arch portions of the plurality of arch portions are arrayed with a pitch measured in the plane of the first conductive layer of DA, each opening in the first plurality of cover openings has a width measured in the plane of the first conductive layer of WO, the openings in the first plurality of cover openings are arrayed with a pitch measured in the plane of the first conductive layer of DO, WO is greater than WA, and DO equals DA, such that, each arch portion of the plurality of arch portions protrudes through one opening in the first plurality of cover openings and electrically contacts first busbar.

Clause 89. The assembly of clause 85, further comprising an alignment lever positioned between the plurality of alignment risers and outer shell configured to apply a force between the plurality of alignment protrusions and the outer shell that urges outer shell towards busbar header, thereby urging lamella contact to physically contact first busbar and urging additional spring contact to contact second busbar.

Clause 90. A method of fabricating a flexible shielded high-current circuit, the method comprising: forming a wire assembly by electrically and mechanically connecting a lamella contact to a wire and positioning a stiffening unit on the wire such that the wire is positioned between the lamella contact and the stiffening unit, wherein the wire comprises a first insulating layer, a second insulating layer, and a first conductive layer having a plane and at least partially protruding between the first insulating layer and the second insulating layer and comprising a trace contact portion extending past at least one of the first insulating layer and the second insulating layer; forming a shielded wire by positioning the first insulating layer between a first shield layer and a second shield layer such that the first insulating layer interfaces the first shield layer and the second insulating layer is positioned between the first conductive layer and the second shield layer and positioning the wire assembly relative to a connector carrier having an opening such that the lamella contact protrudes through the opening and inserting the wire assembly and connector carrier into a shield enclosure such that wire assembly and connector carrier at least partially extend inside a recess of shield enclosure; electrically connecting the shield enclosure, the first shield layer, and the second shield layer to form a terminated wire assembly; and forming a complete wire assembly by inserting the terminated wire assembly and an outer shell having an opening through which wire extends.

Clause 91. The method of clause 90, wherein electrically and mechanically connecting the lamella contact to the wire is by welding.

Clause 92. The method of clause 91, wherein the welding is one of laser welding, ultrasonic welding, and spot welding.

Clause 93. The method of clause 90, wherein the electrically connecting is by one of riveting, clinching, and welding.

Clause 94. The method of clause 90, further comprising forming an additional wire assembly by electrically and mechanically connecting an additional spring contact to an additional wire and positioning an additional stiffening unit such that the additional wire is positioned between the additional spring contact and the additional stiffening unit, wherein the additional wire comprises: a third insulating layer, a fourth insulating layer, and an second conductive layer having a plane and at least partially protruding between the third insulating layer and the fourth insulating layer and comprising an additional trace contact portion extending past at least one of the third insulating layer and the fourth insulating layer, wherein the fourth insulating layer is positioned between the second insulating layer and the second shield layer.

Clause 95. The method of clause 94, wherein: the connector carrier has an additional opening, and forming the shielded wire further comprises positioning the additional wire assembly relative to the connector carrier.

Clause 96. The method of clause 90, further comprising applying a seal to seal the opening of the wire opening around the wire.

Clause 97. A flexible shielded high-current circuit comprising: a first insulating layer; a second insulating layer; a third insulating layer; a first conductive layer; a second conductive layer; and an electromagnetic shield, wherein: the first insulating layer, the first conductive layer, the second conductive layer, the second insulating layer, the electromagnetic shield, and the third insulating layer are stacked along a stacking axis, the first conductive layer and the second conductive layer directly interface and form a stack positioned between the first insulating layer and the second insulating layer, the stack is configured to transmit an electric current of more than Amperes, and the electromagnetic shield is positioned between the second insulating layer and the third insulating layer and is configured to block electromagnetic emissions produced by the stack while transmitting the electric current.

Clause 98. The flexible shielded high-current circuit of clause 97, wherein the flexible shielded high-current circuit has a thickness of less than 10 millimeters or even less than 5 millimeters.

Clause 99. The flexible shielded high-current circuit of clause 97, wherein each of the first conductive layer and the second conductive layer comprises aluminum.

Clause 100. The flexible shielded high-current circuit of clause 97, wherein each of the first conductive layer and the second conductive layer has a thickness, measured along the stacking axis, of at least 400 micrometers.

Clause 101. The flexible shielded high-current circuit of clause 100, wherein the first conductive layer and the second conductive layer have the same thicknesses.

Clause 102. The flexible shielded high-current circuit of clause 97, wherein each of the first conductive layer and the second conductive layer is a metal foil or a metal sheet.

Clause 103. The flexible shielded high-current circuit of clause 97, wherein the electromagnetic shield is a metal sheet having a thickness, measured along the stacking axis, of 20-150 micrometers.

Clause 104. The flexible shielded high-current circuit of clause 103, wherein the metal sheet of the electromagnetic shield is formed from aluminum.

Clause 105. The flexible shielded high-current circuit of clause 97, wherein each of the first insulating layer and the second insulating layer comprises polypropylene (PP).

Clause 106. The flexible shielded high-current circuit of clause 105, wherein each of the first insulating layer and the second insulating layer further comprises polyethylene (PE) such that the propylene (PP) forms a first sublayer while the polyethylene (PE) forms a second sublayer directly interfacing the first sublayer.

Clause 107. The flexible shielded high-current circuit of clause 106, wherein the polyethylene (PE) of each of the first insulating layer and the second insulating layer further forms a third sublayer directly interfacing the first sublayer such that the first sublayer is positioned between the second sublayer and the third sublayer.

Clause 108. The flexible shielded high-current circuit of clause 107, wherein the first sublayer has a larger thickness than each of the second sublayer and the third sublayer.

Clause 109. The flexible shielded high-current circuit of clause 97, wherein the third insulating layer is formed from a polyethylene terephthalate (PET).

Clause 110. The flexible shielded high-current circuit of clause 97, wherein the third insulating layer has a thickness of 20-150 micrometers.

Clause 111. The flexible shielded high-current circuit of clause 97, wherein each of the first insulating layer and the second insulating layer has a thickness of 100-400 micrometers.

Clause 112. The flexible shielded high-current circuit of clause 97, wherein: the flexible shielded high-current circuit comprises a first conductive portion, a second conductive portion, and an adhesive layer positioned between and attaching the first conductive portion and the second conductive portion, the first conductive portion, the adhesive layer, and the second conductive portion are stacked along the stacking axis, each of the first conductive portion and the second conductive portion comprises the first insulating layer, the second insulating layer, the third insulating layer, the first conductive layer, the second conductive layer, and the electromagnetic shield, and the adhesive layer is positioned between and directly interfacing the first insulating layer of the first conductive portion and the first insulating layer of the second conductive portion.

Clause 113. The flexible shielded high-current circuit of clause 97, wherein: the flexible shielded high-current circuit comprises a first conductive portion and a third conductive portion, offset relative to the first conductive portion in a direction substantially perpendicular to the stacking axis, the first conductive portion comprises the first insulating layer, the second insulating layer, the third insulating layer, the first conductive layer, the second conductive layer, and the electromagnetic shield, and the third conductive portion comprises the first insulating layer, the second insulating layer, the third insulating layer, the first conductive layer, and the electromagnetic shield such that the first insulating layer is stacked between and directly interfaces the first insulating layer and the second insulating layer.

Clause 114. The flexible shielded high-current circuit of clause 113, wherein: the flexible shielded high-current circuit comprises an intermediate portion positioned between the first conductive portion and the third conductive portion in the direction substantially perpendicular to the stacking axis, and the intermediate portion comprises the first insulating layer, the second insulating layer, and the third insulating layer, such that the second insulating layer is stacked between and directly interfaces the first insulating layer and the third insulating layer.

Clause 115. The flexible shielded high-current circuit of clause 97, wherein: the flexible shielded high-current circuit comprises a first conductive portion, a first edge portion, and a second edge portion, both the first edge portion and the second edge portion are offset relative to the first conductive portion along a direction substantially perpendicular to the stacking axis, the first conductive portion is positioned between the first edge portion and the second edge portion along the direction substantially perpendicular to the stacking axis, the first conductive portion comprises the first insulating layer, the second insulating layer, the third insulating layer, the first conductive layer, the second conductive layer, and the electromagnetic shield, and each of the first edge portion and the second edge portion comprises the first insulating layer, the second insulating layer, and the third insulating layer, such that the second insulating layer is stacked between and directly interfaces the first insulating layer and the third insulating layer.

Clause 116. The flexible shielded high-current circuit of clause 115, wherein each of the first insulating layer and the second insulating layer is thermally formed around the stack.

Clause 117. The flexible shielded high-current circuit of clause 97, further comprising an additional electromagnetic shield and a fourth insulating layer, wherein the additional electromagnetic shield is stacked between the fourth insulating layer and the first insulating layer along the stacking axis.

Clause 118. The flexible shielded high-current circuit of clause 97, further comprising a lamella contact directly interfacing and welded to the first conductive layer defined by a weld.

Clause 119. The flexible shielded high-current circuit of clause 118, wherein the lamella contact is stacked along the stacking axis with both the first conductive layer and the second conductive layer.

Clause 120. The flexible shielded high-current circuit of clause 119, wherein the weld extends through each of the lamella contact, the first conductive layer, and the second conductive layer thereby electrically interconnecting the lamella contact, the first conductive layer, and the second conductive layer.

Clause 121. The flexible shielded high-current circuit of clause 97, wherein the flexible shielded high-current circuit is a part of a connection between two or more components selected from the group consisting of a vehicle charge port, a vehicle battery pack, a power electronic module, and an inverter.

Clause 122. An electric vehicle comprising: a vehicle charge port, a vehicle battery pack, a power electronic module, and a flexible shielded high-current circuit comprising: a first insulating layer; a second insulating layer; a third insulating layer; a first conductive layer; a second conductive layer; and an electromagnetic shield, wherein: the first insulating layer, the first conductive layer, the second conductive layer, the second insulating layer, the electromagnetic shield, and the third insulating layer are stacked along a stacking axis, the first conductive layer and the second conductive layer directly interface and form a stack positioned between the first insulating layer and the second insulating layer, the stack is configured to transmit an electric current of more than Amperes, the electromagnetic shield is positioned between the second insulating layer and the third insulating layer and is configured to block electromagnetic emissions produced by the stack while transmitting the electric current, and the flexible shielded high-current circuit connects two or more components selected from the group consisting of the vehicle charge port, the vehicle battery pack, and the power electronic module.

Clause 123. The electric vehicle of clause 122, wherein the flexible shielded high-current circuit connects the vehicle charge port and the vehicle battery pack providing a direct current fast charge (DCFC) connection in the electric vehicle.

Clause 124. The electric vehicle of clause 122, further comprising an additional wire harness, routed proximate to the flexible shielded high-current circuit such that the electromagnetic shield is positioned between the stack and the additional wire harness.

Clause 125. The electric vehicle of clause 122, further comprising a body panel, wherein the flexible shielded high-current circuit is bonded and thermally coupled to the body panel.

Clause 126. A flexible shielded high-current circuit comprising: a first insulating layer; a second insulating layer; a third insulating layer; a first conductive layer; a second conductive layer; and an electromagnetic shield, wherein: the first insulating layer, the first conductive layer, the second conductive layer, the second insulating layer, the electromagnetic shield, and the third insulating layer are stacked along a stacking axis, the first conductive layer and the second conductive layer directly interface and form a stack positioned between the first insulating layer and the second insulating layer, the stack is configured to transmit an electric current of more than Amperes, and the electromagnetic shield is positioned between the second insulating layer and the third insulating layer and is configured to block electromagnetic emissions produced by the stack while transmitting the electric current.

Clause 127. The flexible shielded high-current circuit of clause 126, wherein the flexible shielded high-current circuit has a thickness of less than 10 millimeters or even less than 5 millimeters.

Clause 128. The flexible shielded high-current circuit of clause 126, wherein each of the first conductive layer and the second conductive layer comprises aluminum.

Clause 129. The flexible shielded high-current circuit of clause 126, wherein each of the first conductive layer and the second conductive layer has a thickness, measured along the stacking axis, of at least 400 micrometers.

Clause 130. The flexible shielded high-current circuit of clause 129, wherein the first conductive layer and the second conductive layer have the same thickness.

Clause 131. The flexible shielded high-current circuit of clause 126, wherein each of the first conductive layer and the second conductive layer is a metal foil or a metal sheet.

Clause 132. The flexible shielded high-current circuit of clause 126, wherein the electromagnetic shield is a metal sheet having a thickness, measured along the stacking axis, of 20-150 micrometers.

Clause 133. The flexible shielded high-current circuit of clause 132, wherein the metal sheet of the electromagnetic shield is formed from aluminum.

Clause 134. The flexible shielded high-current circuit of clause 126, wherein each of the first insulating layer and the second insulating layer comprises polypropylene (PP).

Clause 135. The flexible shielded high-current circuit of clause 134, wherein each of the first insulating layer and the second insulating layer further comprises polyethylene (PE) such that the propylene (PP) forms a first sublayer while the polyethylene (PE) forms a second sublayer directly interfacing the first sublayer.

Clause 136. The flexible shielded high-current circuit of clause 135, wherein the polyethylene (PE) of each of the first insulating layer and the second insulating layer further forms a third sublayer directly interfacing the first sublayer such that the first sublayer is positioned between the second sublayer and the third sublayer.

Clause 137. The flexible shielded high-current circuit of clause 136, wherein the first sublayer has a larger thickness than each of the second sublayer and the third sublayer.

Clause 138. The flexible shielded high-current circuit of clause 126, wherein the third insulating layer is formed from a polyethylene terephthalate (PET).

Clause 139. The flexible shielded high-current circuit of clause 126, wherein the third insulating layer has a thickness of 20-150 micrometers.

Clause 140. The flexible shielded high-current circuit of clause 126, wherein each of the first insulating layer and the second insulating layer has a thickness of 100-400 micrometers.

Clause 141. The flexible shielded high-current circuit of clause 126, wherein: the flexible shielded high-current circuit comprises a first conductive portion, a second conductive portion, and an adhesive layer positioned between and attaching the first conductive portion and the second conductive portion, the first conductive portion, the adhesive layer, and the second conductive portion are stacked along the stacking axis, each of the first conductive portion and the second conductive portion comprises the first insulating layer, the second insulating layer, the third insulating layer, the first conductive layer, the second conductive layer, and the electromagnetic shield, and the adhesive layer is positioned between and directly interfacing the first insulating layer of the first conductive portion and the first insulating layer of the second conductive portion.

Clause 142. The flexible shielded high-current circuit of clause 126, wherein: the flexible shielded high-current circuit comprises a first conductive portion and a third conductive portion, offset relative to the first conductive portion in a direction substantially perpendicular to the stacking axis, the first conductive portion comprises the first insulating layer, the second insulating layer, the third insulating layer, the first conductive layer, the second conductive layer, and the electromagnetic shield, and the third conductive portion comprises the first insulating layer, the second insulating layer, the third insulating layer, the first conductive layer, and the electromagnetic shield such that the first insulating layer is stacked between and directly interfaces the first insulating layer and the second insulating layer.

Clause 143. The flexible shielded high-current circuit of clause 142, wherein: the flexible shielded high-current circuit comprises an intermediate portion positioned between the first conductive portion and the third conductive portion in the direction substantially perpendicular to the stacking axis, and the intermediate portion comprises the first insulating layer, the second insulating layer, and the third insulating layer, such that the second insulating layer is stacked between and directly interfaces the first insulating layer and the third insulating layer.

Clause 144. The flexible shielded high-current circuit of clause 126, wherein: the flexible shielded high-current circuit comprises a first conductive portion, a first edge portion, and a second edge portion, both the first edge portion and the second edge portion are offset relative to the first conductive portion along a direction substantially perpendicular to the stacking axis, the first conductive portion is positioned between the first edge portion and the second edge portion along the direction substantially perpendicular to the stacking axis, the first conductive portion comprises the first insulating layer, the second insulating layer, the third insulating layer, the first conductive layer, the second conductive layer, and the electromagnetic shield, and each of the first edge portion and the second edge portion comprises the first insulating layer, the second insulating layer, and the third insulating layer, such that the second insulating layer is stacked between and directly interfaces the first insulating layer and the third insulating layer.

Clause 145. The flexible shielded high-current circuit of clause 144, wherein each of the first insulating layer and the second insulating layer is thermally formed around the stack 159.

Clause 146. The flexible shielded high-current circuit of clause 126, further comprising an additional electromagnetic shield and a fourth insulating layer, wherein the additional electromagnetic shield is stacked between the fourth insulating layer and the first insulating layer along the stacking axis.

Clause 147. The flexible shielded high-current circuit of clause 126, further comprising a lamella contact directly interfacing and welded to the first conductive layer defined by a weld.

Clause 148. The flexible shielded high-current circuit of clause 147, wherein the lamella contact is stacked along the stacking axis with both the first conductive layer 140 and the second conductive layer.

Clause 149. The flexible shielded high-current circuit of clause 148, wherein the weld extends through each of the lamella contact, the first conductive layer, and the second conductive layer, thereby electrically interconnecting the lamella contact, the first conductive layer, and the second conductive layer.

Clause 150. The flexible shielded high-current circuit of clause 126, wherein the flexible shielded high-current circuit is a part of a connection between two or more components selected from the group consisting of a vehicle charge port, a vehicle battery pack, a power electronic module, and an inverter.

Clause 151. An electric vehicle comprising: a vehicle charge port, a vehicle battery pack, a power electronic module, and a flexible shielded high-current circuit comprising: a first insulating layer; a second insulating layer; a third insulating layer; a first conductive layer; a second conductive layer; and an electromagnetic shield, wherein: the first insulating layer, the first conductive layer, the second conductive layer, the second insulating layer, the electromagnetic shield, and the third insulating layer are stacked along a stacking axis, the first conductive layer and the second conductive layer directly interface and form a stack positioned between the first insulating layer and the second insulating layer, the stack is configured to transmit an electric current of more than Amperes, the electromagnetic shield is positioned between the second insulating layer and the third insulating layer and is configured to block electromagnetic emissions produced by the stack while transmitting the electric current, and the flexible shielded high-current circuit connects two or more components selected from the group consisting of the vehicle charge port, the vehicle battery pack, and the power electronic module.

Clause 152. The electric vehicle of clause 151, wherein the flexible shielded high-current circuit connects the vehicle charge port and the vehicle battery pack providing a direct current fast charge (DCFC) connection in the electric vehicle.

Clause 153. The electric vehicle of clause 151, further comprising an additional wire harness, routed proximate to the flexible shielded high-current circuit such that the electromagnetic shield is positioned between the stack and the additional wire harness.

Clause 154. The electric vehicle of clause 151, further comprising a body panel, wherein the flexible shielded high-current circuit is bonded and thermally coupled to the body panel.

Clause 155. A flexible shielded high-current circuit comprising: a flexible conductive assembly comprising a first insulating layer, a second insulating layer, and a conductive layer positioned between the first insulating layer and the second insulating layer; a connector comprising a lamella contact and a connector housing, wherein: the connector housing comprises a housing opening, the lamella contact directly interfaces and is welded to the conductive layer forming a weld seam at least partially extending through the conductive layer, and the lamella contact protrudes through the housing opening.

Clause 156. The flexible shielded high-current circuit of clause 155, wherein: the connector housing comprises a first housing portion, a second housing portion, and a housing edge seal positioned between the first housing portion and the second housing portion and sealing the first housing portion relative to the second housing portion, and the housing edge seal forming a partial loop around the lamella contact.

Clause 157. The flexible shielded high-current circuit of clause 156, wherein the connector housing comprises a compression seal surrounding and compressing a length portion of the flexible conductive assembly and also surrounding and compressing portions of the first housing portion and the second housing portion.

Clause 158. The flexible shielded high-current circuit of clause 156, wherein: the flexible conductive assembly further comprises a second conductive layer stacked with and directly interfacing with the conductive layer, the second conductive layer is positioned between the first insulating layer and the second insulating layer together with the conductive layer, and the conductive layer is positioned between the second conductive layer and the lamella contact.

Clause 159. The flexible shielded high-current circuit of clause 158, wherein the weld seam fully extends through the conductive layer and at least partially extends through the second conductive layer.

Clause 160. The flexible shielded high-current circuit of clause 156, wherein the weld seam forms a continuous enclosed shape along the edges of the lamella contact.

Clause 161. The flexible shielded high-current circuit of clause 156, wherein: the flexible conductive assembly further comprises an electromagnetic shield and a third insulating layer, the electromagnetic shield is positioned between the second insulating layer and the third insulating layer, and the second insulating layer is positioned between the conductive layer and the electromagnetic shield.

Clause 162. The flexible shielded high-current circuit of clause 161, wherein the electromagnetic shield is thinner than the conductive layer.

Clause 163. The flexible shielded high-current circuit of clause 161, wherein: the connector comprises a grounding pin protruding through the connector housing and forming an electrical connection to the electromagnetic shield.

Clause 164. The flexible shielded high-current circuit of clause 156, wherein: the flexible conductive assembly further comprises an additional first insulating layer, an additional second insulating layer, and an additional first conductive layer positioned between the additional first insulating layer and the additional second insulating layer, and the connector comprises an additional lamella contact directly interfacing and welded to the additional first conductive layer forming an additional weld seam at least partially extending through the additional first conductive layer, and the connector housing comprises an additional housing opening with the additional lamella contact protruding through the additional housing opening.

Clause 165. The flexible shielded high-current circuit of clause 164, wherein the first insulating layer and the additional first insulating layer are positioned between the conductive layer and the additional first conductive layer.

Clause 166. The flexible shielded high-current circuit of clause 165, wherein the flexible conductive assembly further comprises an adhesive layer positioned between and bonding the first insulating layer and the additional first insulating layer.

Clause 167. The flexible shielded high-current circuit of clause 164, wherein: the flexible conductive assembly further comprises an additional electromagnetic shield and an additional third insulating layer, the additional electromagnetic shield is positioned between the second insulating layer and the third insulating layer, and the second insulating layer is positioned between the conductive layer and the electromagnetic shield.

Clause 168. The flexible shielded high-current circuit of clause 167, wherein: the connector housing comprises a metal perimeter seal at least partially surrounding the lamella contact and the additional lamella contact, the additional electromagnetic shield is welded to the metal perimeter seal along the entire length of the metal perimeter seal.

Clause 169. A method 600 of fabricating a flexible shielded high-current circuit, the method 600 comprising: providing a first housing portion comprising a lamella contact and a housing opening with a portion of the lamella contact protruding through the housing opening; positioning a flexible conductive assembly over the first housing portion, wherein the flexible conductive assembly comprises a first insulating layer, a second insulating layer, and a conductive layer positioned at least in part between the first insulating layer and the second insulating layer with a portion of the conductive layer extending past both of the first insulating layer and the second insulating layer and directly interfacing the lamella contact; welding the conductive layer to the lamella contact; and attaching a second housing portion to the first housing portion such that a portion of the flexible conductive assembly extends between and is sealed by the first housing portion and the second housing portion.

Clause 170. The method 600 of clause 169, wherein: the flexible conductive assembly further comprises an electromagnetic shield and a third insulating layer, the electromagnetic shield is positioned between the second insulating layer and the third insulating layer, the second insulating layer is positioned between the conductive layer and the electromagnetic shield, and positioning the flexible conductive assembly over the first housing portion comprises connecting the electromagnetic shield to a grounding pin protruding through the first housing portion.

Clause 171. The method 600 of clause 169, wherein: the flexible conductive assembly further comprises a second conductive layer stacked with and directly interfacing with the conductive layer, the second conductive layer is positioned between the first insulating layer and the second insulating layer together with the conductive layer, the conductive layer is positioned between the second conductive layer and the lamella contact, and welding the conductive layer to the lamella contact further comprising welding the second conductive layer to the conductive layer.

Clause 172. A flexible conductive assembly comprising: a flexible shielded high-current circuit comprising a first conductive portion and a second conductive portion, wherein each of the first conductive portion and the second conductive portion comprises a conductive layer and a circuit electromagnetic shield; and a connector comprising a contact unit, a housing, a connector electromagnetic shield, and a circuit seal, wherein: the contact unit is positioned inside the housing and comprises a first contact and a second contact supported relative to each other and to the housing, the first contact is mechanically and electrically coupled to the conductive layer the second contact is mechanically and electrically coupled to the conductive layer of the second conductive portion of the flexible shielded high-current circuit, the connector electromagnetic shield is electrically coupled to the circuit electromagnetic shield of each of the first conductive portion and the second conductive portion and at least partially surrounds the first contact and the second contact of the contact unit, and each of the first conductive portion and the second conductive portion is at least partially protrudes into the housing and sealed, relative to the housing by the circuit seal.

Clause 173. The flexible conductive assembly of clause 172, wherein: each of the first conductive portion and the second conductive portion further comprises a first insulating layer, a second insulating layer, a third insulating layer, and a second conductive layer, the first insulating layer, the first conductive layer, the second conductive layer, the second insulating layer, the electromagnetic shield, and the third insulating layer are stacked along a stacking axis, the first conductive layer and the second conductive layer directly interface and form a stack positioned between the first insulating layer and the second insulating layer, and the electromagnetic shield is positioned between the second insulating layer and the third insulating layer and is configured to block electromagnetic emissions produced by the stack while transmitting the electric current.

Clause 174. The flexible conductive assembly of clause 173, wherein the stack is configured to transmit an electric current of more than 400 Amperes.

Clause 175. The flexible conductive assembly of clause 173, wherein each of the first conductive layer and the second conductive layer comprises aluminum.

Clause 176. The flexible conductive assembly of clause 173, wherein each of the first conductive layer and the second conductive layer has a thickness, measured along the stacking axis, of at least 400 micrometers.

Clause 177. The flexible conductive assembly of clause 173, wherein the first conductive layer and the second conductive layer have the same thickness.

Clause 178. The flexible conductive assembly of clause 173, wherein each of the first insulating layer and the second insulating layer comprises polypropylene (PP).

Clause 179. The flexible conductive assembly of clause 178, wherein each of the first insulating layer and the second insulating layer further comprises polyethylene (PE) such that the propylene (PP) forms a first sublayer while the polyethylene (PE) forms a second sublayer directly interfacing the first sublayer.

Clause 180. The flexible conductive assembly of clause 179, wherein the polyethylene (PE) of each of the first insulating layer and the second insulating layer further forms a third sublayer directly interfacing the first sublayer such that the first sublayer is positioned between the second sublayer and the third sublayer.

Clause 181. The flexible conductive assembly of clause 180, wherein the first sublayer has a larger thickness than each of the second sublayer and the third sublayer.

Clause 182. The flexible conductive assembly of clause 173, wherein the third insulating layer is formed from a polyethylene terephthalate (PET).

Clause 183. The flexible conductive assembly of clause 173, wherein the third insulating layer 130 has a thickness of 20-150 micrometers.

Clause 184. The flexible conductive assembly of clause 173, wherein each of the first insulating layer 110 and the second insulating layer 120 has a thickness of 100-400 micrometers.

Clause 185. The flexible conductive assembly of clause 172, wherein the electromagnetic shield 160 is a metal sheet having a thickness, measured along the stacking axis 109, of 20-150 micrometers.

Clause 186. The flexible conductive assembly of clause 185, wherein the metal sheet of the electromagnetic shield is formed from aluminum.

Clause 187. The flexible conductive assembly of clause 172, wherein the flexible shielded high-current circuit has a thickness of less than 10 millimeters or even less than 5 millimeters.

Clause 188. The flexible conductive assembly of clause 172, wherein the contact unit further comprises a contact support made from an insulating material and supporting the first contact and the second contact relative to each other and to the housing.

Clause 189. The flexible conductive assembly of clause 172, wherein each of the first contact and the second contact is formed from copper.

Clause 190. The flexible conductive assembly of clause 172, wherein: the first contact is welded to the conductive layer of the first conductive portion of the flexible shielded high-current circuit, and the second contact is welded to the conductive layer of the second conductive portion of the flexible shielded high-current circuit.

Clause 191. The flexible conductive assembly of clause 172, wherein the housing comprises a first housing portion and a second housing portion removably attached to each other and enclosing the contact unit, the connector electromagnetic shield, and a portion of each of the first conductive portion and the second conductive portion extending into the connector.

Clause 192. The flexible conductive assembly of clause 191, wherein the first housing portion comprises an opening providing access to a portion of the first contact and a portion of the second contact.

Clause 193. The flexible conductive assembly of clause 191, wherein the housing further comprises a housing edge seal compressed between the first housing portion and the second housing portion.

Clause 194. The flexible conductive assembly of clause 191, wherein the housing further comprises a compression seal enclosing a portion of each of the first housing portion, the second housing portion, the first conductive portion, and the second conductive portion.

Clause 195. The flexible conductive assembly of clause 191, wherein the housing further comprises an attachment seal and an attachment bolt for sealing and attaching the connector when connecting to an external device (e.g., a battery pack, charging port).

Clause 196. The flexible conductive assembly of clause 191, wherein: the circuit seal comprises a first seal portion, a second seal portion, and a middle circuit seal portion; the first seal portion is positioned between the first housing portion and the first conductive portion, the second seal portion is positioned between the second housing portion and the second conductive portion, and the middle circuit seal portion is positioned between the first conductive portion and the second conductive portion.

Clause 197. The flexible conductive assembly of clause 196, wherein each of the first seal portion, the second seal portion, and the middle circuit seal portion comprises a set of ribs interfacing and compresses against the first conductive portion or the second conductive portion.

Clause 198. The flexible conductive assembly of clause 197, wherein: the set of ribs of the first seal portion is axially offset relative to the set of ribs on the middle circuit seal portion facing the set of ribs of the first seal portion, and the set of ribs of the second seal portion is axially offset relative to the set of ribs on the middle circuit seal portion facing the set of ribs of the second seal portion.

Clause 199. Method 900 of forming a flexible conductive assembly comprising a flexible shielded high-current circuit, the method 900 comprising: providing a connector subassembly comprising a contact unit, a first housing portion, a first electromagnetic shield portion, and a second electromagnetic shield portion, wherein the contact unit comprises a first contact and a second contact supported relative to each other and to the housing; positioning a first conductive portion of the flexible shielded high-current circuit over the connector subassembly, wherein the first conductive portion comprises a conductive layer and a circuit electromagnetic shield such that the conductive layer interfaces the first contact and such that the circuit electromagnetic shield interfaces the first electromagnetic shield portion; welding the conductive layer of the first conductive portion to the first contact; positioning a second conductive portion of the flexible shielded high-current circuit over the connector subassembly, wherein the second conductive portion comprises a conductive layer and a circuit electromagnetic shield such that the conductive layer interfaces the second contact; welding the conductive layer of the second conductive portion to the first contact; positioning a third electromagnetic shield portion over the second conductive portion and the contact unit such that the circuit electromagnetic shield of the second conductive portion interfaces the third electromagnetic shield portion; and positioning a second housing portion over the third electromagnetic shield portion and attaching the second housing portion to the first housing portion.

Clause 200. The method 900 of clause 199, wherein: the connector subassembly further comprises a housing edge seal, and attaching the second housing portion to the first housing portion comprises compressing the housing edge seal between the first housing portion and the second housing portion.

Clause 201. The method 900 of clause 200, wherein the housing edge seal is compressed along at least two axes when attaching the second housing portion to the first housing portion.

Clause 202. The method 900 of clause 199, wherein the first contact and the second contact are offset relative to each other along a primary axis (X-axis) of the flexible conductive assembly.

Clause 203. The method 900 of clause 199, wherein: the first contact is positioned within a first plane; the second contact is positioned within a second plane offset relative to the first plane.

Clause 204. The method 900 of clause 199, wherein the first electromagnetic shield portion comprises a set of spring contacts directly interfacing and biasing against the circuit electromagnetic shield of the first conductive portion.

Clause 205. The method 900 of clause 199, wherein the connector subassembly further comprises a first seal portion compressed between the first housing portion and the first conductive portion when the second housing portion is attached to the first housing portion.

Clause 206. The method 900 of clause 199, wherein: the first electromagnetic shield portion extends at least in part between the first housing portion and the first conductive portion and directly interfaces with each of the first electromagnetic shield portion and the third electromagnetic shield portion; the second electromagnetic shield portion extends between the contact unit and the second housing portion and directly interfaces with the third electromagnetic shield portion.

Clause 207. The method 900 of clause 199, further comprising, after welding the conductive layer of the first conductive portion to the first contact and before positioning the second conductive portion, positioning a first spacer block over the first conductive portion, wherein, after positioning the second conductive portion, the first spacer block is positioned between the first conductive portion and the second conductive portion.

Clause 208. The method 900 of clause 207, further comprising, after positioning the first spacer block and before positioning the second conductive portion, positioning a middle circuit seal portion over the first spacer block, wherein after positioning the second conductive portion, the middle circuit seal portion is positioned between the first spacer block and the second conductive portion.

Clause 209. The method 900 of clause 208, wherein: the first spacer block comprises a seal retention opening, and the middle circuit seal portion is positioned into the seal retention opening of the first spacer block.

Clause 210. The method 900 of clause 207, wherein: the first spacer block comprises a first set of first-spacer locating features, and the first housing portion comprises a second set of first-spacer locating features, engaging the first set of first-spacer locating features when the first spacer block is positioned over the first conductive portion thereby restricting the movement of the first spacer block relative to the first housing portion to one axis.

Clause 211. The method 900 of clause 199, further comprising, after welding the conductive layer of the second conductive portion and before positioning the third electromagnetic shield portion, positioning a second spacer block over the second conductive portion, wherein, after positioning the third electromagnetic shield portion, the second spacer block is positioned between the second conductive portion and the third electromagnetic shield portion.

Clause 212. The method 900 of clause 211, wherein: the second spacer block comprises a first set of second-spacer locating features, and the first housing portion comprises a second set of second-spacer locating features, engaging the first set of second-spacer locating features when the second spacer block is positioned over the second conductive portion thereby restricting the movement of the second spacer block relative to the first housing portion to one axis.

Clause 213. The method 900 of clause 199, further comprising, after positioning the third electromagnetic shield portion and before positioning the second housing portion, positioning a second seal portion over the second conductive portion such that the second seal portion is compressed between the second conductive portion and the second housing portion.

Clause 214. The method 900 of clause 199, wherein attaching the second housing portion to the first housing portion comprises interlocking the first housing portion and the second housing portion.

Clause 215. The method 900 of clause 214, wherein each of the first housing portion and the second housing portion comprises interlocking latches.

Clause 216. The method 900 of clause 214, wherein: one the first housing portion and the second housing portion comprises a set of barbed dowl pins, and another one of the first housing portion and the second housing portion comprises a set of openings receiving the set of barbed dowl pins while attaching the second housing portion to the first housing portion and interlocking the first housing portion and the second housing portion.

Clause 217. The method 900 of clause 199, further comprising, after attaching the second housing portion to the first housing portion, installing a compression seal to surround the first housing portion, the second housing portion, the first conductive portion, and the second conductive portion.

Clause 218. The method 900 of clause 217, wherein installing the compression seal comprises hot melting.

Clause 219. The method 900 of clause 217, wherein the compression seal comprises multiple components that are assembled into the compression seal while installing the compression seal.

These and other embodiments are described further below with reference to the figures.

BRIEF DESCRIPTION OF THE DRAWINGS

The included drawings are for illustrative purposes and serve only to provide examples of possible structures and operations for the disclosed inventive systems, apparatus, and methods for high-current flexible conductive circuits with connectors. These drawings in no way limit any changes in form and detail that may be made by one skilled in the art without departing from the spirit and scope of the disclosed implementations.

FIG. 27B is a schematic perspective view of a flexible conductive assembly, in accordance with some examples.

DETAILED DESCRIPTION

Introduction

Figure 1A:
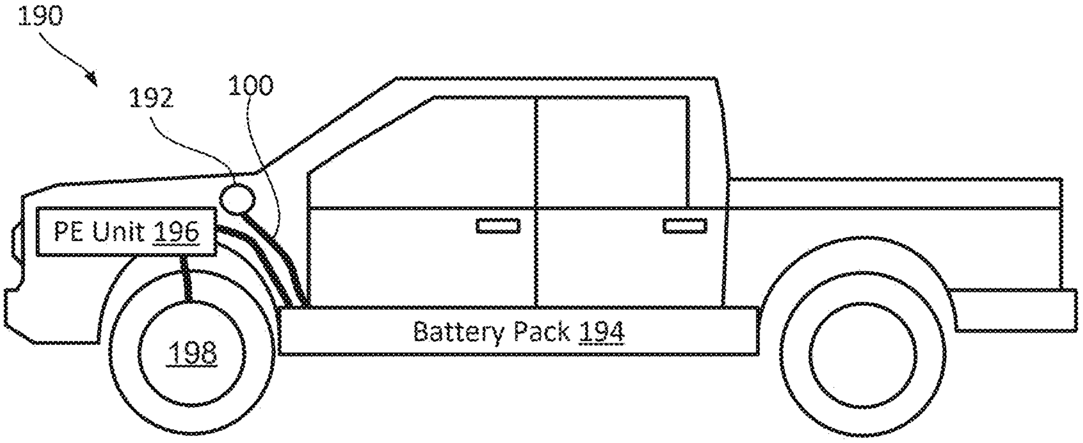
FIG. 1A is a schematic illustration of an electric vehicle comprising a vehicle charge port, a vehicle battery pack, a power electronic module, and a flexible shielded high-current circuit, in accordance with some examples.

Flexible interconnect circuits deliver power and/or signals and are used for various applications, such as vehicles, appliances, electronics, and the like. One example of such flexible interconnect circuits is a harness. As noted above, a conventional harness uses a stranded set of small, round wires. A separate polymer shell insulates each wire, adding to the size and weight of the harness. Unlike conventional harnesses, flexible interconnect circuits described herein have thin, flat profiles, enabled by thin electrical conductors that may be positioned side-by-side. Each electrical conductor can have a flat, rectangular profile. For purposes of this disclosure, the term “interconnect” is used interchangeably with “Interconnect circuit,” the term “conductive layer” with “conductor” or “conductor layer,” and the term “insulating layer” with “insulator.”

Saving space and reducing mass are both desirable in vehicle design, particularly in electric vehicle design. Space savings within electric vehicles are desired because of the internal space utilized for battery packs. Weight saving is desirable because reducing weight of the vehicle increases the range possible for a given battery charge. Flexible interconnects provide space savings inside vehicles in two ways. First, a flat flexible interconnect can have a significantly smaller profile in one dimension than a harness comprising round wires, when designed for the same voltage and current capacity. For example, a flat flexible interconnect may be placed more readily along an inside surface of a vehicle body panel than a harness of round wires. Second, connectors for flat interconnects may have a smaller profile. A flat flexible interconnect wire and an associated connector may have less height in one direction than a harness of round wires, but still have a sufficient cross-section for designed voltages and currents due to its width.

Conductors formed from aluminum may have less mass than copper conductors with sufficient cross-section to carry the same current density over the same distance. While the electrical resistivity of aluminum (26.5 nΩ·m) is greater than that of copper (16.78 nΩ·m), the density of aluminum (2.699 g/cm$^3$) is lower than that of copper (8.935 g/cm$^3$). However, making suitable connections between the aluminum conductors and other components can be a challenge.

Electromagnetic shielding may be desirable to prevent emission of electromagnetic noise from wire harnesses. Electromagnetic shielding prevents electromagnetic emissions from creating electromagnetic noise that may interfere with other electronic components. Electromagnetic emissions may result from transmission of both direct current and alternating current by wire harnesses. For example, spikes and variations in DC current transmission may cause transient electromagnetic emissions. Transferring electric power to a direct current electric motor may cause transient electromagnetic emissions as, for example, the power supplied to the motor is varied during operation of an electric vehicle powered by the motor. AC current transmission may cause sustained electromagnetic emissions at interfering frequencies. For example, transmitting alternating current from an inverter to electrically powered accessories may cause an electromagnetic emission with, for example, a frequency of 60 Hertz.

Heat dissipation from wire harnesses can also provide challenges. As conductors of wire harnesses transmit electrical current, they dissipate a portion of the transmitted energy as heat. The higher the resistance of the conductor, the more heat that is generated at a given current. Increasing the cross-section of the conductor decreases its resistance but increases the weight of the wire harness. Efficient heat dissipation is desired to limit the increase in temperature of the wire harness during transmission of high electrical currents. As the current a wire harness transmits increases, heat dissipation becomes more important.

The challenge of shielding electromagnetic emissions increases as a wire harness transmits higher currents. Higher currents may be transmitted, for example, for more rapid charging of larger battery packs, or transferring current to higher-powered electric motors. In addition, electromagnetic shielding adds weight and bulk to a wire harness. Further, shielding layers and additional insulating layers decrease wire harness heat dissipation performance. As noted above, there is an ongoing desire to decrease the weight and size of components, especially of electric vehicles. Limiting the increase of weight the harness adds to the vehicle is desirable for the reasons of weight economy in electric vehicle design noted above.

Provided herein are examples of flexible shielded high-current circuits comprising conductive traces, insulators, together forming flat wires, and lamella contacts electrically and mechanically attached to the conductive traces. The flexible shielded high-current circuits further comprise stiffening units mechanically attached to the insulators. The flexible shielded high-current circuits may further comprise connector carriers positioned adjacent to the stiffening units. The wires and connector carriers are positioned together within shield enclosures, and the wires and shield enclosures are mechanically connected. The shield enclosures and shield layers may provide electromagnetic shielding to the flexible shielded high-current circuits. The lamella contacts permit electrical connection with other components.

Also provided herein are examples of assemblies comprising flexible shielded high-current circuits comprising lamella contacts and busbar headers comprising busbar covers as described above. Advantageously, the assemblies provide a high level of touch protection while maintaining a low z-height of the assembly. In other words, the assembly provides touch protection while taking less space adjacent to the battery pack than would be required for assemblies achieving touch protection with other components.

Also provided herein are examples of busbar headers comprising busbars and an inner header section mechanically connected to an outer header section. The inner header section is positioned partially within a battery pack and partially protrudes through an opening in the battery pack. The busbar headers comprise busbar covers that provide a high level of touch protection. In other words, the busbar covers prevent unintentional contact with the busbars but have openings that permit passage of other components to make electrical contact with the busbars.

Also provided herein are assemblies comprising flexible shielded high-current circuits 100 comprising connectors mechanically and electrically coupled to the first circuit portion 101 of the flexible shielded high-current circuit 100 and comprising a portion extending away from the first circuit portion 101. This allows a connection with an interfacing connector of another component, for example, a busbar header, with a varying distance in the direction that the connector extends away from the first circuit portion 101. For example, the connector may extend away from the first circuit portion 101 in a direction perpendicular to a plane of the first circuit portion 101, providing for an interface of the connector with an interfacing connector of another component while maintaining a low profile of the flexible conductive assembly 290 in the same direction. Furthermore, the flexible conductive assembly 290 may comprise a first housing portion 231 at least partially surrounding the connector to provide touch protection when the connector is not coupled with the interfacing connector of the other component, while allowing electrical coupling of the connector with the interfacing connector when the flexible conductive assembly 290 is mechanically coupled with the other component. The connector housing surrounds and protects the contacts, includes multiple electromagnetic shield portions, and provides environmental sealing using wire seals, circuit seals, and cover seals. In some embodiments, alignment features ensure correct positioning of contacts and housings, while terminal position assurance (TPA) structures secure the contacts in place. The disclosed assemblies are designed to transmit very high currents (for example, more than 400 Amperes), with reduced bulk and improved electromagnetic compatibility compared to conventional wire harnesses.

Also provided herein are examples of electric vehicles comprising flexible shielded high-current circuits, vehicle charge ports, vehicle battery packs, and power electronic modules. Advantageously, the flexible shielded high-current circuits provide electronic coupling of two or more of the other components capable of high current transmission.

Also provided herein are examples of methods for fabricating flexible shielded high-current circuits as described above.

Examples of Flexible Shielded High-Current Circuits

FIG. 1A is a schematic illustration of an electric vehicle 190 comprising a vehicle charge port 192, a vehicle battery pack 194, a power electronic module 196, and a flexible shielded high-current circuit 100, in accordance with some examples. The flexible shielded high-current circuit 100 connects two or more components from the group consisting of the vehicle charge port 192, the vehicle battery pack 194, and the power electronic module 196. In the example shown in FIG. 1A, the flexible shielded high-current circuit 100 connects the vehicle charge port 192 and the vehicle battery pack 194, providing a direct current fast charge (DCFC) connection.

Figure 1B:
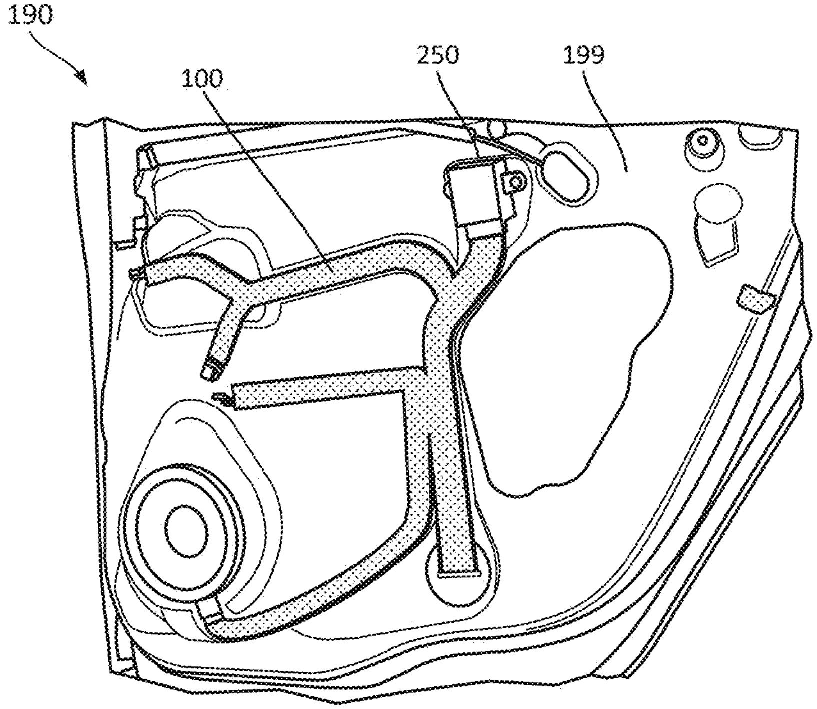
FIG. 1B is a schematic illustration of a body panel of the electric vehicle of the example shown in FIG. 1A, in accordance with some examples.

FIG. 1B is a schematic illustration of a body panel 199 of the electric vehicle 190 of the example shown in FIG. 1A, in accordance with some examples. A flexible shielded high-current circuit 100 is attached to body panel 199 and a connector 260. While body panel 199 is shown as a car door, one having ordinary skill in the art would understand that various other types of vehicle panels (e.g., roof) and types of vehicles (e.g., aircraft, watercraft) are also within the scope. Furthermore, flexible shielded high-current circuit 100 may be a part of or attached to other types of structures, such as battery housing, appliances (e.g., refrigerators, washers/dryers, heating, ventilation, and air conditioning), aircraft wiring, and the like. It is to be noted that body panel 199 may be operable as a heat sink or heat spreader.

Returning to the example shown in FIG. 1B, flexible shielded high-current circuit 100 may be adhered to and supported by body panel 199. For example, flexible shielded high-current circuit 100 may comprise an adhesive (e.g., a thermally conductive adhesive) for attaching to body panel 199, as further described below. The flexibility of flexible shielded high-current circuit 100 is achieved by its small thickness and large aspect ratio. This flexibility allows flexible shielded high-current circuit 100 to conform and adhere to various non-planar portions of body panel 199. Maximizing the contact interface between flexible shielded high-current circuit 100 and body panel 199 provides greater support and more heat dissipation from flexible shielded high-current circuit 100 to body panel 199.

Figure 2A:
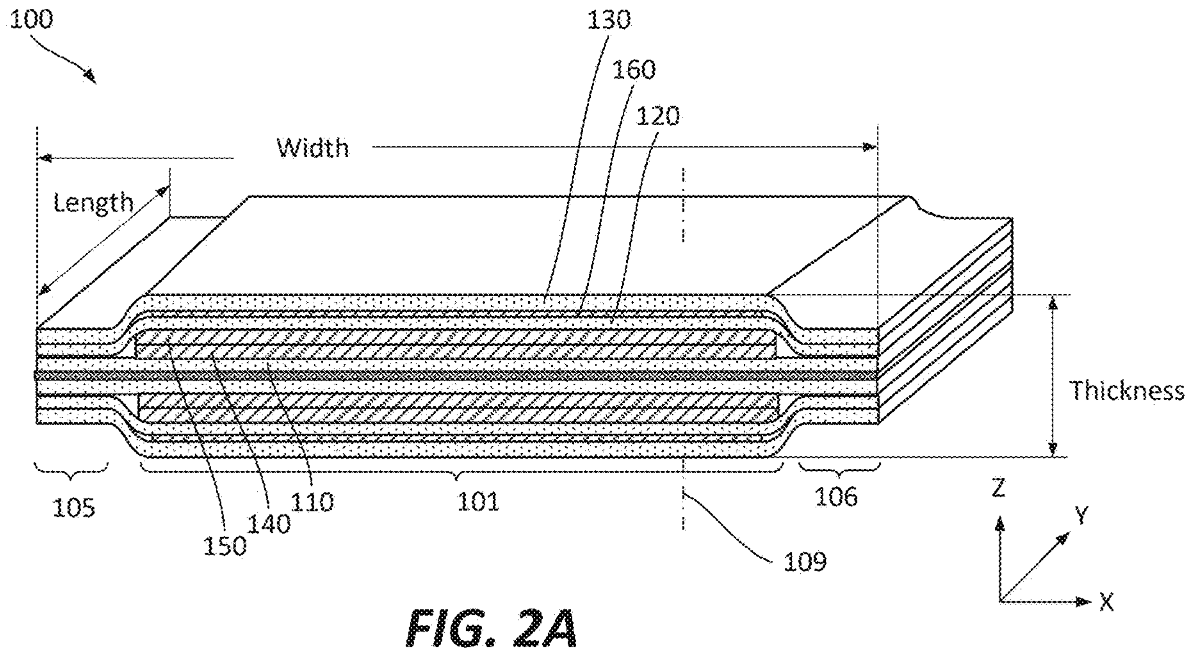
FIG. 2A is a schematic cross-sectional view of a flexible shielded high-current circuit, in accordance with some examples.

FIG. 2A is a schematic cross-sectional view of flexible shielded high-current circuit 100 in FIG. 1A and FIG. 1B, in accordance with some examples. FIG. 2A identifies, in general, a width (extending along the X-axis), thickness (along the Y-axis), and length (along Z-axis) of the flexible shielded high-current circuit 100. One having ordinary skill in the art would understand that flexible shielded high-current circuit 100 will change its orientation due to its flexibility. Specifically, flexible shielded high-current circuit 100 may bend around any one of the identified axes during its production, handling, installation, and/or operation, and the orientation of the width, thickness, and length may change and may be different at different locations of flexible shielded high-current circuit 100.

The flexible shielded high-current circuit 100 of FIG. 2A comprises a first circuit portion 101, a first edge portion 105, and a second edge portion 106. Both the first edge portion 105 and the second edge portion 106 are offset relative to the first circuit portion 101 along a direction substantially perpendicular to the stacking axis 109. The first circuit portion 101 is positioned between the first edge portion 105 and the second edge portion 106 along a direction substantially perpendicular to the stacking axis 109. The first circuit portion 101 comprises the first insulating layer 110, the second insulating layer 120, the third insulating layer 130, the first conductive layer 140, the second conductive layer 150, and the electromagnetic shield 160. Each of the first edge portion 105 and the second edge portion 106 comprises the first insulating layer 110, the second insulating layer 120, and the third insulating layer 130, such that the second insulating layer 120 is stacked between and directly interfaces the first insulating layer 110 and the third insulating layer 130.

In some examples, within one or both of the first edge portion 105 and the second edge portion 106, the first insulating layer 110 is bonded with the second insulating layer 120 and the second insulating layer 120 is bonded with the third insulating layer 130. When the insulating layers are bonded to one another in the first edge portion 105 and/or the second edge portion 106, the bonding provides a seal. The seal prevents air and water intrusion into the flexible shielded high-current circuit 100. In addition, the seal prevents current leakage from the conductors due to contact with the conductors. The seal may be formed, for example, by thermally bonding the first insulating layer 110 and the second insulating layer 120 around the stack 159. Specifically, one or more of the insulating layers may comprise a layer comprising a hotmelt adhesive. The hotmelt adhesive may comprise polypropylene (PP), polyethylene (PE), ethylene-vinyl acetate (EVA), or thermoplastic polyurethane (TPU). In other examples, the seal may be formed by application of pressure to the insulating layers in the first edge portion 105 and/or the second edge portion 106. In these examples, one or more of the insulating layers may comprise a non-conductive adhesive or a non-conductive adhesive may be applied to the insulating layers prior to application of pressure. The non-conductive adhesive may comprise an epoxy, an acrylate, a polyester, or a polyamide. In some examples, the peel strength may be measured between the bonded layers within the first edge portion 105 and/or the second edge portion 106 of greater than 50 Newtons per 50 millimeters, greater than 100 Newtons per 50 millimeters, or even greater than 150 Newtons per 50 millimeters.

In some examples, the flexible shielded high-current circuit 100 can bend around a 10 millimeter radius from 0 degrees, to 180 degrees, and back to 0 degrees at least 5 times, at least 10 times, or even at least 15 times with no cracking or delamination of the insulator. In some examples, one or both of the first insulating layer 110 and the second insulating layer 120 is less than 1200 megaPascals, less than 1000 megaPascals, less than 900 megaPascals, or even less than 800 megaPascals.

Figure 3A:
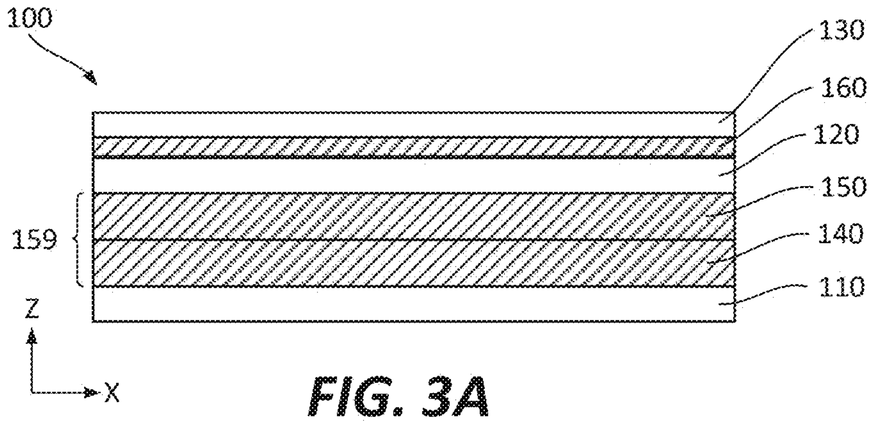
FIG. 3A is a schematic cross-sectional view of flexible shielded high-current circuit in FIG. 1A and FIG. 1B, in accordance with some examples.

FIG. 3A is a schematic cross-sectional view of flexible shielded high-current circuit 100 in FIG. 1A and FIG. 1B, in accordance with some examples. Flexible shielded high-current circuit 100 comprises a first insulating layer 110, a second insulating layer 120, a third insulating layer 130, a first conductive layer 140, a second conductive layer 150, and an electromagnetic shield 160. The first insulating layer 110, the first conductive layer 140, the second conductive layer 150, the second insulating layer 120, the electromagnetic shield 160, and the third insulating layer 130 are stacked along a stacking axis 109. The first conductive layer 140 and the second conductive layer 150 directly interface and form a stack 159 positioned between the first insulating layer 110 and the second insulating layer 120. The stack 159 is configured to transmit an electric current of more than 400 Amperes. In some examples, the stack 159 is configured to transmit an electric current of more than 500 Amperes, more than 600 Amperes, more than 750 Amperes, or even more than 900 Amperes.

The multiple conductive layers provide the flexible shielded high-current circuit 100 with several benefits. First, because the stack 159 comprises multiple conductive layers, it has greater out-of-plane flexibility than it would if it comprised one conductive layer having the same thickness as the combined multiple conductive layers. This, in turn, improves the flexibility of the flexible shielded high-current circuit 100, which, as noted above, is beneficial during installation of the flexible shielded high-current circuit 100. Second, one of the conductive layers may be patterned differently than the other, allowing for contact of one conductive layer to other components. For example, one layer may be patterned to provide conduction for signal lines or connection to components requiring less than the total current transmitted by the stack. This provides the flexible shielded high-current circuit 100 with design flexibility.

The electromagnetic shield 160 is positioned between the second insulating layer 120 and the third insulating layer 130. The electromagnetic shield 160 is configured to block electromagnetic emissions produced by the stack 159 while transmitting the electric current.

Figure 2B:
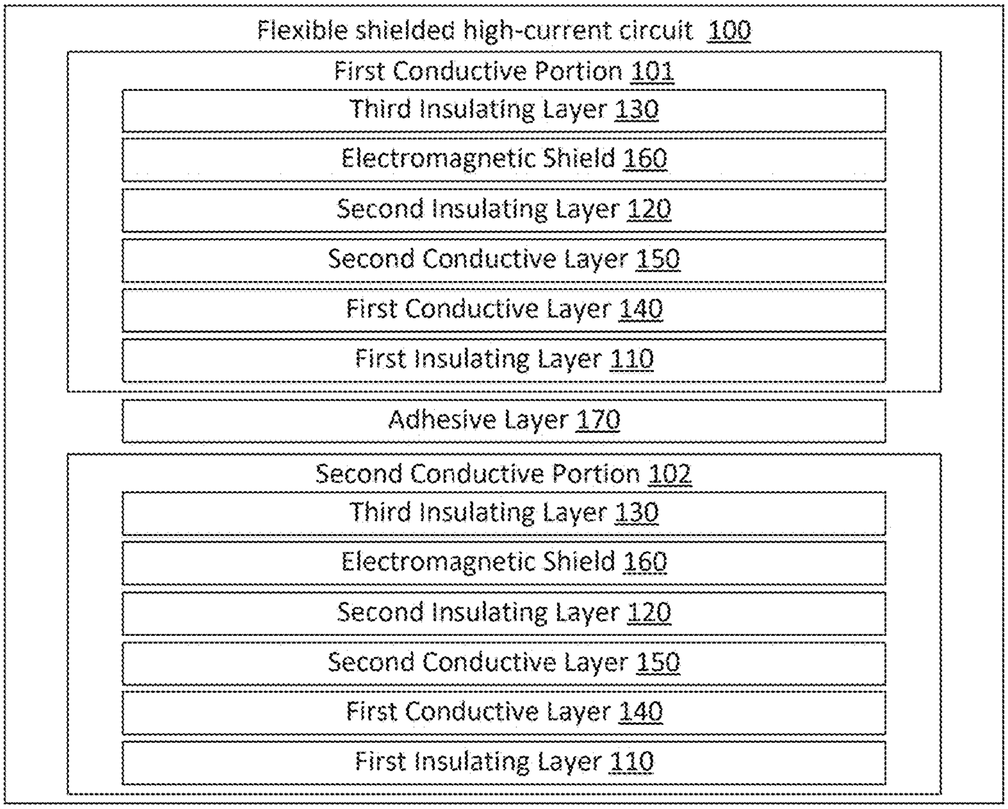
FIG. 2B is a schematic block diagram showing relationships of components of flexible shielded high-current circuit, in accordance with some examples.
Figure 3B:
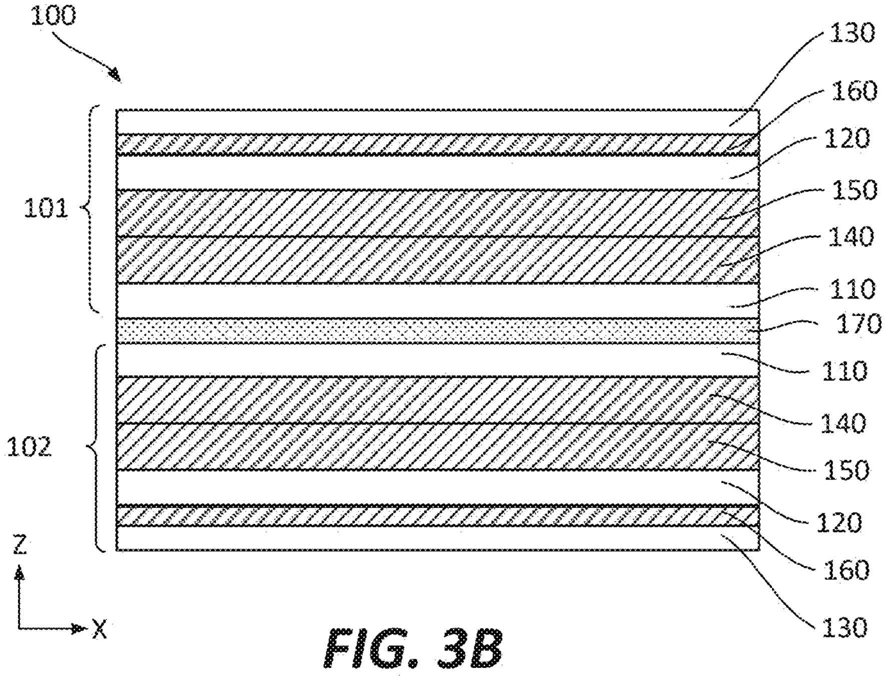
FIG. 3B is a schematic cross-sectional view of a flexible shielded high-current circuit comprising two stacks of conducting layers, in accordance with some examples.

In some examples, the flexible shielded high-current circuit 100 has a thickness of less than 10 millimeters, less than 7.5 millimeters, less than 5 millimeters, or even less than 3 millimeters. FIG. 2B is a schematic block diagram showing relationships of components of flexible shielded high-current circuit 100, in accordance with some examples. FIG. 3B is a schematic cross-sectional view of a flexible shielded high-current circuit comprising two stacks of conducting layers, in accordance with some examples. Referring to FIG. 2A, FIG. 2B, and FIG. 3B, in some examples, flexible shielded high-current circuit 100 comprises a first circuit portion 101, a second circuit portion 102, and an adhesive layer 170. As shown in FIG. 2A, the first circuit portion 101, the second circuit portion 102, and the adhesive layer 170 are stacked along the stacking axis 109. Each of the first circuit portion 101 and the second circuit portion 102 comprises the first insulating layer 110, the second insulating layer 120, the third insulating layer 130, the first conductive layer 140, the second conductive layer 150, and the electromagnetic shield 160. The adhesive layer 170 is positioned between and directly interfaces the first insulating layer 110 of the first circuit portion 101 and the first insulating layer 110 of the second circuit portion 102. The adhesive layer 170 attaches the first circuit portion 101 to the second circuit portion 102. In some further examples, the conductive layers of the first circuit portion 101 are electrically isolated from the conductive layers of the second circuit portion 102. The electrical isolation allows for each one of the conductive portions to serve as a separate electrical conductor. For example, one of the conductive portions may serve as a positive conductor and the other conductive portion may serve as a negative conductor in a direct current electrical circuit. In another example, one of the conductive portions may serve as a hot or energized conductor and the other conductive portion may serve as a ground conductor in an alternating current circuit. In other further examples, the conductive layers of the first circuit portion 101 are electrically coupled with the conductive layers of the second circuit portion 102.

In some examples, the flexible shielded high-current circuit 100 comprises a first circuit portion 101, an adhesive layer 170, and a second circuit portion 102, but either one of the first circuit portion 101 and the second circuit portion 102 does not comprise an electromagnetic shield 160. In some further examples, the first circuit portion 101 or the second circuit portion 102 that does not comprise an electromagnetic shield 160 may also not comprise a third insulating layer 130.

Examples of Conductive Layers

In some examples, as shown in FIG. 3A, the first circuit portion 101 of the flexible shielded high-current circuit 100 comprises two conductive layers. In some other examples, it comprises three conductive layers. Any other number of conductive layers may be used.

In some examples, each of the first conductive layer 140 and the second conductive layer 150 comprises aluminum. In some other examples, each of the first conductive layer 140 and the second conductive layer 150 comprises copper. In some other examples, either one of the first conductive layer 140 and the second conductive layer 150 comprises copper, and the other one of the first conductive layer 140 and the second conductive layer 150 comprises aluminum. In examples comprising both a first circuit portion 101 and a second circuit portion 102, each of the first conductive layer 140 and the second conductive layer 150 of the first circuit portion 101 comprises aluminum, and each of the first conductive layer 140 and the second conductive layer 150 of the second circuit portion 102 comprises another conductive material, for example, copper.

In some examples, each of the first conductive layer 140 and the second conductive layer 150 has a thickness, measured along the stacking axis 109, of at least 400 micrometers. In some examples, each of the first conductive layer 140 and the second conductive layer 150 has a thickness of at least 200 micrometers, at least 300 micrometers, at least 400 micrometers, at least 500 micrometers, at least 750 micrometers, or even at least 900 micrometers. In some examples, the first conductive layer 140 and the second conductive layer 150 have the same thicknesses. In other examples, the first conductive layer 140 and the second conductive layer 150 have different thicknesses. In examples comprising both a first circuit portion 101 and a second circuit portion 102, the combined thicknesses of the first conductive layer 140 and the second conductive layer 150 of the first circuit portion 101 is equal to the combined thicknesses of the first conductive layer 140 and the second conductive layer 150 of the second circuit portion 102. In other examples, the combined thicknesses are different. In still other examples comprising both a first circuit portion 101 and a second circuit portion 102, the combined thicknesses are the same, but the thickness of the first conductive layer 140 of the first circuit portion 101 is different from the first conductive layer 140 of the second circuit portion 102.

In some examples, each of the first conductive layer 140 and the second conductive layer 150 is a metal foil or a metal sheet. As shown in FIG. 2A, in these examples, each of first conductive layer 140 and second conductive layer 150 has a cross-section formed by a virtual plane perpendicular to the stacking axis 109. In these examples, at least one of the cross-sections has a rectangular shape. In some further examples, each of the cross-sections has a rectangular shape. For example, either or both of the first conductive layer 140 and the second conductive layer 150 may have a width, measured in the direction of the width of the flexible shielded high-current circuit 100, of at least 50 millimeters, at least 75 millimeters, at least 100 millimeters, or even at least 150 millimeters. Either or both of the first conductive layer 140 and the second conductive layer 150 may have a thickness, measured in the direction of the thickness of the flexible shielded high-current circuit 100, of at least 0.25 millimeters, at least 0.5 millimeters, at least 1 millimeter, or even at least 20 millimeters. In some examples, each of the first conductive layer 140 and the second conductive layer 150 have a width of 75 millimeters and a thickness of 0.5 millimeters.

It is to be noted that the current carrying capacity of a conductor with a rectangular cross-section is higher than that of a conductor having a circular cross-section having the same cross-sectional area. This is because a conductor having a rectangular cross-section has a higher surface area to volume ratio than a conductor having a circular cross-section having the same cross-sectional area and length. For example, a conductor with a rectangular cross-section, a width of 75 millimeters and a height of 0.5 millimeters would have a rectangular cross-section of 37.5 millimeters squared. A conductor with a rectangular cross-section with this cross-sectional area and a length of 1 meter would have a surface area of $1.51\times10^{-1}$ meters squared and a volume of $3.75\times10^{-5}$ meters cubed. This conductor would have a surface area to volume ratio of 4027. A conductor having a circular cross-section, a cross-sectional area of 37.5 millimeters squared, and a length of 1 meter would have a surface area of $2.17\times10^{-2}$ meters squared and a volume of $3.75\times10^{-5}$ meters cubed. This conductor would have a surface area to volume ratio of 579. With a higher surface area to volume ratio, the conductor with a rectangular cross-section would be better able to dissipate heat generated during transmission of electric current. This would allow the conductor with a rectangular cross-section to carry more current for the same cross-sectional area. In other words, a smaller cross-sectional area would be required for a conductor with a rectangular cross-section than a conductor with a circular cross-section to carry the same amount of electrical current. A conductor with a smaller cross-sectional area will have a smaller weight for the same length. In addition, a conductor with a smaller cross-sectional area will be more conformable and easier to bend during installation.

Examples of Insulating Layers

Referring again to FIG. 2A, in some examples, the first insulating layer 110 and the second insulating layer 120 have a thickness measured in the direction of the stacking axis 109 of 100-400 micrometers. For example, each of the first insulating layer 110 and the second insulating layer 120 may have a thickness between 100-250 micrometers, between 150-375 micrometers, or even between 200-400 micrometers. The thicknesses of the first insulating layer 110 and the second insulating layer 120 may be chosen to provide support for the first conductive layer 140 and the second conductive layer 150. Thicknesses may also be chosen to prevent electrical shorts between conductive layers. Electrical shorts may form, for example, as a result of burrs remaining on the edges of conductive layers after patterning during manufacturing of the flexible shielded high-current circuit 100. Burrs may contact other conductive layers by, for example, puncturing through an insulating layer that is too thin, or by contacting other layers around insulating layers that do not extend past an edge of the conductive layer. Thicker insulating layers provide stronger support for the conductive layers without deforming under the weight of the conductive layers. However, thinner layers require less conductive layer material, incurring less manufacturing cost. Further, thinner layers result in a thinner overall flexible shielded high-current circuit 100, allowing more design flexibility in placement of the flexible shielded high-current circuit 100.

In some examples, the first conductive layer 140 and second conductive layer 150 are not joined along the length of the flexible shielded high-current circuit 100. In such examples, the first insulating layer 110 and second insulating layer 120 may have thickness selected to have sufficient strength to prevent the first conductive layer 140 and second conductive layer 150 from separating due to vibration forces applied by a vehicle or appliance the flexible shielded high-current circuit 100 is installed in.

In some examples, first insulating layer 110, second insulating layer 120, and third insulating layer 130 are thermoformable. Thermoformable insulating layers provide the benefit of high aspect ratio coverage of the stack 159. The insulated stack 159 may have an aspect ratio, calculated as the ratio of the width to the height, of at least 1:1, at least 2:1, at least 3:1 at least 5:1, at least 10:1, at least 30:1, or even at least 50:1. In these examples, first insulating layer 110, second insulating layer 120, and third insulating layer 130 may include (or be formed from) polyimide (PI), polyethylene naphthalate (PEN), polyethylene terephthalate (PET), polymethyl methacrylate (PMMA), ethyl vinyl acetate (EVA), polyethylene (PE), polyvinyl fluoride (PVF), polyamide (PA), and/or polyvinyl butyral (PVB), polyethylene terephthalate (PET), polymethyl methacrylate (PMMA), ethyl vinyl acetate (EVA), polyethylene (PE), polyvinyl fluoride (PVF), polyamide (PA), and/or polyvinyl butyral (PVB).

In some examples, each of the first insulating layer 110 and the second insulating layer 120 comprises polypropylene (PP). Polypropylene (PP) is relatively inexpensive compared to some other materials that may be used for insulating layers. This can lower the overall cost of materials to manufacture flexible shielded high-current circuit 100. However, polypropylene (PP) also has a relatively low surface energy compared with other materials. This low surface energy can make attaching other layers of the flexible shielded high-current circuit 100 to the first insulating layer 110 and/or the second insulating layer 120 challenging.

Figure 3C:
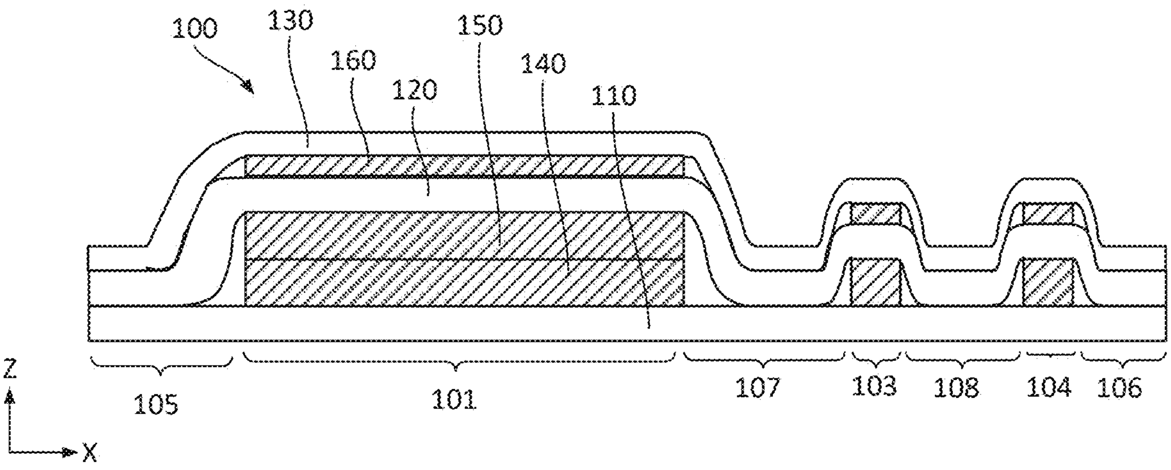
FIG. 3C is a schematic cross-sectional view of a flexible shielded high-current circuit, in accordance with some examples.
Figure 3D:
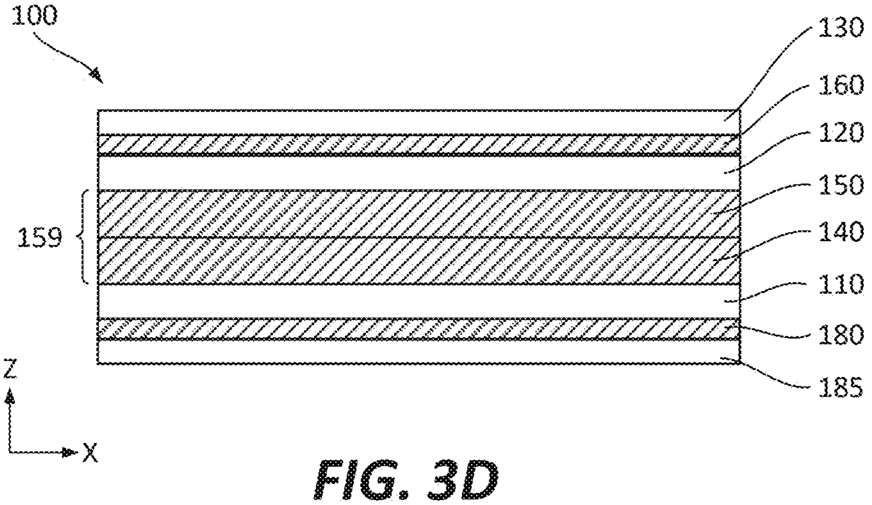
FIG. 3D is a schematic cross-sectional view of a flexible shielded high-current circuit, in accordance with some examples.
Figure 3E:
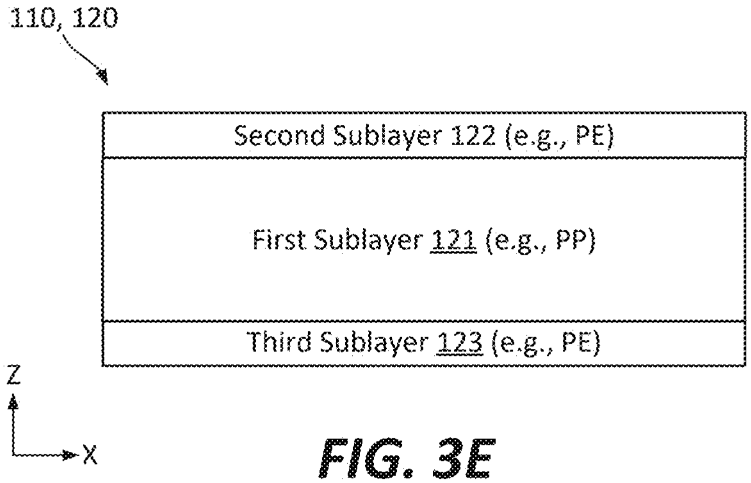
FIG. 3E is a schematic cross-sectional view of first insulating layer and/or second insulating layer, in accordance with some examples.

FIG. 3E is a schematic cross-sectional view of first insulating layer 110 and/or second insulating layer 120, in accordance with some examples. In these examples, each of the first insulating layer 110 and the second insulating layer 120 further comprises a different polymer material having a higher surface energy. In some examples, the second sublayer 122 comprises polyethylene (PE). The propylene (PP) forms a first sublayer 121, while the polyethylene (PE) forms a second sublayer 122 directly interfacing the first sublayer 121. The polyethylene (PE) is attached to the propylene (PP). In some further examples, the polyethylene (PE) of each of the first insulating layer 110 and the second insulating layer 120 further forms a third sublayer directly interfacing the first sublayer such that the first sublayer is positioned between the second sublayer and the third sublayer. In some further examples, the polyethylene (PE) forms a third sublayer 123 directly interfacing the first sublayer 121 and opposite the second sublayer 122. In some other examples, the second sublayer 122 comprises a polyurethane (PU) or a polyamide (PA). In some other examples, the second sublayer 122 comprises a non-conductive adhesive selected from the list comprising an epoxy, an acrylate, and a polyester.

Polyethylene (PE) and polyethylene terephthalate (PET) have higher surface energies than polypropylene (PP) and are less challenging to bond to the conductive layer and to other second sublayer 122 and third sublayer 123 layers. The second sublayer 122 and third sublayer 123 operate as binders to adhere to the conductive layers. They also provide improved bonding of two insulating layers to adhere to each other directly, for example, at edges of flexible shielded high-current circuit 100.

In some examples, the third insulating layer 130 may comprise fire retardants. In some further examples, more than one insulating layer may comprise fire retardants. In some yet further examples, each of the insulating layers may comprise fire retardants.

In some examples, the first sublayer 121 has a larger thickness, measured in the direction of the stacking axis 109, than each of the second sublayer 122 and the third sublayer 123. For example, the first sublayer 121 may have a thickness three times, five times, six times, or even 10 times the thickness of each of the second sublayer 122 and the third sublayer 123. Increasing the thickness of the first sublayer 121 while decreasing the thickness of the second sublayer 122 and, where present, the third sublayer 123, increases the amount of lower-cost polypropylene (PP) used to manufacture the flexible shielded high-current circuit 100.

In some examples comprising a third sublayer 123, the third sublayer 123 is formed from a polyethylene terephthalate (PET). In some further examples, the third sublayer 123 has a thickness measured in the direction of the stacking axis 109 of between 20-150 micrometers. For example, the third sublayer 123 may have a thickness of between 20-80 micrometers, between 40-100 micrometers, or even between 50-150 micrometers.

Referring again to FIG. 2A, in some examples, where insulating layers extend beyond the conductive layers along the width of the flexible shielded high-current circuit 100, insulating layers may adhere to other insulating layers. As shown in the example of FIG. 2A, the first insulating layer 110 adheres to the second insulating layer 120, and the second insulating layer 120 adheres to the third insulating layer 130. In this way, the insulating layers may form a seal around the stack 159. The seal may prevent unwanted contact with the stack 159 and may also prevent intrusion of moisture, water, and oxidizing gases into the flexible shielded high-current circuit 100, wherein the first sublayer has a larger thickness than each of the second sublayer and the third sublayer.

FIG. 3C is a schematic cross-sectional view of a flexible shielded high-current circuit 100, in accordance with some examples. The example flexible shielded high-current circuit 100 shown in FIG. 3C comprises a first circuit portion 101 and a third conductive portion 103. The third conductive portion 103 is offset relative to the first circuit portion 101 in a direction substantially perpendicular to the stacking axis 109. The first circuit portion 101 comprises the first insulating layer 110, the second insulating layer 120, the third insulating layer 130, the first conductive layer 140, the second conductive layer 150, and the electromagnetic shield 160. The third conductive portion 103 comprises the first insulating layer 110, the second insulating layer 120, the third insulating layer 130, the first conductive layer 140, electromagnetic shield 160. The first insulating layer 110 is stacked between the first insulating layer 110 and the second insulating layer 120 and directly interfaces the first insulating layer 110 and the second insulating layer 120. The flexible shielded high-current circuit 100 in FIG. 3C further comprises an intermediate portion 107 positioned between the first circuit portion 101 and the third conductive portion 103 in the direction substantially perpendicular to the stacking axis 109. The intermediate portion 107 comprises the first insulating layer 110, the second insulating layer 120, and the third insulating layer 130, such that the second insulating layer 120 is stacked between and directly interfaces both the first insulating layer 110 and the third insulating layer 130. Both the intermediate portion 107 and the third conductive portion 103 are positioned between the first edge portion 105 and the second edge portion 106 along the direction substantially perpendicular to the stacking axis 109.

In some further examples, as illustrated in FIG. 3C, the flexible shielded high-current circuit 100 further comprises an additional intermediate portion 108 and a fourth conductive portion 104. When present, the fourth conductive portion 104 is offset relative to the third conductive portion 103 in a direction parallel to the direction the third insulating layer 130 is offset from the first circuit portion 101. The fourth conductive portion 104 is positioned between the third conductive portion 103 and the second edge portion 106. The fourth conductive portion 104 comprises the first insulating layer 110, the second insulating layer 120, the third insulating layer 130, the first conductive layer 140, and the electromagnetic shield 160, in the same relative positions as described above for the third conductive portion 103. When the fourth conductive portion 104 is present, the additional intermediate portion 108 is positioned between the third conductive portion 103 and the fourth conductive portion 104.

In some examples, each of the first insulating layer 110 and the second insulating layer 120 are thermally formed around the stack 159.

Examples of Shield Layers

Returning to FIG. 2A, in some examples, the electromagnetic shield 160 is a metal sheet having a thickness, measured along the stacking axis 109, of 20-150 micrometers. For example, the thickness may be between 20-100 micrometers, between 30-125 micrometers, or even between 50-150 micrometers. In some examples, the electromagnetic shield 160 extends in a direction along the width of the flexible shielded high-current circuit 100 the same distance as the stack 159. In some of these examples, a projection of the electromagnetic shield 160 in a direction parallel with the stacking axis 109 overlaps with a projection of the stack 159. In some other of these examples, a projection of the electromagnetic shield 160 aligns with a projection of the stack 159. In some other examples, the electromagnetic shield 160 extends in a direction along the width of the flexible shielded high-current circuit 100 a distance greater than the stack 159 extends in the same direction. In these examples, a projection of the electromagnetic shield 160 in a direction parallel with the stacking axis 109 overlaps with a projection of the stack 159. In some examples, the metal sheet of the electromagnetic shield 160 is formed from aluminum.

FIG. 3D is a schematic cross-sectional view of a flexible shielded high-current circuit 100, in accordance with some examples. In the example shown in FIG. 3D, the flexible shielded high-current circuit 100 comprises a first insulating layer 110, a first conductive layer 140, a second conductive layer 150, a second insulating layer 120, an electromagnetic shield 160, and a third insulating layer 130. Further, the flexible shielded high-current circuit 100 comprises an additional electromagnetic shield 180 and a fourth insulating layer 185. The additional electromagnetic shield 180 is positioned between the first insulating layer 110 and the fourth insulating layer 185.

Shield layers may provide benefits when the flexible shielded high-current circuit 100 is carrying either direct current or alternating current. When the flexible shielded high-current circuit 100 is carrying direct current, as in, for example, the transfer of electricity from a battery assembly to an electric motor in an electric vehicle, the current carried varies. For example, the current carried may increase and decrease relatively quickly during operation of the electric vehicle. Rapid increases and/or decreases of electrical current, or current spikes, may cause electromagnetic emission from current-carrying harnesses. These emissions, if the harnesses are not shielded, may produce electrical noise that interferes with other systems of the vehicle, or other systems in the vicinity. As the current increases, the intensity of the noise may increase. When the flexible shielded high-current circuit 100 is carrying alternating current, as in, for example, the transfer of electricity from an inverter to an accessory, the current-carrying harness may emit electrical noise at the frequency of the alternating current. The intensity of this noise, also, may increase with current. It is to be noted that lower frequency alternating current, for example alternating at a frequency of 60 Hertz, or spikes in DC current, may require thicker shield layers to provide sufficient shielding than higher frequencies.

In some examples, the flexible shielded high-current circuit 100 comprises one electromagnetic shield 160. In these examples, the flexible shielded high-current circuit 100 may be affixed to a metal panel of, for example, a vehicle or an appliance. In these examples, the metal panel may provide electromagnetic shielding. In some examples, the flexible shielded high-current circuit 100 does not comprise an electromagnetic shield 160.

Examples of Lamella Contacts

Figure 4A:
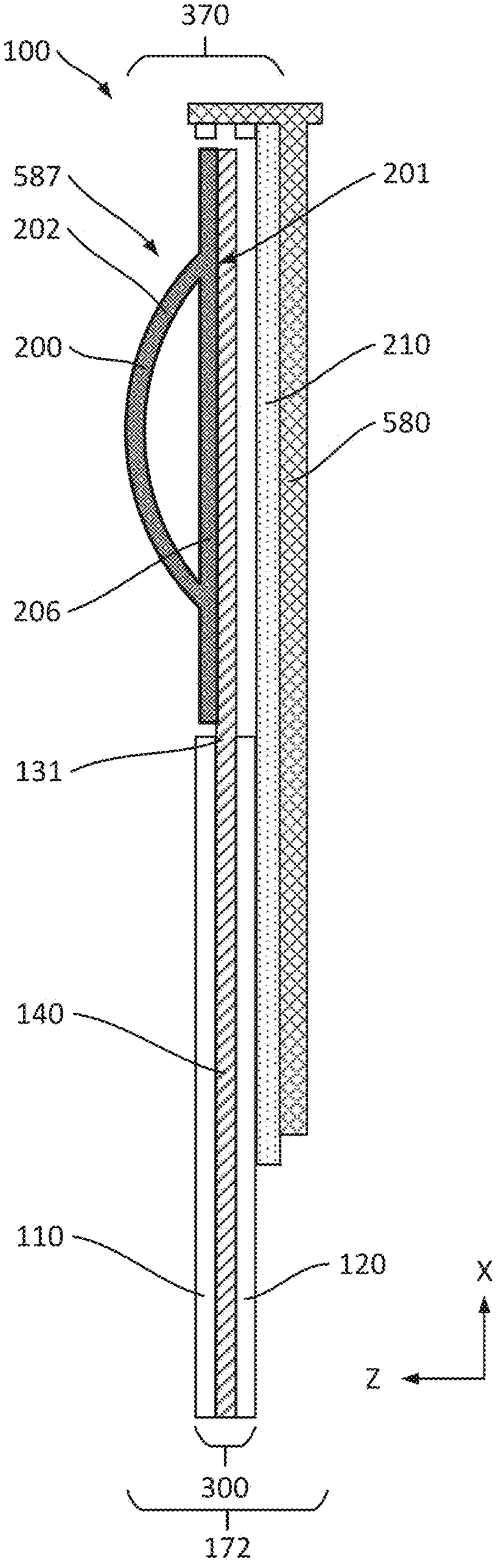
FIG. 4A is a schematic cross-sectional view of a flexible shielded high-current circuit, in accordance with some examples.

FIG. 4A is a schematic cross-sectional view of a flexible shielded high-current circuit 100, in accordance with some examples. The flexible shielded high-current circuit 100 comprises a first insulating layer 110, a second insulating layer 120, a first conductive layer 140, a lamella contact 200, a stiffening unit 210, and a connector carrier 580. The first insulating layer 110, the first conductive layer 140, and the second insulating layer 120 are stacked such that the first conductive layer 140 is positioned between the first insulating layer 110 and the second insulating layer 120 to form a wire 300. The first conductive layer 140 has a plane perpendicular to the direction in which the first insulating layer 110, first conductive layer 140 and second insulating layer 120 are stacked. In FIG. 4A, this plane is parallel with the X-Y plane. The first conductive layer 140 at least partially protrudes between the first insulating layer 110 and the second insulating layer 120. The first conductive layer 140 comprises a trace contact portion 131 extending past at least one of the first insulating layer 110 and the second insulating layer 120. In some examples, trace contact portion 131 extends past both the first insulating layer 110 and the second insulating layer 120. In some specific examples, a portion of trace contact portion 131 extends past both the first insulating layer 110 and the second insulating layer 120. In other words, a portion of material of the first insulating layer 110 may not be present and a portion of the second insulating layer 120 may not be present, thereby forming windows in the first insulating layer 110 and the second insulating layer 120 past which a portion of the trace contact portion 131 may extend. In some examples, the first conductive layer 140 comprises aluminum.

The first insulating layer 110 and the second insulating layer 120 provide electrical isolation and mechanical support to the first conductive layer 140. In some examples, first insulating layer 110 and second insulating layer 120 may include (or be formed from) polyimide (PI), polyethylene naphthalate (PEN), Polyethylene terephthalate (PET), polymethyl methacrylate (PMMA), ethyl vinyl acetate (EVA), polyethylene (PE), polyvinyl fluoride (PVF), polyamide (PA), and/or polyvinyl butyral (PVB). Additional aspects (e.g., thicknesses) of first insulating layer 110 and second insulating layer 120 are described below.

The thickness of one or both first insulating layer 110 and second insulating layer 120 may be between 1 micrometer and 500 micrometers or, more specifically, between 10 micrometers and 125 micrometers. In some examples, each of first insulating layer 110 and second insulating layer 120 includes an adhesive sublayer facing conductive traces, e.g., for lamination to conductive traces and also to each other. These adhesive sublayers may be also used for directly laminating first insulating layer 110 and second insulating layer 120 (beyond the conductive layer boundaries), e.g., for edge sealing of flexible shielded high-current circuit 100. In some examples, the surface of first insulating layer 110 and/or second insulating layer 120 (e.g., the surface facing away from conductive traces) comprises an adhesive sublayer for bonding this insulating layer to an external structure (e.g., a supporting panel). First insulating layer 110 and second insulating layer 120 provide the electrical isolation and mechanical support to conductive traces. Additional aspects (e.g., materials) of first insulating layer 110 and second insulating layer 120 are described elsewhere in this document. Furthermore, additional aspects of first conductive layers 140 or, more generally, conductive traces formed by these traces are described elsewhere in this document (e.g., uniform thickness, materials, surface sublayers).

Figure 4B:
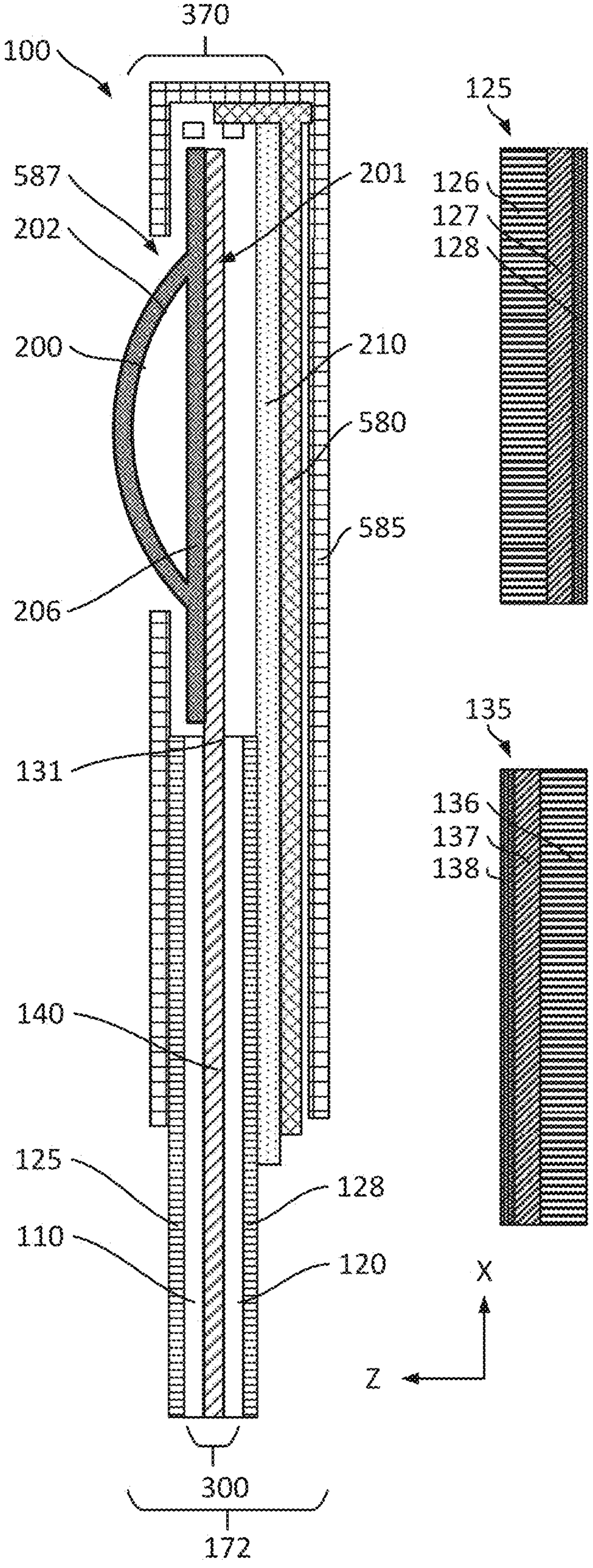
FIG. 4B is a cross-sectional view of a flexible shielded high-current circuit comprising a shield enclosure, a first shield layer, and a second shield layer, in accordance with some examples.
Figure 4C:
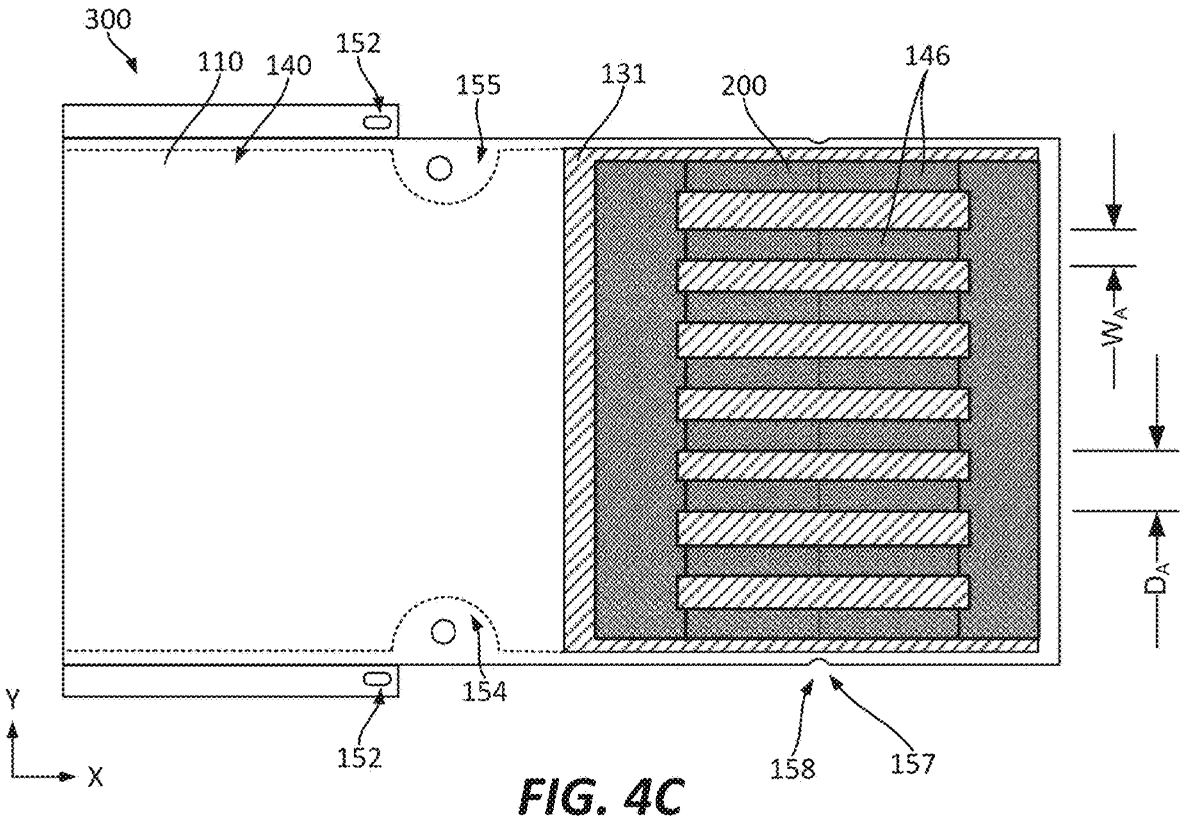
FIG. 4C is a schematic bottom view of the wire, in accordance with some examples.

FIG. 4C is a schematic bottom view of the wire 300, in accordance with some examples. Shown in FIG. 4C, the lamella contact 200 comprises a base portion 206 and a spring portion 202. The spring portion 202 is monolithic with the base portion 206. In some examples, the spring portion 202 comprises a plurality of arch portions 146, extending parallel to each other and arching over the base portion 206. The base portion 206 directly interfaces and is mechanically attached and electrically connected to the trace contact portion 131, forming a trace-contact interface 201. The spring portion 202 is configured to flex relative to the base portion 206 at least in a direction substantially perpendicular to the trace-contact interface 201. In some examples, the base portion 206 is welded to trace contact portion 131 with one of an ultrasonic weld, a spot weld, and a laser weld. Specifically, in some examples, the base portion 206 is laser welded to trace contact portion 131.

In some examples, each arch portion of the plurality of arch portions 146 has a width measured in the plane of the first conductive layer 140 of $W_A$. $W_A$ is illustrated in FIG. 4C. In some examples, the arch portions of the plurality of arch portions 146 are arrayed with a pitch distance measured in the plane of the first conductive layer 140 of $D_A$. $D_A$ is also illustrated in FIG. 4C. In some examples, $W_A$ is between 0.5 and 5 millimeters, between 1 and 2 millimeters, or even between 1.3 and 1.5 millimeters. In some examples, $D_A$ is between 1 and 5 millimeters, between 1.75 and 3 millimeters, or even between 2 and 2.5 millimeters. In some other examples, the arch portions of the plurality of arch portions 146 are not arrayed with a pitch distance, and the openings of the first plurality of cover openings 562 are not arrayed with a pitch distance. In other words, in these other examples, the width of each one of the plurality of arch portions 146 is not equal, and the spacing between each one of the plurality of arch portions 146 is not regular.

In some examples, the lamella contact 200 comprises a steel core and a surface layer formed from another metal. For example, the surface layer may be formed from one or more of copper, tin, and silver. Specifically, the surface layer may be formed from an inner layer of copper, adjacent to the steel core, and an outer layer of tin, adjacent to the copper layer. In other examples, the lamella contact 200 comprises a core comprising a copper alloy and a surface layer formed from another metal. For example, the surface layer may be formed from one or more of tin and silver.

Figure 4D:
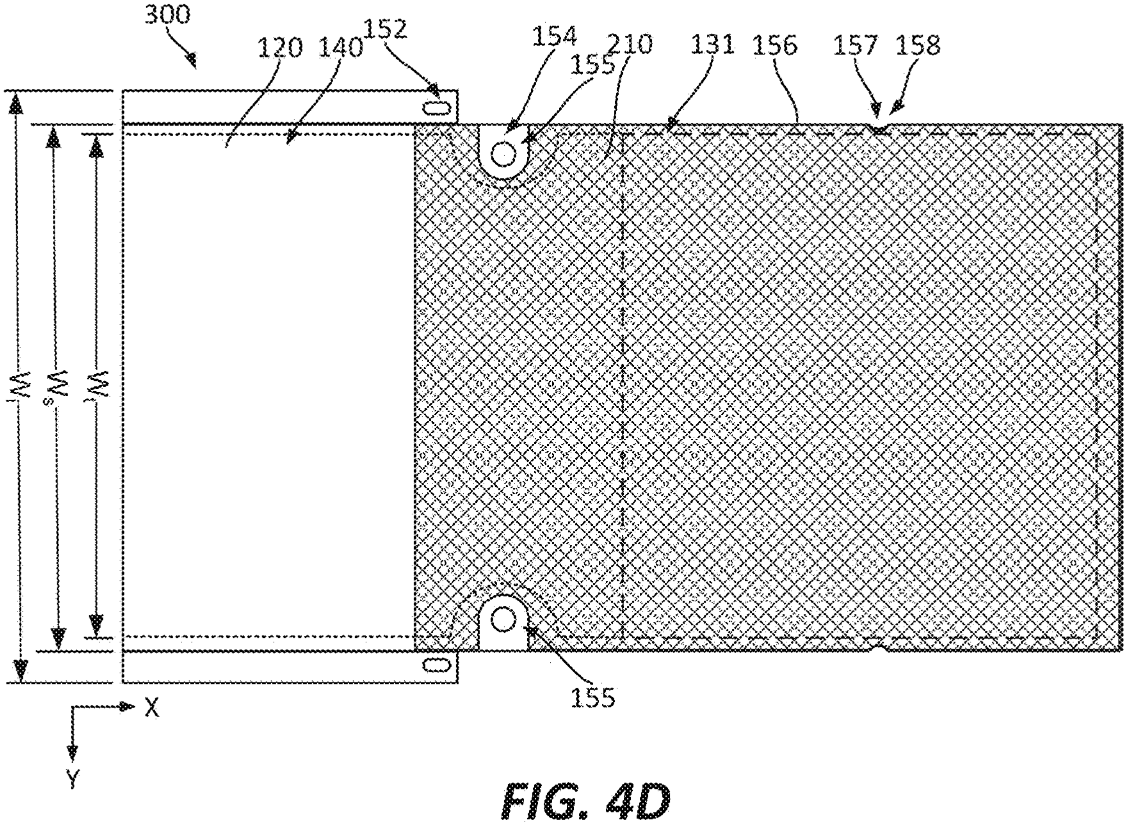
FIG. 4D is a schematic top view of the wire and the stiffening unit, illustrating the relationships between some of the components, in accordance with some examples.

FIG. 4D is a schematic top view of the wire 300 and the stiffening unit 210, illustrating the relationships between some of the components, in accordance with some examples. As shown in FIG. 4A, the stiffening unit 210 is positioned such that the trace contact portion 131 is positioned between the stiffening unit 210 and the base portion 206. In FIG. 4D, the trace contact portion 131 is obscured by the stiffening unit 210 and is represented by a dashed outline. The first conductive layer 140 and the lamella contact 200 each have widths in the plane and thicknesses in a direction not in the plane. The wire 300 has a width $W_i$ measured in the plane of the first conductive layer 140. The second insulating layer 120 has width $W_s$ measured in the same plane and direction as $W_i$ and in a portion of second insulating layer 120 directly interfacing stiffening unit 210. The first conductive layer 140 has a width $W_t$ measured in the same plane and direction as $W_i$. In some examples, $W_i$ is greater than $W_s$, and $W_s$ is greater than $W_t$. The widths and thicknesses may be selected to be sufficient to support transmission of large currents without excessive resistive heating.

In some examples, the stiffening unit 210 directly interfaces and is mechanically attached to the second insulating layer 120. In some examples, the stiffening unit 210 directly interfaces and is mechanically attached to the second insulating layer 120 with an adhesive. Specifically, the adhesive may be a pressure-sensitive adhesive (PSA). In some examples, the stiffening unit 210 has a thickness measured perpendicular to the plane of first conductive layer 140 of at least 1 millimeter, at least 2 millimeters, at least 3 millimeters, at least 4 millimeters, or even at least 8 millimeters. In some examples, the stiffening unit 210 has a thickness less than 5 millimeters, less than 3.5 millimeters, less than 2.5 millimeters, or even less than 1.5 millimeters. In some examples, the stiffening unit 210 is formed from a non-conductive material that is either a polycarbonate or a composite comprising a fiberglass cloth and an epoxy resin. Specifically, the stiffening unit 210 may be formed from FR-4. It is to be noted that the distance of the lamella contact 200 from the connector carrier 580 in a direction perpendicular to the plane of the first conductive layer 140 will vary with the thickness of the components positioned between the trace-contact interface 201 and the connector carrier 580. Importantly, if the thickness of the first conductive layer 140 is varied, the thickness of the stiffening unit 210 may be oppositely varied such that the distance of the lamella contact 200 from the connector carrier 580 is unchanged. Advantageously, choosing a stiffening units 210 of thicknesses that complement the thicknesses of first conductive layers 140 may allow connection of wires 300 with varying current capacities to the same components without changing their physical dimensions (i.e. to accommodate a different lamella contact 200 dimension).

The connector carrier 580 is stacked with the stiffening unit 210 and the second insulating layer 120 such that the stiffening unit 210 is positioned between the second insulating layer 120 and the connector carrier 580. In some examples, the connector carrier 580 may formed from a plastic material. For example, the connector carrier 580 may be formed from a material selected from the list consisting of acrylonitrile butadiene styrene (ABS), nylon, polycarbonate (PC), polystyrene (PS), and polyethylene (PE).

In some examples, the stiffening unit 210 has an edge 156 comprising a first alignment notch 157 having a shape. The first alignment notch 157 passes through the stiffening unit 210 in a direction perpendicular to the plane of the first conductive layer 140. The connector carrier 580 comprises at least one stiffener alignment protrusion 183 having a shape in the plane of the first conductive layer 140. The shape of the first alignment notch 157 corresponds with the shape of the at least one stiffener alignment protrusion 183. The first alignment notch 157 aligns with the at least one stiffener alignment protrusion 183 when the connector carrier 580 is stacked with the stiffening unit 210 and the second insulating layer 120. In this way, the alignment of the first alignment notch 157 with the at least one stiffener alignment protrusion 183 provides positive alignment of the wire 300 with the connector carrier 580. In other examples, the connector carrier 580 may comprise additional stiffener alignment protrusions that align with additional alignment notches on the same or other edges of the stiffening unit 210. The first insulating layer 110 and the second insulating layer 120 may have edges that align with the edge 156 of the stiffening unit 210. In some examples, the flexible shielded high-current circuit 100 and or the second insulating layer 120 may also comprise a second alignment notch 158 having a shape. In these examples, the shape of the second alignment notch 158 may be the same shape as the first alignment notch 157 or another shape. The shape of the second alignment notch 158 may be such that it does not interfere with the alignment of the first alignment notch 157 and the at least one stiffener alignment protrusion 183.

In some examples, the first conductive layer 140 has a thickness of at least 100 micrometers, at least 300 micrometers, at least 500 micrometers, or even at least 800 micrometers. With such a large thickness of first conductive layer 140, flexible shielded high-current circuit 100 can be used for various high-current applications, for example, carrying current from vehicle battery packs to drive motors. In some examples, first conductive layer 140 is formed from aluminum, copper, and the like. In some examples, first conductive layer 140 is more than one trace. In these examples, each trace is mechanically attached and electrically connected to the base portion 206. $W_t$ is then measured as the greatest distance in the plane of the first conductive layer 140 between edges of the two most separated traces.

In some examples, first conductive layer 140 has a uniform thickness throughout the entire first conductive layer 140. For example, first conductive layers 140 can be formed from the same sheet of metal. More specifically, different (disjoint) portions of first conductive layer 140 can be formed from the same sheet of metal. In some examples, all first conductive layers 140 are formed from the same material, e.g., aluminum, copper, or the like. The use of aluminum (instead of copper) may help with lowering the overall circuit weight. Specifically, aluminum has a higher resistivity than copper. In general, first conductive layer 140 may be formed from any conductive material that is sufficiently conductive (e.g., a conductivity being greater than 10^6 S/m or even greater than 10^7 S/m to allow for current flow through the foil with low power loss.

In some examples, each of the first conductive layer 140 and the lamella contact 200 has a current rating of 20-600 Amps. In some examples, each of the first conductive layer 140 and the lamella contact 200 has a current rating of greater than 10 Amps, greater than 30 Amps, greater than 60 Amps, greater than 100 Amps, or even greater than 125 Amps. In some examples, each of the first conductive layer 140 and the lamella contact 200 has a current rating less than 150 Amps, less than 120 Amps, less than 50 Amps, or even less than 25 Amps.

In some examples, first conductive layer 140 may include a surface sublayer or coating for providing a low electrical contact resistance and/or improving corrosion resistance. The surface sublayer may assist with forming electrical interconnections using techniques/materials including, but not limited to, soldering, laser welding, resistance welding, ultrasonic welding, bonding with conductive adhesive, or mechanical pressure. Surface sublayers that may provide a suitable surface for these connection methods include, but are not limited to, tin, lead, zinc, nickel, silver, palladium, platinum, gold, indium, tungsten, molybdenum, chrome, copper, alloys thereof, organic solderability preservative (OSP), or other electrically conductive materials. Furthermore, the surface sublayer may be sputtered, plated, cold-welded, or applied via other means. In some examples, the thickness of the surface sublayer may range from 0.5 micrometers to 10 micrometers or, more specifically, from 0.1 micrometers to 2.5 micrometers. Furthermore, in some examples, the addition of a coating of the OSP on top of the surface sublayer may help prevent the surface sublayer itself from oxidizing over time. The surface sublayer may be used when a base sublayer of first conductive layers 140 includes aluminum or its alloys. Without protection, exposed surfaces of aluminum tend to form a native oxide, which is insulating. The oxide readily forms in the presence of oxygen or moisture. To provide a long-term stable surface in this case, the surface sublayer may be resistant to the in-diffusion of oxygen and/or moisture. For example, zinc, silver, tin, copper, nickel, chrome, or gold plating may be used as surface layers on an aluminum-containing base layer.

Figure 5A:
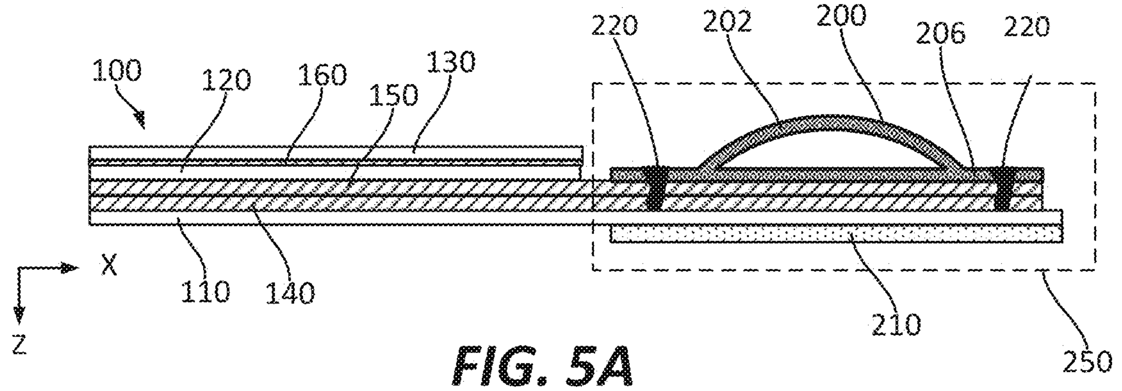
FIG. 5A is a schematic cross-sectional view of a flexible shielded high-current circuit, in accordance with some examples.

FIG. 5A is a schematic cross-sectional view of a flexible shielded high-current circuit 100, in accordance with some examples. The flexible shielded high-current circuit 100 comprises a first insulating layer 110, a second insulating layer 120, a third insulating layer 130, a first conductive layer 140, and a second conductive layer 150, examples of which have been described in detail above. As shown in FIG. 5A, the first conductive layer 140 and the second conductive layer 150 at least partially protrude between the first insulating layer 110 and the second insulating layer 120. The flexible shielded high-current circuit 100 further comprises a lamella contact 200 directly interfacing and welded to the second conductive layer 150 defined by a weld 220. In some further examples, the lamella contact 200 is stacked along the stacking axis 109 with both the first conductive layer 140 and the second conductive layer 150.

In some examples, the first conductive layer 140 and the second conductive layer 150 extend past at least one of the first insulating layer 110 and the second insulating layer 120. For example, in the example of FIG. 5A, they extend past the second insulating layer 120. In some other examples, the first conductive layer 140 and the second conductive layer 150 extend past both the first insulating layer 110 and the second insulating layer 120.

Figure 5B:
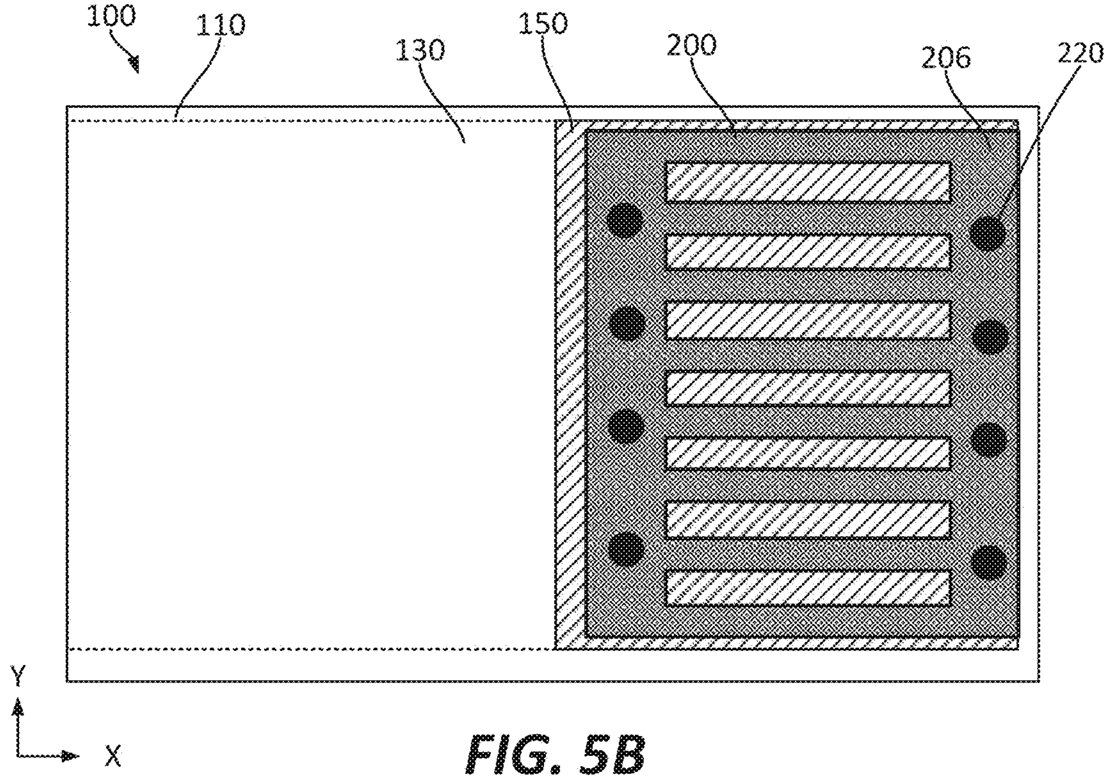
FIG. 5B is a schematic bottom view of the flexible shielded high-current circuit, illustrating the relationship between some of the components, in accordance with some examples.

Shown in FIG. 5A, the lamella contact 200 comprises a base portion 206 and a spring portion 202. The spring portion 202 is monolithic with the base portion 206. In some examples, the spring portion 202 comprises a plurality of arch portions, extending parallel to each other and arching over the base portion 206. The base portion 206 directly interfaces and is mechanically attached and electrically connected to the first conductive layer 140. The spring portion 202 is configured to flex relative to the base portion 206 in a direction at least substantially parallel with the stacking axis 109. FIG. 5B is a schematic bottom view of the flexible shielded high-current circuit 100, illustrating the relationship between some of the components, in accordance with some examples.

In some examples, the base portion 206 is welded to the first conductive layer 140 with one of an ultrasonic weld, a spot weld, and a laser weld. In some examples, the weld 220 extends through each of the lamella contact 200, the first conductive layer 140, and the second conductive layer 150, thereby electrically interconnecting the lamella contact 200, the first conductive layer 140, and the second conductive layer 150. In these examples, electrical current transmitted to lamella contact 200 for transmission along flexible shielded high-current circuit 100 will be divided between first conductive layer 140 and second conductive layer 150. Lamella contact 200 enables forming electrical contacts in various applications with various components, e.g., battery packs, charging ports, inverters, printed circuit board (PCB) pads, or other devices and circuits. Flexible shielded high-current circuit 100 is flat and exposure of lamella contact 200 allows a direct and maintained contact with such connected components.

The dimensions of the lamella contact 200 depend on the current rating of the flexible shielded high-current circuit 100, with greater thicknesses chosen at higher current ratings.

Figure 5C:
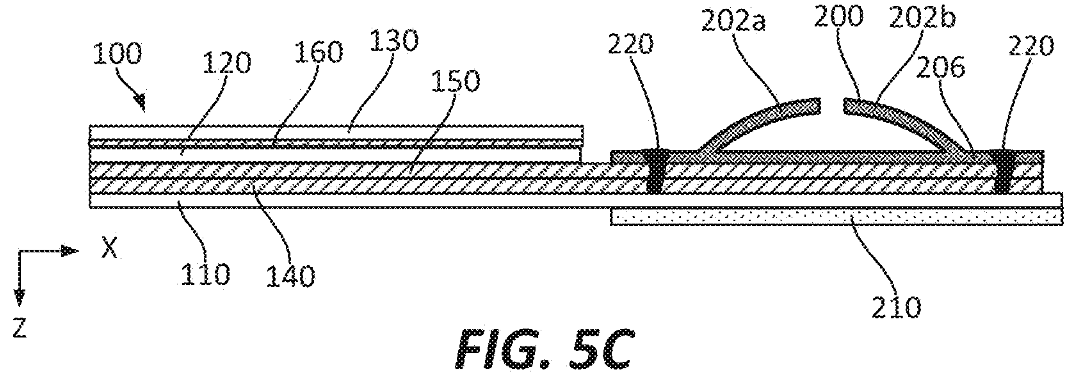
FIG. 5C is a schematic cross-sectional view of a flexible shielded high-current circuit, in accordance with some examples.

In some examples, the spring portion 202 of the lamella contact 200 comprises a first sub-arch spring portion 202*a* and a second sub-arc spring portion 202*b*. FIG. 5C is a schematic cross-sectional view of a flexible shielded high-current circuit 100, in accordance with some examples. As illustrated in FIG. 5C, in these examples, a first end of each of the first sub-arch spring portion 202*a* and second sub-arc spring portion 202*b* is monolithic with the base portion 206. However, the second ends of the first sub-arch spring portion 202*a* and the second sub-arc spring portion 202*b* which are opposite of the first ends, are separated by a gap and do not contact one another. The lamella contact 200 may comprise two, more than two, more than four, more than eight, more than 20, or even more than 40 sub-arch spring portions. A lamella contact 200 comprising a first sub-arch spring portion 202*a* and a second sub-arc spring portion 202*b* may provide several benefits. Such examples may enhance flexibility of the lamella contact 200 and thereby lower an insertion force to connect the flexible shielded high-current circuit 100 with an external connector, compared with other examples of lamella contact 200 described above. In addition, these examples may be less likely to collapse due to deformation caused by a high insertion force. By not collapsing, the pair of sub-arch springs better maintains application of force parallel with the stacking axis 109.

In some examples, the lamella contact 200 comprises a steel core and a surface layer formed from another metal. For example, the surface layer may be formed from one or more of copper, tin, and silver. Specifically, the surface layer may be formed from an inner layer of copper, adjacent to the steel core, and an outer layer of tin, adjacent to the copper layer. In other examples, the lamella contact 200 comprises a core comprising a copper alloy and a surface layer formed from another metal. For example, the surface layer may be formed from one or more of tin and silver.

In some examples, the flexible shielded high-current circuit 100 further comprises a stiffening unit 210. The stiffening unit 210 may be used to add strength to the flexible shielded high-current circuit 100 as a whole. As shown in FIG. 5A, when present, the stiffening unit 210 is positioned such that the first conductive layer 140 and the second conductive layer 150 are positioned between the base portion 206 and the stiffening unit 210. In some examples, the stiffening unit 210 directly interfaces and is mechanically attached to the first insulating layer 110. In some examples, the stiffening unit 210 is mechanically attached to the first insulating layer 110 with an adhesive. Specifically, the adhesive may be a pressure-sensitive adhesive (PSA). In some examples, the stiffening unit 210 has a thickness measured in the direction of the stacking axis 109 of at least 1 millimeter, at least 2 millimeters, at least 3 millimeters, at least 4 millimeters, or even at least 8 millimeters. In some examples, the stiffening unit 210 has a thickness less than 5 millimeters, less than 3.5 millimeters, less than 2.5 millimeters, or even less than 1.5 millimeters. In some examples, the stiffening unit 210 is formed from a non-conductive material that is either a polycarbonate or a composite comprising a fiberglass cloth and an epoxy resin. Specifically, the stiffening unit 210 may be formed from FR-4. Advantageously, choosing a stiffening unit 210 of thicknesses that complement the thicknesses of first conductive layer 140 and second conductive layer 150 may allow connection of flexible shielded high-current circuit 100 with varying current capacities to the same components without changing their physical dimensions (i.e. to accommodate a different lamella contact 200 dimension). In some examples, stiffening unit 210 can be adhered to (e.g., using a pressure-sensitive adhesive (PSA) or otherwise attached directly to first conductive layer 140 (with no separate insulator present in between) and can be operable as an insulator for first conductive layer 140.

Examples of Shield Enclosures

In some examples, the flexible shielded high-current circuit 100 further comprises a shield enclosure 585, a first shield layer 125, and a second shield layer 135. FIG. 4B is a cross-sectional view of a flexible shielded high-current circuit 100 comprising a shield enclosure 585, a first shield layer 125, and a second shield layer 135, in accordance with some examples. The shield enclosure 585 is formed from a conductive material and has shield enclosure opening 587. For example, the shield enclosure 585 may be formed from one or more of tin, tin-plated brass, tin-plated steel, aluminum, an aluminum alloy, copper, or a copper alloy. In some examples, the conductive material of the shield enclosure 585 is copper. The first shield layer 125 comprises a first shield layer insulator 126, a first shield layer conductor 127, and a first shield layer adhesive 128. The second shield layer 135 comprises a second shield layer insulator 136, a second shield layer conductor 137, and a second shield layer adhesive 138. The first shield layer insulator 126 and the second shield layer insulator 136 are each formed from electrically insulating polymer films. They may each be formed from the same or different films. For example, they may be each formed from one of a polyethylene terephthalate (PET) film, a polypropylene (PP) film, or a polyethylene naphthalate (PEN) film. The first shield layer conductor 127 and the second shield layer conductor 137 are each formed from an electrically conductive foil. For example, they may be each formed from a copper foil or an aluminum foil. They may each be formed from the same or different foils. The first shield layer adhesive 128 and the second shield layer adhesive 138 are each formed from a pressure-sensitive adhesive. As shown in the inset in FIG. 4B, the first shield layer conductor 127 is positioned between the first shield layer insulator 126 and the first shield layer adhesive 128, and the first shield layer adhesive 128 is positioned between the first shield layer conductor 127 and the first insulating layer 110. As also shown in the inset in FIG. 4B, the second shield layer conductor 137 is positioned between the second shield layer insulator 136 and the second shield layer adhesive 138, and the second shield layer adhesive 138 is positioned between the second shield layer conductor 137 and the second insulating layer 120.

As shown in FIG. 4B, the connector carrier 580 is positioned within the shield enclosure 585 such that spring portion 202 protrudes from the shield enclosure opening 587. Importantly, the spring portion 202 does not electrically contact the shield enclosure 585. In some examples, the connector carrier 580 comprises at least one wire alignment protrusion 184. The at least one wire alignment protrusion 184 protrudes from the connector carrier 580 in a direction perpendicular to the first conductive layer 140. The alignment opening 152 has a shape that corresponds with the cross-sectional shape of the at least one wire alignment protrusion 184 in the plane of the first conductive layer 140. The at least one wire alignment protrusion 184 interfaces with the alignment opening 152 in the wire 300 or the additional wire 310 when the stiffening unit 210 is stacked between the connector carrier 580 and the second insulating layer 120 or the additional wire 310 is stacked between the connector carrier 580 and the additional stiffening unit 215. The at least one wire alignment protrusion 184 provides positive alignment of the wire 300 or the additional wire 310 with the connector carrier 580.

When present, the first shield layer 125 and the second shield layer 135 extend into the shield enclosure 585, as shown in FIG. 4B. The shield enclosure 585, the first shield layer conductor 127 of the first shield layer 125, and the second shield layer conductor 137 of second shield layer 135 are electrically connected. In some examples, they are electrically connected by clinching. Other connection types are within the scope including, for example, riveting with self-piercing rivets, soldering, and spot-welding. In this way, the first shield layer 125, the second shield layer 135, and the shield enclosure 585 provide the first conductive layer 140 with electromagnetic shielding.

In some examples, one or more of the wire 300, the stiffening unit 210, the connector carrier 580, and the shield enclosure 585 are mechanically connected. Mechanically connecting may provide benefits of maintaining alignment of these components through later manipulations of the wire 300 in manufacturing processes or connecting the wire 300 to a receptacle or header. However, when mechanically connected, the first conductive layer 140 of the wire 300 and the shield enclosure 585 are not electrically connected. For example, as shown in FIG. 4D, the stiffening unit 210 may comprise a stiffener cutout 155 formed from a shape passing through the thickness of the stiffening unit 210 in a direction perpendicular to the plane of the first conductive layer 140. The first conductive layer 140 may comprise at least one conductor cutout 154 having a shape passing through the thickness of the first conductive layer 140 in a direction perpendicular to the plane of the first conductive layer 140. In this example, electrically connecting the first shield layer 125, the second shield layer 135, and the shield enclosure 585 results in the mechanical connection of the first insulating layer 110 and the second insulating layer 120 with the shield enclosure 585. The wire 300 is thereby mechanically connected with the shield enclosure 585, but the first conductive layer 140 remains electrically isolated from the first shield layer 125, the second shield layer 135, and the shield enclosure 585. In some examples, the connector carrier 580 may have an opening positioned such that a mechanical connection of other components passes through a thickness of the connector carrier 580, thereby mechanically connecting the connector carrier 580 to the other components. In other examples, the stiffening unit 210 may have a length in the plane of the first conductive layer 140 that is short enough that a mechanical connection of other components is outside the length of the stiffening unit 210. In some examples, the first shield layer 125 and the second shield layer 135 may have a width in a plane parallel to the plane of the first conductive layer 140 that is sider than the width of the first conductive layer 140 in the same direction, allowing for electrical connection of the first shield layer 125, the second shield layer 135 and the shield enclosure 585 without forming an electrical connection with the first conductive layer 140.

Figure 6A:
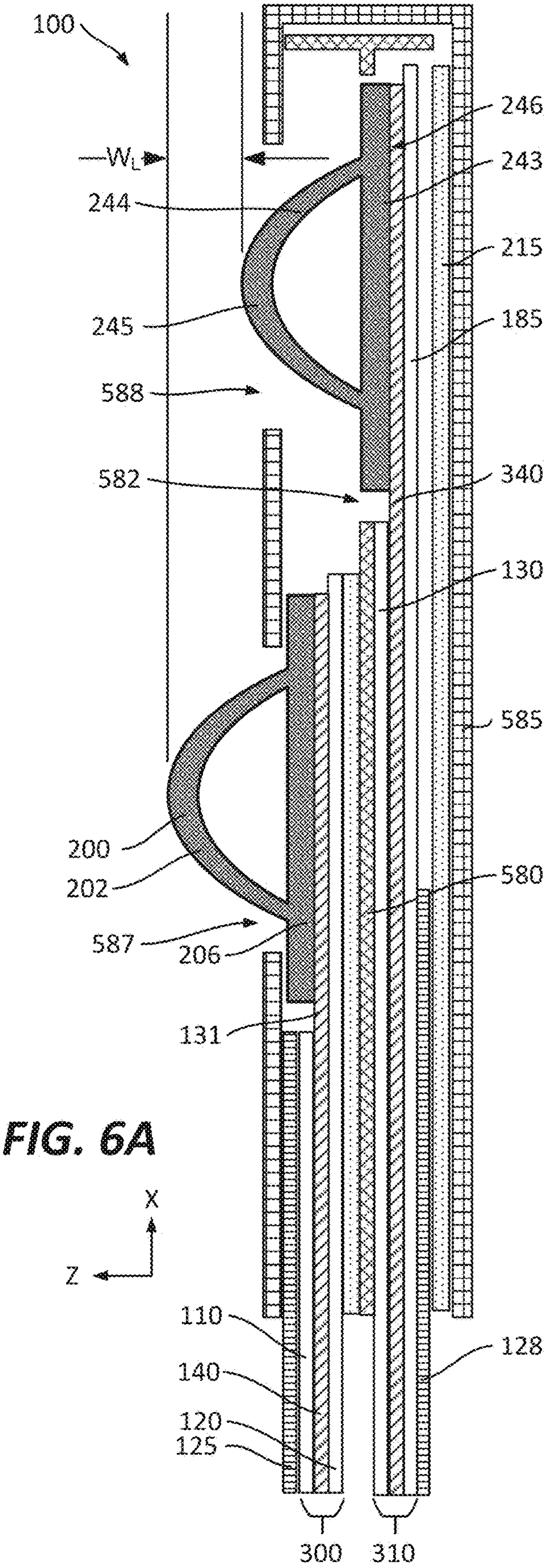
FIG. 6A is a schematic cross-sectional view of the flexible shielded high-current circuit showing relationships between some components, in accordance with some examples.

In some examples, flexible shielded high-current circuit 100 further comprises an additional wire. FIG. 6A is a schematic cross-sectional view of the flexible shielded high-current circuit 100 showing relationships between some components, in accordance with some examples. As shown in FIG. 6A, the flexible shielded high-current circuit 100 comprises a wire 300 as described above and further comprises a third insulating layer 130, a fourth insulating layer 185, an additional conductive layer 340, an additional lamella contact 245, and an additional stiffening unit 215. The third insulating layer 130, the additional conductive layer 340, and the fourth insulating layer 185 are stacked such that the additional conductive layer 340 is positioned between the third insulating layer 130 and the fourth insulating layer 185 to form an additional wire 310. The additional conductive layer 340 has a plane perpendicular to the direction in which the third insulating layer 130, additional conductive layer 340 and fourth insulating layer 185 are stacked. The additional conductive layer 340 may be formed from the same materials described above for the first conductive layer 140 and may have the same dimensions and current ratings as described above for the first conductive layer 140. The additional conductive layer 340 at least partially protrudes between the third insulating layer 130 and the fourth insulating layer 185. The additional conductive layer 340 comprises an additional trace contact portion 134 extending past at least one of the third insulating layer 130 and the fourth insulating layer 185. The additional lamella contact 245 comprises an additional base portion 243 and an additional spring portion 244 monolithic with the additional base portion 243. The additional base portion 243 directly interfaces and is mechanically attached and electrically connected to the additional trace contact portion 134, forming an additional trace-contact interface 246. The additional spring portion 244 is configured to flex relative to the additional base portion 243 at least in a direction substantially perpendicular to the additional trace-contact interface 246. In some examples, the additional base portion 243 is welded to the additional trace contact portion 134 with one of an ultrasonic weld and a laser weld. The additional lamella contact 245 may be formed from the same materials and have the same dimensions and current ratings as described above for the lamella contact 200.

The additional stiffening unit 215 is positioned such that the additional trace contact portion 134 is positioned between the additional stiffening unit 215 and the additional base portion 243. The dimensions of the additional stiffening unit 215 in the plane of the first conductive layer 140 may be the same or different than the dimensions described above for the stiffening unit 210. For example, the length of the additional stiffening unit 215 in a direction parallel with the plane of the first conductive layer 140 may be greater than the length measured in the same direction for the stiffening unit 210. The additional stiffening unit 215 may have a thickness in the direction perpendicular to the plane of the first conductive layer 140 as described above for the stiffening unit 210. The additional wire 310 has a width $W_{i,b}$ measured in the plane of the first conductive layer 140. The fourth insulating layer 185 has width $W_{s,b}$ measured in the same plane and direction as $W_{i,b}$ and in a portion of fourth insulating layer 185 directly interfacing additional stiffening unit 215. The additional conductive layer 340 has a width $W_t$, measured in the same plane and direction as $W_{i,b}$. In some examples, $W_{i,b}$ is greater than $W_{s,b}$, and $W_{s,b}$ is greater than $W_{t,b}$. In some examples, $W_{i,b}$ is the same as $W_i$, $W_{s,b}$ is the same as $W_s$, and $W_{t,b}$ is the same as $W_t$. In other examples, one or more of these dimensions differs between the dimension measured for wire 300 and the corresponding dimension measured for additional wire 310.

The flexible shielded high-current circuit 100 and the additional wire 310 are positioned in the connector carrier 580 such that the spring portion 202 and the additional spring portion 244 face away from the connector carrier 580 in the same direction and are not in electrical contact with one another. The connector carrier 580 comprises a connector carrier opening 582 configured such that, when additional wire 310 is positioned against connector carrier 580, such that additional conductive layer 340 is positioned between connector carrier 580 and additional stiffening unit 215, additional lamella contact 245 protrudes through connector carrier opening 582. In some examples, the at least one wire alignment protrusion 184 described above interfaces with an alignment opening in the additional wire 310 when the additional wire 310 is positioned between the connector carrier 580 and the additional stiffening unit 215.

In some examples, the wire 300, the stiffening unit 210, the additional wire 310, and the additional stiffening unit 215 are positioned in the connector carrier 580, and the connector carrier 580 is positioned within a shield enclosure 585. In some examples, the connector carrier 580 is positioned within the shield enclosure 585 such that the lamella contact 200 protrudes through the shield enclosure opening 587 and the additional lamella contact 245 protrudes through the additional shield enclosure opening 588. In some examples, the shield enclosure 585 comprises a single shield enclosure opening 587, and both the lamella contact 200 and the additional lamella contact 245 protrude through this opening. The shield enclosure 585 in these examples is as described above, except that it may have different dimensions to accommodate the additional wire 310, and it may comprise an additional shield enclosure opening 588. In these examples, the flexible shielded high-current circuit 100 further comprises a first shield layer 125 and a second shield layer 135. The first shield layer 125 and the second shield layer 135 are as described above, except that the second shield layer adhesive 138 is positioned between the second shield layer conductor 137 and the fourth insulating layer 185. The shield enclosure 585, the first shield layer conductor 127, and the second shield layer conductor 137 are electrically connected. For example, these components may be electrically connected by one of clinching, soldering, spot welding, or riveting.

Figure 6B:
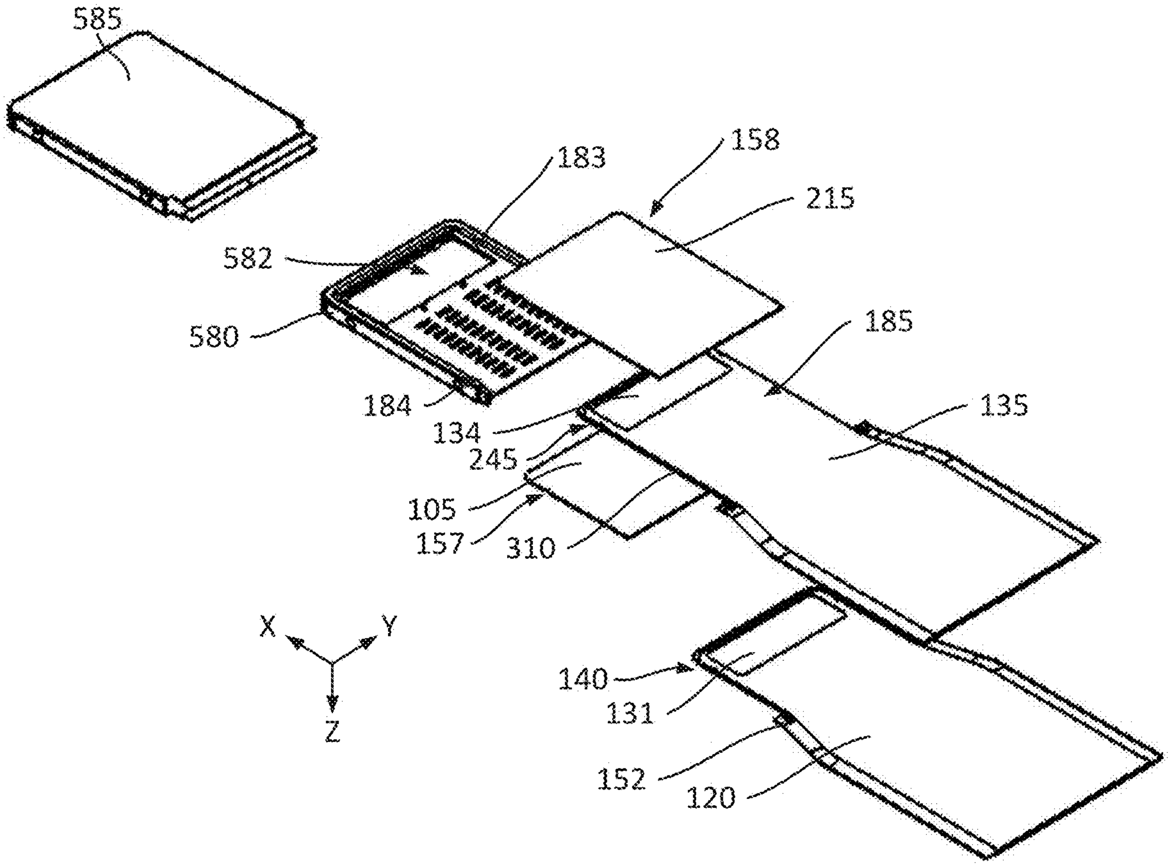
FIG. 6B is an exploded perspective view of flexible shielded high-current circuit, in accordance with some examples.
Figure 6C:
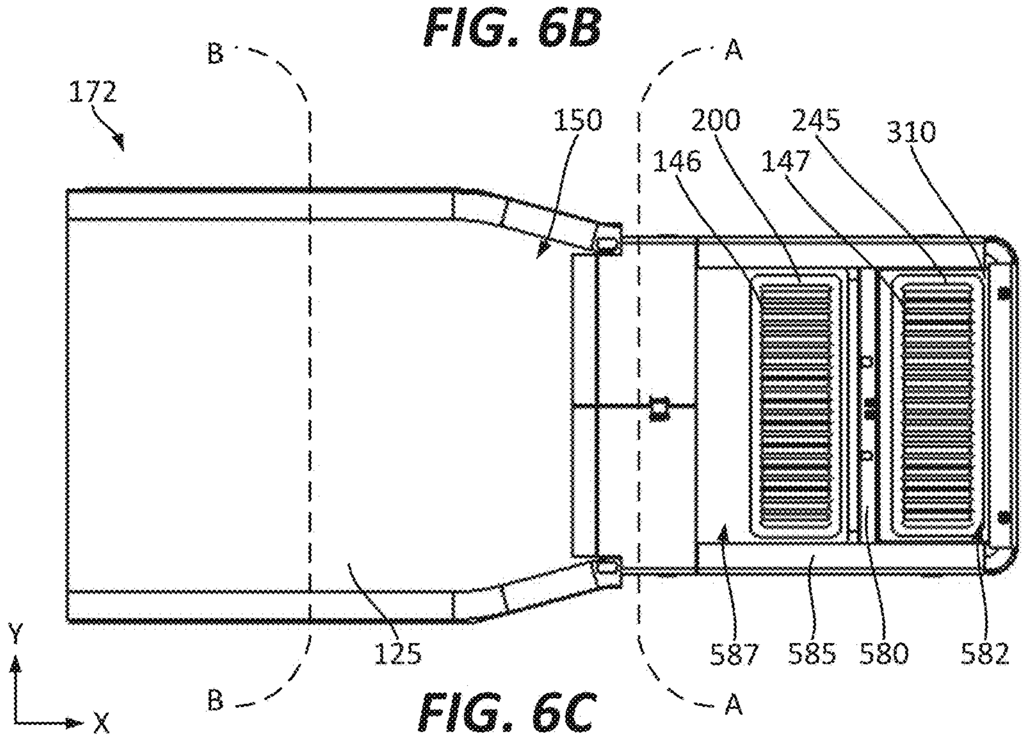
FIG. 6C is a schematic bottom view of the flexible shielded high-current circuit, in accordance with some examples.
Figure 6D:
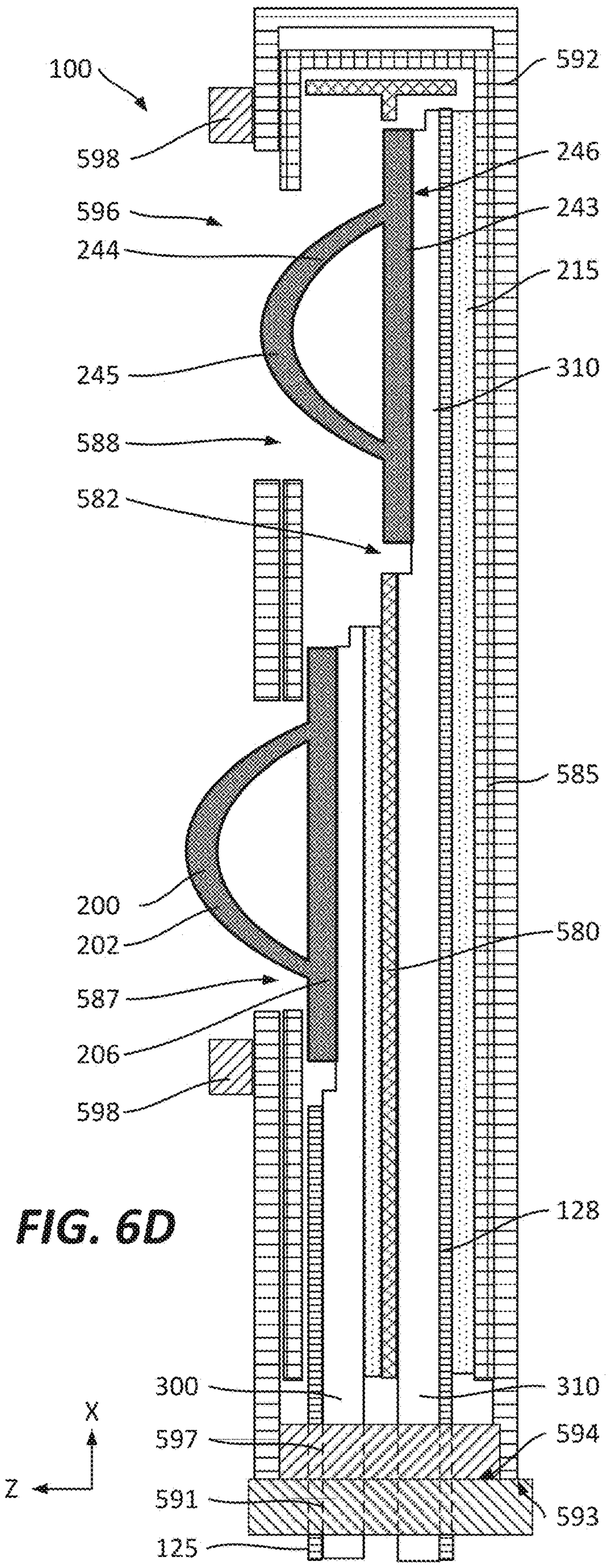
FIG. 6D is a schematic cross-sectional view of flexible shielded high-current circuit, in accordance with some examples.
Figure 6E:
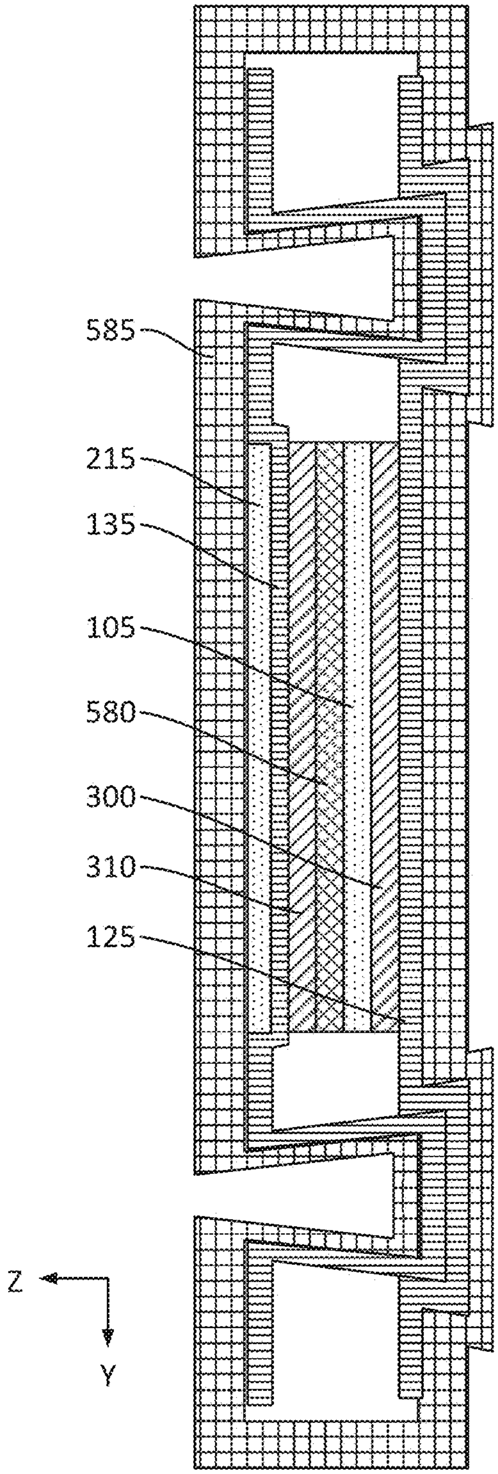
FIG. 6E is a cross-sectional schematic view of flexible shielded high-current circuit at line A of FIG. 6C, in accordance with some examples.

FIG. 6E is a cross-sectional schematic view of flexible shielded high-current circuit 100 at line A of FIG. 6C, in accordance with some examples. Shown in FIG. 6E are the shield enclosure 585, the additional stiffening unit 215, the second shield layer 135, the stiffening unit 210, the connector carrier 580, the wire 300, the additional wire 310, and the first shield layer 125. In the example shown in FIG. 6E, the shield enclosure 585, the first shield layer 125, and the second shield layer 135 are electrically connected by clinching.

Figure 6F:
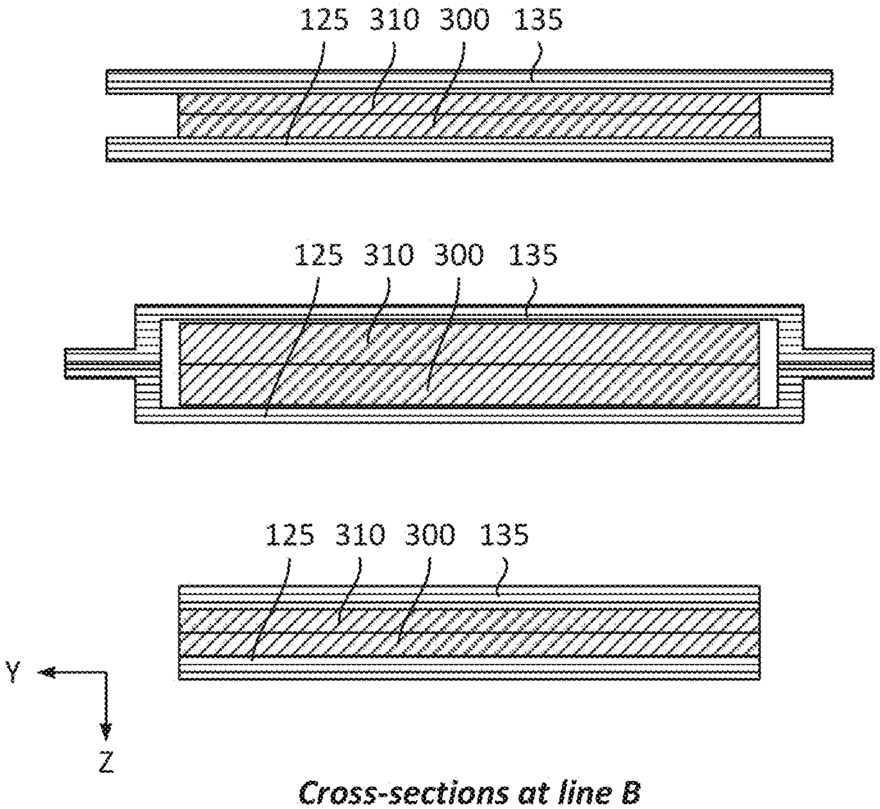
FIG. 6F is a schematic cross-sectional view of three examples of the flexible interconnect circuit at line B of FIG. 6C, in accordance with some examples.

Shown in FIG. 6F are three cross-sectional schematic views of flexible shielded high-current circuit 100 at line B of FIG. 6C, in accordance with some examples. Shown in all three views are the wire 300 and the additional wire 310 positioned between the first shield layer 125 and the second shield layer 135. In one view, the first shield layer 125 and the second shield layer 135 extend beyond the wire 300 and the additional wire 310 in the y-direction. In another view, the first shield layer 125 and the second shield layer 135 extending beyond the wire 300 and the additional wire 310 in the y-direction are mechanically coupled beyond the wire 300 and the additional wire 310. In another view, the first shield layer 125, the second shield layer 135, the wire 300, and the additional wire 310 all extend equally in the y-direction.

FIG. 6B is an exploded perspective view of flexible shielded high-current circuit 100, in accordance with some examples. FIG. 6B shows the wire 300, with the trace contact portion 131 visible through an opening in the second insulating layer 120. The lamella contact 200 is not visible in this view. Also shown is the stiffening unit 210. FIG. 6B also shows the additional wire 310, with the additional trace contact portion 134 visible through an opening in the fourth insulating layer 185. Also shown is the additional stiffening unit 215. As described above, stiffening unit 210 is assembled with wire 300 and additional stiffening unit 215 is assembled with additional wire 310. Wire 300 and additional wire 310 are then assembled connector carrier 580, with each of wire 300 and additional wire 310 positioned on an opposite side of connector carrier 580. This view shows connector carrier opening 582, through which additional lamella contact 245 will protrude when additional wire 310 is assembled with connector carrier 580. The combination of wire 300, connector carrier 580, and additional wire 310 is then inserted into shield enclosure 585.

FIG. 6C is a schematic bottom view of the flexible shielded high-current circuit 100, in accordance with some examples. FIG. 6C shows the lamella contact 200 of the wire 300 protruding through shield enclosure opening 587 in shield enclosure 585. Also shown is additional lamella contact 245 of additional wire 310, which also protrudes through shield enclosure opening 587. The additional lamella contact 245 also protrudes through connector carrier opening 582 in connector carrier 580.

FIG. 6D is a schematic cross-sectional view of flexible shielded high-current circuit 100, in accordance with some examples. In some examples, the flexible shielded high-current circuit 100 comprises an outer shell 592 having an edge 593, a wire opening 594 adjacent to the edge, and an interface opening 596. The outer shell 592 is positioned over the shield enclosure 585 such that the wire 300 protrudes through the wire opening 594. In some further examples, the flexible shielded high-current circuit 100 further comprises a silicone seal 597 positioned around the wire 300 and adjacent to the edge of the outer shell 592. The silicone seal 597 may seal the interior of the outer shell 592 against moisture and soil entering the outer shell 592 through the wire opening 594. In some yet further examples, the flexible shielded high-current circuit 100 comprises a molded end cap 591 positioned around the silicone seal 597 and adjacent to the edge 593 of the outer shell 592. The molded end cap 591 may provide strain relief for the wire 300 and the additional wire 310. In some examples, flexible shielded high-current circuit 100 comprises an interface seal 598 positioned adjacent to the interface opening 596.

Figure 6G:
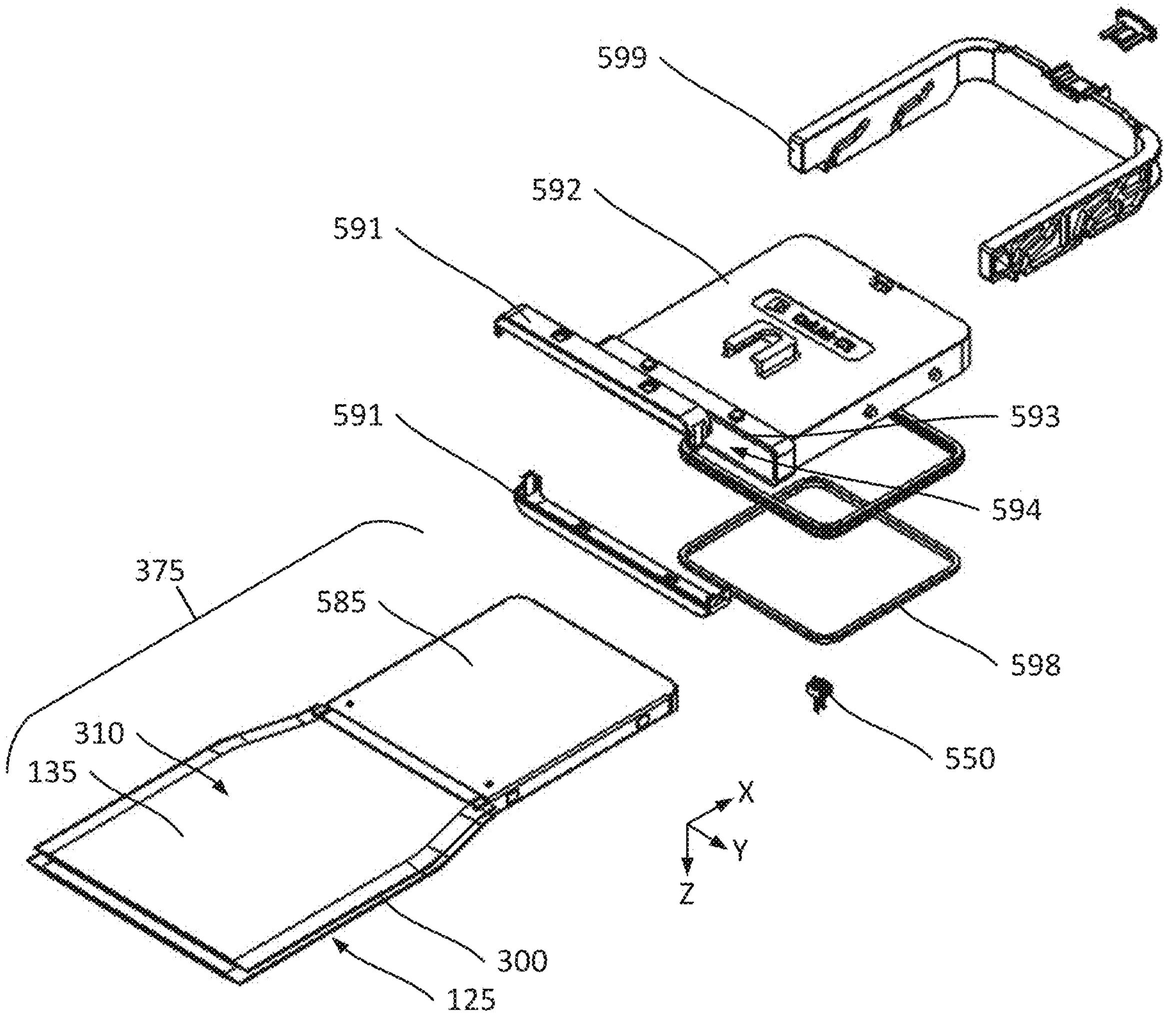
FIG. 6G is an exploded perspective view of the flexible shielded high-current circuit, in accordance with some examples.

FIG. 6G is an exploded perspective view of the flexible shielded high-current circuit 100, in accordance with some examples. Shown in FIG. 6G is the wire 300, the additional wire 310, the shield enclosure 585, and the outer shell 592. Shown on the outer shell 592 is the wire opening 594. Also shown is the molded end cap 591 and the interface seal 598. In some examples, flexible shielded high-current circuit 100 further comprises an alignment lever 599, shown in FIG. 6G. The alignment lever 599 may align and mechanically couple the outer shell 592 with a busbar header 500, which is described in detail below.

In some examples, the flexible shielded high-current circuit 100 further comprises a high voltage interlock shunt 550. The high voltage interlock shunt 550 may be electrically connected with a high voltage interlock system of the battery pack when the flexible shielded high-current circuit 100 is connected to the busbar header 500 to be described below. The high voltage interlock system may be configured to prevent electrical current from passing from the battery pack to the first busbar 505 and second busbar 510 when the high voltage interlock shunt 550 is not installed. In some examples, the high voltage interlock shunt 550 may be attached to the flexible shielded high-current circuit 100 described above and may become electrically connected to a high voltage interlock receptacle 552 in the busbar header 500 when the flexible shielded high-current circuit 100 is connected to the busbar header 500. In some examples, the relative lengths of the high voltage interlock shunt 550 and either or both of the lamella contact 200 and the additional lamella contact 245 in the direction perpendicular to the plane of the first conductive layer 140 are such that the high voltage interlock shunt 550 does not make electrical contact with the high voltage interlock receptacle 552 until after the flexible shielded high-current circuit 100 is securely fastened to the busbar header 500.

Examples of Busbar Headers

Figure 7A:
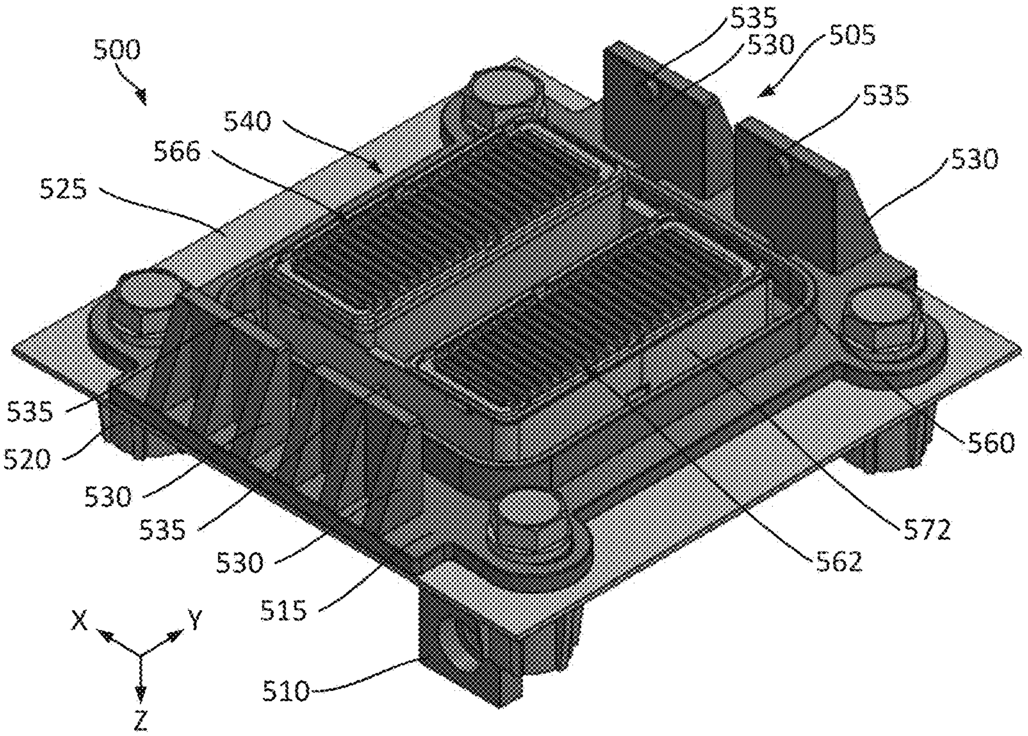
FIG. 7A is a perspective schematic drawing of a busbar header comprising an inner header section, a first busbar, a second busbar, a first bus bar cover, a second bus bar cover, and an outer header section, in accordance with some examples.
Figure 7B:
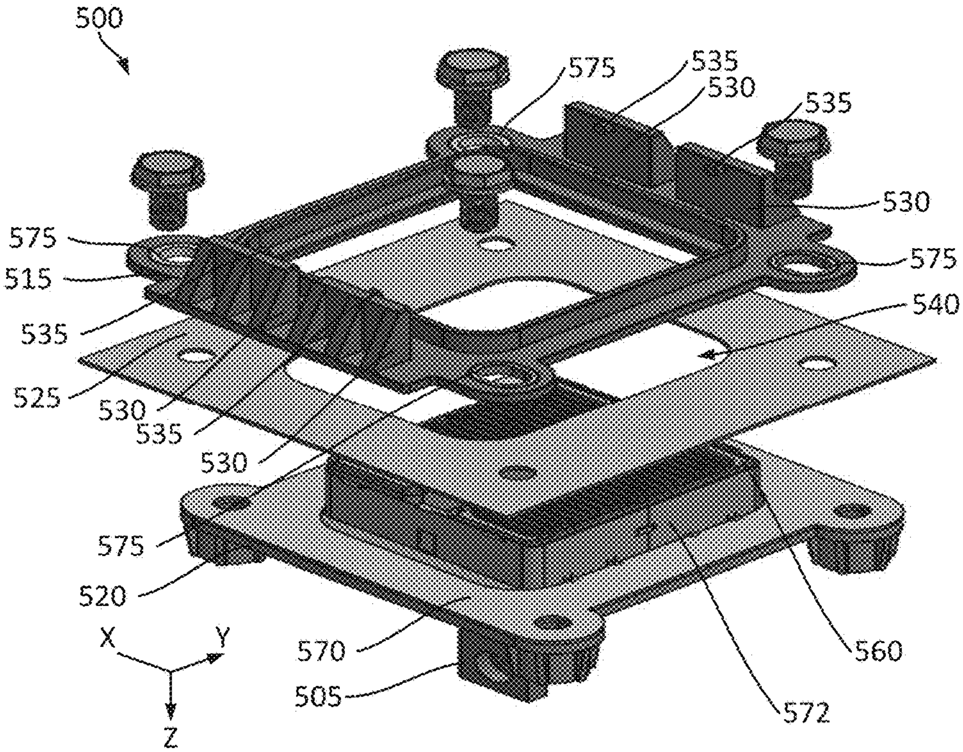
FIG. 7B is an exploded perspective view of a busbar header, in accordance with some examples.

FIG. 7A is a perspective schematic drawing of a busbar header 500 comprising an inner header section 520, a first busbar 505, a second busbar 510, a first bus bar cover 560, a second bus bar cover 565, and an outer header section 515, in accordance with some examples. The inner header section 520 partially protrudes through a battery pack cover opening 540 of a battery pack cover 525 of a battery pack. A portion of a battery pack cover 525 is visible in FIG. 7A, but the opening 540 is not. FIG. 7B is an exploded perspective view of a busbar header 500, in accordance with some examples. The opening 540 is shown in FIG. 7B. The first busbar 505 and the second busbar 510 are positioned on the inner header section 520. The first busbar 505 and second busbar 510 are not in electrical contact with one another. The first busbar 505 and the second busbar 510 may each be in electrical contact with separate busbars of the battery pack. In some examples, each of the first busbar 505 and the second busbar 510 comprises an opening whereby a battery pack busbar may be mechanically and electrically connected by a mechanical fastener.

In some examples, each of the first busbar 505 and the second busbar 510 have cross-sections sufficient for conducting 20-600 Amps. In some examples, each of the first busbar 505 and the second busbar 510 has a current rating of greater than 10 Amps, greater than 30 Amps, greater than 60 Amps, greater than 100 Amps, or even greater than 125 Amps. In some examples, each of the first busbar 505 and the second busbar 510 has a current rating less than 150 Amps, less than 120 Amps, less than 50 Amps, or even less than 25 Amps.

The first busbar 505 and the second busbar 510 may each separately comprise an electrically conductive metal alloy. For example, the busbars may each separately comprise copper alloys, aluminum alloys, and the like. In some examples, the busbars comprise a copper alloy and are coated with other metal coatings. Specifically, each busbar may be coated with a silver layer. The silver layer may have a thickness of from 4 to 6 micrometers. The silver coating may improve the resistance of the busbar to corrosion. In some further examples, an interlayer of another metal may be present on a busbar, between the copper alloy and the silver layer. Specifically, the interlayer may comprise nickel. In some examples, the interlayer may have a thickness of 1 to 2 micrometers. The interlayer may improve adhesion of the silver layer to the copper.

Figure 7C:
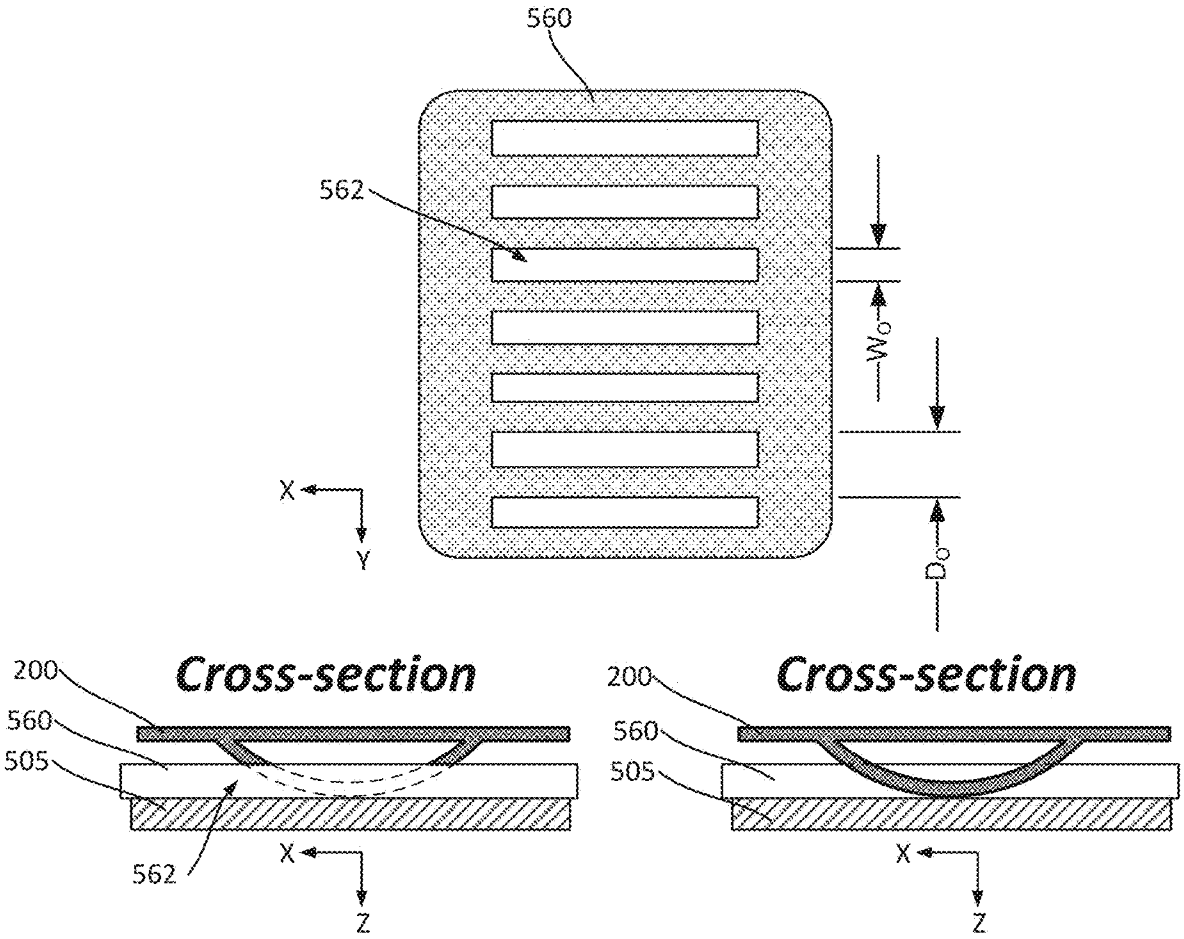
FIG. 7C is a schematic top view of the first bus bar cover, in accordance with some examples.
Figure 7D:
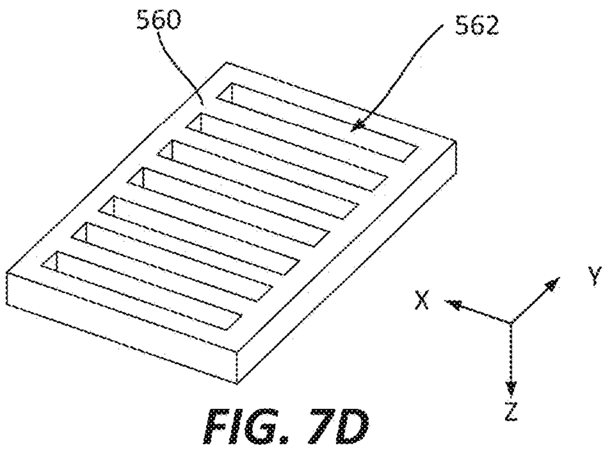
FIG. 7D is a perspective schematic view of the first bus bar cover, in accordance with some examples.

The busbar header 500 comprises a first bus bar cover 560 and a second bus bar cover 565. Each of the first bus bar cover 560 and the second bus bar cover 565 may permit an electrical connector to electrically connect with one of the first busbar 505 and the second busbar 510, but prevent inadvertent contact with the busbars. For example, each of the first bus bar cover 560 and the second bus bar cover 565 may prevent a person, a tool, or a component from contacting one of the busbars and receiving an electrical shock. The first bus bar cover 560 is positioned on the first busbar 505 and comprises a first plurality of cover openings 562. The second bus bar cover 565 positioned on second busbar 510 and comprises a second plurality of cover openings 566. FIG. 7C is a schematic top view of the first bus bar cover 560, in accordance with some examples. Shown in FIG. 7C is the first plurality of cover openings 562. The width of one opening in the first plurality of cover openings 562 is represented by $W_o$ and the pitch spacing adjacent openings in the first plurality of cover openings 562 is represented by $D_o$. In this example, the width of all openings are equal to $W_O$, but in other examples, different openings of the first plurality of cover openings 562 may have different widths. In other examples, the space between some adjacent openings of the first plurality of cover openings 562 may be different than the space between other adjacent openings of the first plurality of cover openings 562. FIG. 7D is a perspective schematic view of the first bus bar cover 560, in accordance with some examples. The outer header section 515 comprises a plurality of alignment risers 530. The plurality of alignment risers 530 is positioned on an opposite side of the outer header section 515 from the inner header section 520.

The outer header section 515 is positioned on the inner header section 520 such that a portion of the battery pack cover 525 is positioned between the outer header section 515 and the inner header section 520. The busbar header 500 is thereby mechanically attached to the battery pack cover 525.

In some examples, the outer header section 515 and the inner header section 520 are mechanically connected by fasteners. For example, the fasteners may be threaded fasteners. In some examples, the outer header section 515 further comprises a plurality of compression limiters 575 positioned adjacent to the fasteners. The plurality of compression limiters 575 may be configured to limit a minimum distance between inner header section 520 and outer header section 515. Specifically, the plurality of compression limiters 575 may limit how close the outer header section 515 and inner header section 520 may be pressed together when the fasteners are tightened.

In some examples, the busbar header 500 further comprises a header gasket 570. The header gasket 570 is positioned between inner header section 520 and battery pack cover 525. The header gasket 570 may form a seal preventing moisture and gases from entering the battery pack at the location of the busbar header 500 when the fasteners are tightened.

In some examples, the busbar header 500 further comprises a high voltage interlock receptacle 552. The high voltage interlock receptacle 552 is positioned such that the high voltage interlock shunt 550 described above makes electrical contact with it when a flexible shielded high-current circuit 100 is connected to the busbar header 500. The high voltage interlock receptacle 552 may be electronically coupled with a high voltage interlock system, for example, as a component of an electric vehicle.

In some examples, the busbar header 500 further comprises a header shield 572 positioned on the inner header section 520. The header shield 572 is electrically isolated from first busbar 505 and second busbar 510. The header shield 572 may be formed from an electrically conductive material. For example, the header shield 572 may be formed from one or more of steel, copper, a copper alloy, aluminum, an aluminum alloy, tin, and brass. The header shield 572 may be electrically coupled with an electrical ground, for example, of an electric vehicle. The header shield 572 may be electrically coupled with the shield enclosure 585 when a flexible shielded high-current circuit 100 is connected to the busbar header 500.

In some examples, the plurality of alignment risers 530 comprises a plurality of alignment protrusions 535. The plurality of alignment protrusions 535 are positioned on the plurality of alignment risers 530 such that they interact with the alignment lever 599 when the flexible shielded high-current circuit 100 is connected with the busbar header 500. For example, each alignment riser of the plurality of alignment risers 530 may comprise at least one alignment protrusion of the plurality of alignment protrusions 535. Each alignment riser may be positioned on the outer header section 515 opposite either the first busbar 505 or the second busbar 510 from at least one other alignment riser such that one alignment protrusion faces towards at least one other alignment protrusion. Each alignment protrusion may be configured to mechanically align with a feature on the alignment lever 599.

The outer header section 515 and the inner header section 520 may each be formed from a non-conductive material. For example, each may be formed from one or more of acrylonitrile butadiene styrene (ABS), nylon, polycarbonate (PC), polystyrene (PS), and polyethylene (PE).

Examples of Assemblies

Figure 8A:
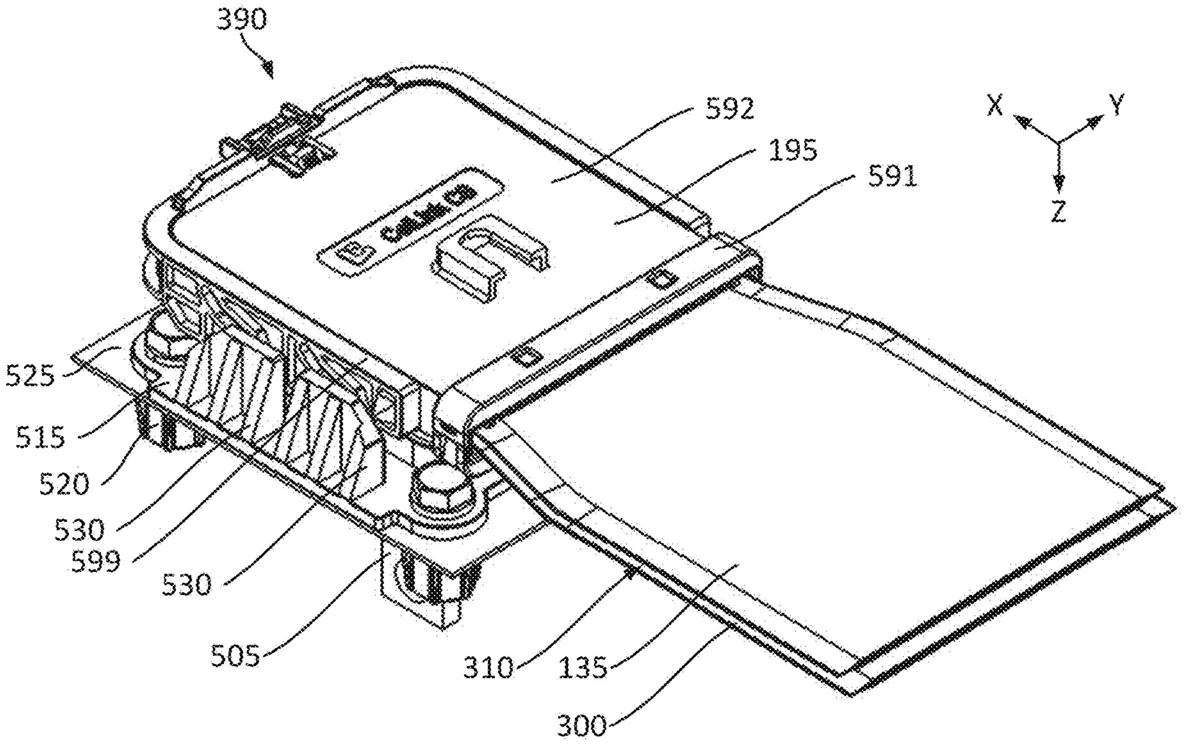
FIG. 8A is a perspective view illustrating an assembly comprising a flexible shielded high-current circuit and busbar header, in accordance with some examples.
Figure 8B:
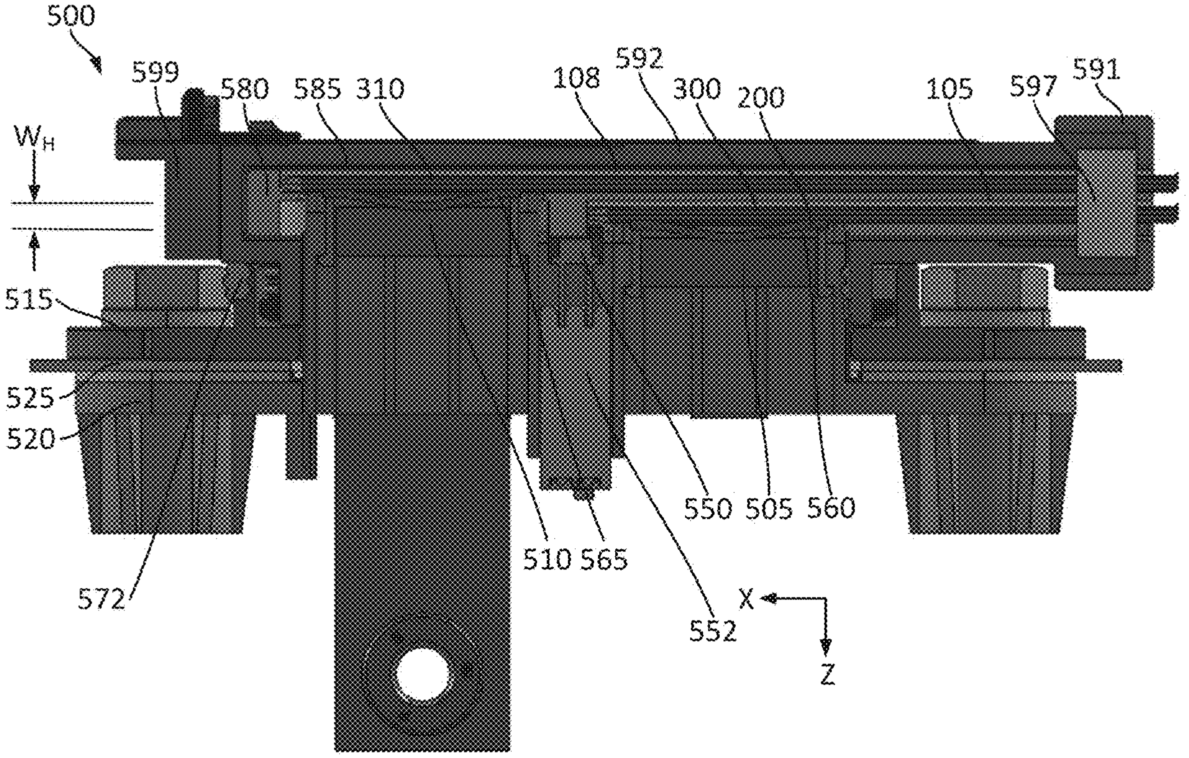
FIG. 8B is a cross-sectional view illustrating the relationships of some components of assembly, in accordance with some examples.
Figure 8C:
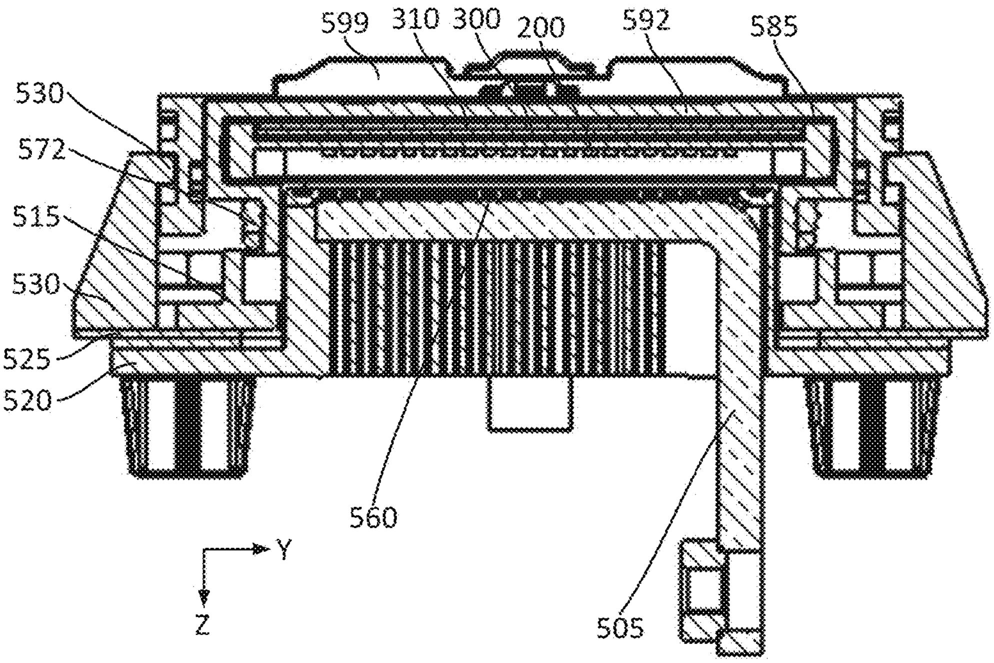
FIG. 8C is another cross-sectional view illustrating the relationships of some components of the assembly, in accordance with some examples.

FIG. 8A is a perspective view illustrating an assembly 390 comprising a flexible shielded high-current circuit 100 and busbar header 500, in accordance with some examples. FIG. 8B is a cross-sectional view illustrating the relationships of some components of assembly 390, in accordance with some examples. FIG. 8C is another cross-sectional view illustrating the relationships of some components of the assembly 390, in accordance with some examples. The flexible shielded high-current circuit 100 comprises a first insulating layer 110, a second insulating layer 120, a first conductive layer 140 having a plane, a trace contact portion 131, a lamella contact 200, a first shield layer 125, a second shield layer 135, a stiffening unit 210, a shield enclosure 585 a connector carrier 580, and an outer shell 592. The shield enclosure 585 is formed from a conductive material and has a shield enclosure opening 587. In some examples, the flexible shielded high-current circuit 100 further comprises a third insulating layer 130, a fourth insulating layer 185, a second conductive layer 150, an additional trace contact portion 134, an additional lamella contact 245, and an additional stiffening unit 215. The first insulating layer 110, the first conductive layer 140, and the second insulating layer 120 are stacked such that the first conductive layer 140 is positioned between the first insulating layer 110 and the second insulating layer 120 to form a wire 300.

The flexible shielded high-current circuit 100 comprises a first shield layer 125 and a second shield layer 135. The first shield layer 125 comprises a first shield layer insulator 126, a first shield layer conductor 127, and a first shield layer adhesive 128. The second shield layer 135 comprises a second shield layer insulator 136, a second shield layer conductor 137, and a second shield layer adhesive 138. The first shield layer insulator 126 and the second shield layer insulator 136 are each formed from electrically insulating polymer films. They may each be formed from the same or different films. For example, they may be each formed from one of a polyethylene terephthalate (PET) film, a polypropylene (PP) film, or a polyethylene naphthalate (PEN) film. The first shield layer conductor 127 and the second shield layer conductor 137 are each formed from an electrically conductive foil. For example, they may be each formed from a copper foil or an aluminum foil. They may each be formed from the same or different foils. The first shield layer adhesive 128 and the second shield layer adhesive 138 are each formed from a pressure-sensitive adhesive. The first shield layer conductor 127 is positioned between the first shield layer insulator 126 and the first shield layer adhesive 128. The first shield layer adhesive 128 is positioned between the first shield layer conductor 127 and the first insulating layer 110. The second shield layer conductor 137 is positioned between the second shield layer insulator 136 and the second shield layer adhesive 138. In examples where the flexible shielded high-current circuit 100 does not comprise an additional wire 310, the second shield layer adhesive 138 is positioned between the second shield layer conductor 137 and the second insulating layer 120. In examples where the flexible shielded high-current circuit 100 comprises an additional wire 310, the second shield layer adhesive 138 is positioned between the second shield layer conductor 137 and the fourth insulating layer 185.

The lamella contact 200 comprises a base portion 206 and a spring portion 202 monolithic with the base portion 206. The spring portion 202 comprises a plurality of arch portions 146, extending parallel to each other and arching over the base portion 206. The base portion 206 directly interfaces and is mechanically attached and electrically connected to the trace contact portion 131 forming a trace-contact interface 201. The spring portion 202 is configured to flex relative to the base portion 206 at least in a direction substantially perpendicular to the trace-contact interface 201. The first conductive layer 140 at least partially protrudes between the first insulating layer 110 and the second insulating layer 120 and comprises a trace contact portion 131 extending past at least one of the first insulating layer 110 and the second insulating layer 120. The stiffening unit 210 is positioned such that the trace contact portion 131 is positioned between the stiffening unit 210 and the base portion 206. In some examples, the stiffening unit 210 is mechanically attached to the second shield layer 135.

When present, the additional lamella contact 245 comprises an additional base portion 243 and an additional spring portion 244 monolithic with the additional base portion 243. The additional spring portion 244 comprises a plurality of additional arch portions 147 extending parallel to each other and arching over the additional base portion 243. The additional base portion 243 directly interfaces and is mechanically attached and electrically connected to the additional trace contact portion 134 forming an additional trace-contact interface 246. The additional spring portion 244 is configured to flex relative to the additional base portion 243 at least in a direction substantially perpendicular to the additional trace-contact interface 246. The second conductive layer 150 at least partially protrudes between the third insulating layer 130 and the fourth insulating layer 185 and comprises an additional trace contact portion 134 extending past at least one of the third insulating layer 130 and the fourth insulating layer 185. The additional stiffening unit 215 directly interfaces and is mechanically attached to the fourth insulating layer 185 and positioned such that the additional trace contact portion 134 is positioned between the additional stiffening unit 215 and the additional base portion 243.

The connector carrier 580 is formed from a non-conductive material and is positioned within the shield enclosure 585. The connector carrier 580 is stacked with the stiffening unit 210 and the second insulating layer 120 such that the stiffening unit 210 is positioned between the second insulating layer 120 and the connector carrier 580. The spring portion 202 protrudes from the shield enclosure opening 587.

The busbar header 500 comprises an inner header section 520, a first busbar 505, a first bus bar cover 560, and an outer header section 515. In some examples, the busbar header 500 further comprises a second busbar 510, and a second bus bar cover 565. The first busbar 505 is positioned on the inner header section 520. The first bus bar cover 560 is positioned on the first busbar 505 and comprises a first plurality of cover openings 562. When present, the second busbar 510 is positioned on the inner header section 520 such that it is not in electrical contact with the first busbar 505. The second bus bar cover 565 is positioned on the second busbar 510 and comprises a second plurality of cover openings 566. The outer header section 515 comprises a plurality of alignment risers 530.

The inner header section 520 is configured to partially protrude through a battery pack cover opening 540 of a battery pack cover 525. The outer header section 515 is positioned on the inner header section 520 such that a portion of the battery pack cover 525 is positioned between the outer header section 515 and the inner header section 520, thereby mechanically attaching busbar header 500 to battery pack cover 525.

As described above, in some examples, the busbar header 500 comprises a header shield 572 positioned on the inner header section 520. The header shield 572 is electrically isolated from first busbar 505 and second busbar 510. Examples of the header shield 572 are described above. As also described above, the flexible shielded high-current circuit 100 may comprise a first shield layer 125, a second shield layer 135, and a shield enclosure 585, which may be electrically coupled and provide the conductive trace or traces of the flexible shielded high-current circuit 100 with electromagnetic shielding. Examples of the first shield layer 125, the second shield layer 135, and the shield enclosure 585 are described above. In assembly 390, the header shield 572 may be electrically coupled with the shield enclosure 585 when the flexible shielded high-current circuit 100 is connected to the busbar header 500. The header shield may be electrically coupled with an electrical ground, for example, of an electric vehicle. In this way, the first conductive layer 140 and, when present, the second conductive layer 150 of the assembly 390 may be provided electromagnetic shielding.

The plurality of alignment risers 530 is positioned on an opposite side of the outer header section 515 from the inner header section 520. The plurality of alignment risers 530 comprises a plurality of alignment protrusions 535. The outer shell 592 is positioned adjacent to the outer header section 515 such that the lamella contact 200 protrudes through the first plurality of cover openings 562 and contacts the first busbar 505, thereby electrically connecting the wire 300 with the first busbar 505. When present, the additional lamella contact 245 protrudes through the second plurality of cover openings 566 and contacts the second busbar 510, thereby electrically connecting the additional wire 310 with the second busbar 510.

In some examples, the busbar header 500 has a distance $W_H$ defined as the distance, measured in a direction perpendicular to the plane of the first conductive layer 140, between a surface of the first busbar 505 adjacent to the first bus bar cover 560 and a surface of the second busbar 510 adjacent to the second bus bar cover 565. $W_H$ is illustrated in FIG. 8B. The flexible shielded high-current circuit 100 has a distance $W_L$ defined as the distance, measured in a direction perpendicular to the plane of the first conductive layer 140, between the lamella contact 200 and the additional lamella contact 245. $W_L$ is illustrated in FIG. 6A. In some examples, the ratio of $W_H/W_L$ is between 0.9-1.1.

In some examples, the number of cover openings in the first plurality of cover openings 562 is equal or greater than the number of arch portions in the plurality of arch portions 146. In some examples, each arch portion of the plurality of arch portions 146 has a width measured in the plane of the first conductive layer 140 of $W_A$. $W_A$ is illustrated in FIG. 4C. In some examples, the arch portions of the plurality of arch portions 146 are arrayed with a pitch distance measured in the plane of the first conductive layer 140 of $D_A$. $D_A$ is also illustrated in FIG. 4C. In these examples, each opening in the first plurality of cover openings 562 has a width measured in the plane of the first conductive layer 140 of $W_O$, as illustrated in FIG. 7C. The openings in the first plurality of cover openings 562 are arrayed with a pitch distance measured in the plane of the first conductive layer 140 of $D_O$. $D_O$ is also illustrated in FIG. 7C. In these examples, $W_O$ is greater than $W_A$, $D_O$ equals $D_A$. Each arch portion of the plurality of arch portions 146 protrudes through one opening in the first plurality of cover openings 562 and electrically contacts first busbar 505. In some other examples, the arch portions of the plurality of arch portions 146 are not arrayed with a pitch distance and the openings of the first plurality of cover openings 562 are not arrayed with a pitch distance. In other words, in these other examples, the width of each one of the plurality of arch portions 146 is not equal and the spacing between each one of the plurality of arch portions 146 is not regular. However, in these other examples, the first plurality of cover openings 562 are positioned such that each one of the plurality of arch portions 146 protrudes through the first bus bar cover 560. Shown in FIG. 7C are two cross-sectional views illustrating the relationship between the lamella contact 200, the first bus bar cover 560, and the first busbar 505. In one of these views, the section is taken through the first bus bar cover 560 between two adjacent ones of the first plurality of cover openings 562. The view is thereby taken between two of the plurality of arch portions 146. In the other view, the section is taken through one of the first plurality of cover openings 562. This view is thereby taken through one of the plurality of arch portions 146. The relationships described between the first plurality of cover openings 562 and the plurality of arch portions 146 may also describe relationships between the second plurality of cover openings 566 and the plurality of additional arch portions 147.

In some examples, the flexible shielded high-current circuit 100 further comprises an alignment lever 599. The alignment lever 599 is positioned between the plurality of alignment risers 530 and outer shell 592. The alignment lever 599 is configured to apply a force between the plurality of alignment protrusions 535 and the outer shell 592, urging the outer shell 592 towards the busbar header 500. The alignment lever 599 thereby urges the lamella contact 200 to physically contact the first busbar 505 and urges, where present, the additional lamella contact 245 to contact the second busbar 510.

Examples of Methods of Fabricating Flexible Interconnect Circuits

Figure 9:
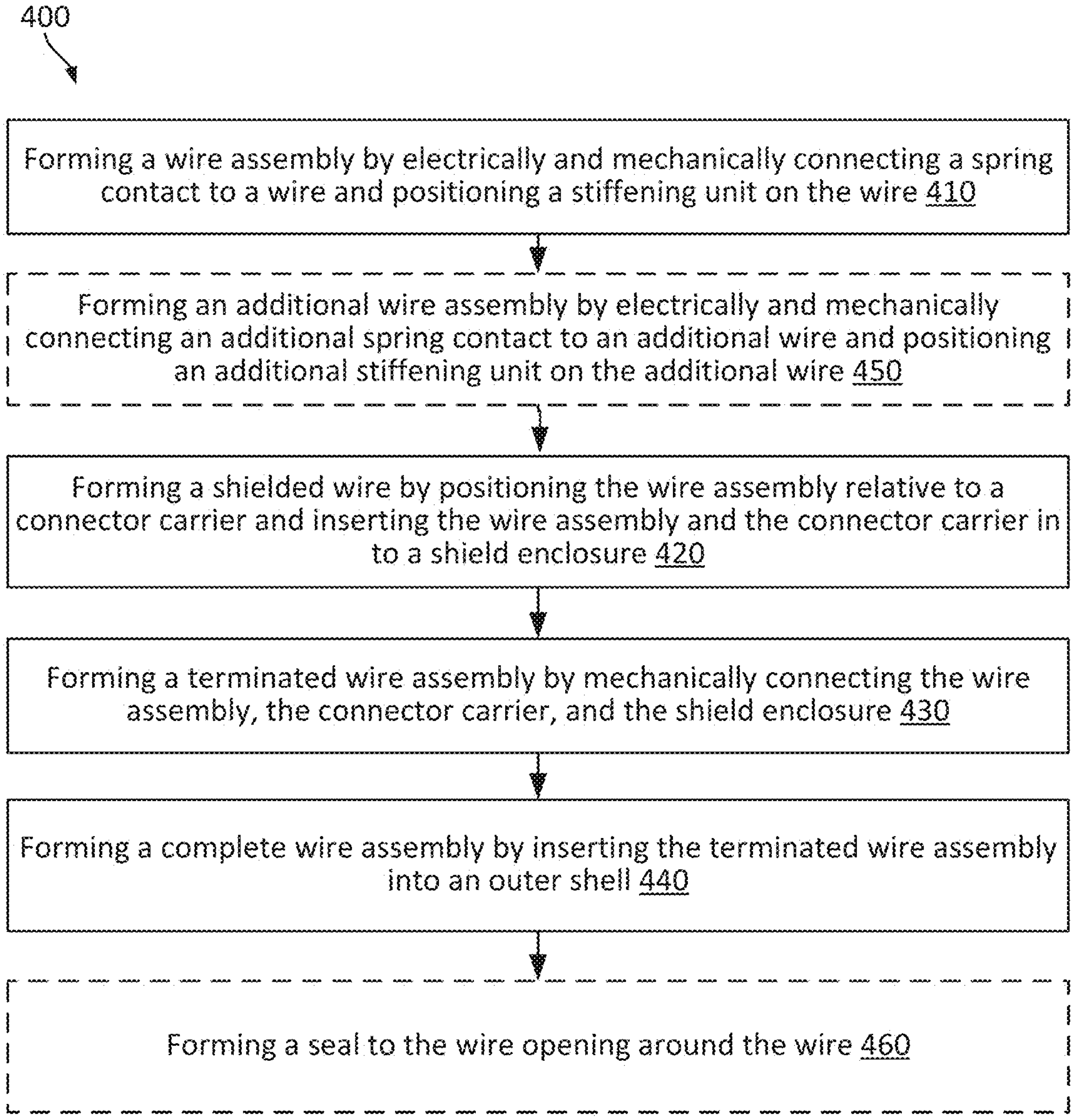
FIG. 9 is a process flowchart corresponding to a method for fabricating a flexible shielded high-current circuit, in accordance with some examples.

FIG. 9 is a process flowchart corresponding to method 400 for fabricating a flexible shielded high-current circuit 100, in accordance with some examples. Various examples and features of flexible shielded high-current circuit 100 have been described above. Method 400 comprises (block 410) forming a wire assembly 370 by electrically and mechanically connecting a lamella contact 200 to a wire 300 and positioning a stiffening unit 210 on the wire 300. The wire 300 comprises a first insulating layer 110, a second insulating layer 120, and a first conductive layer 140. The first conductive layer 140 has a plane and at least partially protrudes between the first insulating layer 110 and the second insulating layer 120. The first conductive layer 140 comprises a trace contact portion 131 extending past at least one of the first insulating layer 110 and the second insulating layer 120. The lamella contact 200 is electrically and mechanically attached to the trace contact portion 131. The stiffening unit 210 is positioned on the wire 300 such that the wire 300 is positioned between the lamella contact 200 and the stiffening unit 210. In some examples, the electrically and mechanically connecting the lamella contact 200 to the wire 300 is by welding. In some examples, the welding is one of laser welding, ultrasonic welding, and spot welding.

Method 400 further comprises (block 420) forming a shielded wire 172 by positioning the first insulating layer 110 between a first shield layer 125 and a second shield layer 135 such that the first insulating layer 110 interfaces the first shield layer 125 and the second insulating layer 120 is positioned between the first conductive layer 140 and the second shield layer 135, and positioning the wire assembly 370 relative to a connector carrier 580 and inserting the wire assembly 370 and connector carrier 580 into a shield enclosure 585. The shield enclosure 585 has a recess and the wire assembly 370 and the connector carrier 580 at least partially extend inside the recess. In some examples, the connector carrier 580 comprises an opening and the wire assembly 370 is positioned relative to the connector carrier 580 such that the lamella contact 200 protrudes through the opening. In some examples, the wire assembly 370 is positioned relative to the connector carrier 580 such that the lamella contact 200 faces away from the connector carrier 580. In other words, the wire assembly 370 is positioned relative to the connector carrier 580 such that the connector carrier 580 directly interfaces the stiffening unit 210.

Method 400 further comprises (block 430) forming a terminated wire assembly 375 by electrically connecting the first shield layer 125, the second shield layer 135, and the shield enclosure 585. In some examples, the method of mechanically connecting is one of riveting, clinching, and welding. It should be noted that the method of electrically connecting does not form an electrical connection between the shield enclosure 585 and the first conductive layer 140.

Method 400 further comprises (block 440) forming a complete wire assembly 195 by inserting the terminated wire assembly 375 into an outer shell 592. The outer shell 592 has a wire opening 594 through which wire 300 extends. The outer shell 592 also has an interface opening 596 through which lamella contact 200 protrudes when the complete wire assembly 195 is formed.

In some examples, method 400 further comprises (block 450) forming an additional wire assembly by electrically and mechanically connecting an additional lamella contact 245 to an additional wire 310 and stacking an additional stiffening unit 215 with the additional wire 310. The additional wire 310 comprises a third insulating layer 130, a fourth insulating layer 185, and a second conductive layer 150. The second conductive layer 150 at least partially protrudes between the third insulating layer 130 and the fourth insulating layer 185. The second conductive layer 150 comprises an additional trace contact portion 134 extending past at least one of the third insulating layer 130 and the fourth insulating layer 185. The additional lamella contact 245 is electrically and mechanically attached to the additional trace contact portion 134. The additional stiffening unit 215 is positioned such that the additional wire 310 is positioned between the additional lamella contact 245 and the additional stiffening unit 215. In these examples, the second shield layer 135 is positioned between the additional wire 310 and the additional stiffening unit 215.

In some examples, the connector carrier 580 has a connector carrier opening 582, and forming the shielded wire 172 further comprises positioning the additional wire assembly relative to the connector carrier 580 such that the additional lamella contact 245 protrudes through the connector carrier opening 582.

In some examples, method 400 further (block 460) comprises applying a seal to seal the wire opening 594 around wire 300. In some examples, the seal is formed from a silicone rubber. In some examples, the seal is formed around both the wire 300 and the additional wire 310. The seal may seal the internal volume of the outer shell 592 against intrusion of moisture and dirt.

Examples of Electric Vehicles

Returning to FIG. 1A, electric vehicle 190 comprises a vehicle charge port 192, a vehicle battery pack 194, a power electronic module 196, and a flexible shielded high-current circuit 100. In some examples, the electric vehicle 190 may also comprise an electric motor 198. The flexible shielded high-current circuit 100 comprises a first insulating layer 110, a second insulating layer 120, a third insulating layer 130, a first conductive layer 140, a second conductive layer 150, and an electromagnetic shield 160. The first insulating layer 110, the first conductive layer 140, the second conductive layer 150, the second insulating layer 120, the electromagnetic shield 160 and the third insulating layer 130 are stacked along a stacking axis 109. The first conductive layer 140 and the second conductive layer 150 directly interface and form a stack 159. The stack 159 is positioned between the first insulating layer 110 and the second insulating layer 120. The stack 159 is configured to transmit an electric current of more than 400 Amperes. The electromagnetic shield 160 is positioned between the second insulating layer 120 and the third insulating layer 130. The electromagnetic shield 160 is configured to block electromagnetic emissions produced by the stack 159 while transmitting the electric current. The flexible shielded high-current circuit 100 connects two or more components from the group consisting of the vehicle charge port 192, the vehicle battery pack 194, and the power electronic module 196. In some examples, the flexible shielded high-current circuit 100 may transmit electrical currents between components at a voltage of at least 300 Volts, at least 400 Volts, at least 500 Volts, at least 600 Volts, at least 700 Volts, at least 800 Volts, or even at least 900 Volts.

In some examples, as illustrated in FIG. 1A, the flexible shielded high-current circuit 100 connects the vehicle charge port 192 and the vehicle battery pack 194. In these examples, the flexible shielded high-current circuit 100 provides a direct current fast charge (DCFC) connection in the electric vehicle 190.

In some examples, electric vehicle 190 further comprises an additional wire harness, routed proximate to the flexible shielded high-current circuit 100. In these examples, the electromagnetic shield 160 is positioned between the stack 159 and the additional wire harness. In other words, in this example, the electromagnetic shield 160 blocks electromagnetic emissions from flexible shielded high-current circuit 100 from interfering with the additional wire harness. In some examples, electric vehicle 190 further comprises a body panel 199. In such examples, the flexible shielded high-current circuit 100 is bonded and thermally coupled to the body panel 199.

Examples of Flexible High-Current Circuits with Sealed Connectors

Figure 10A:
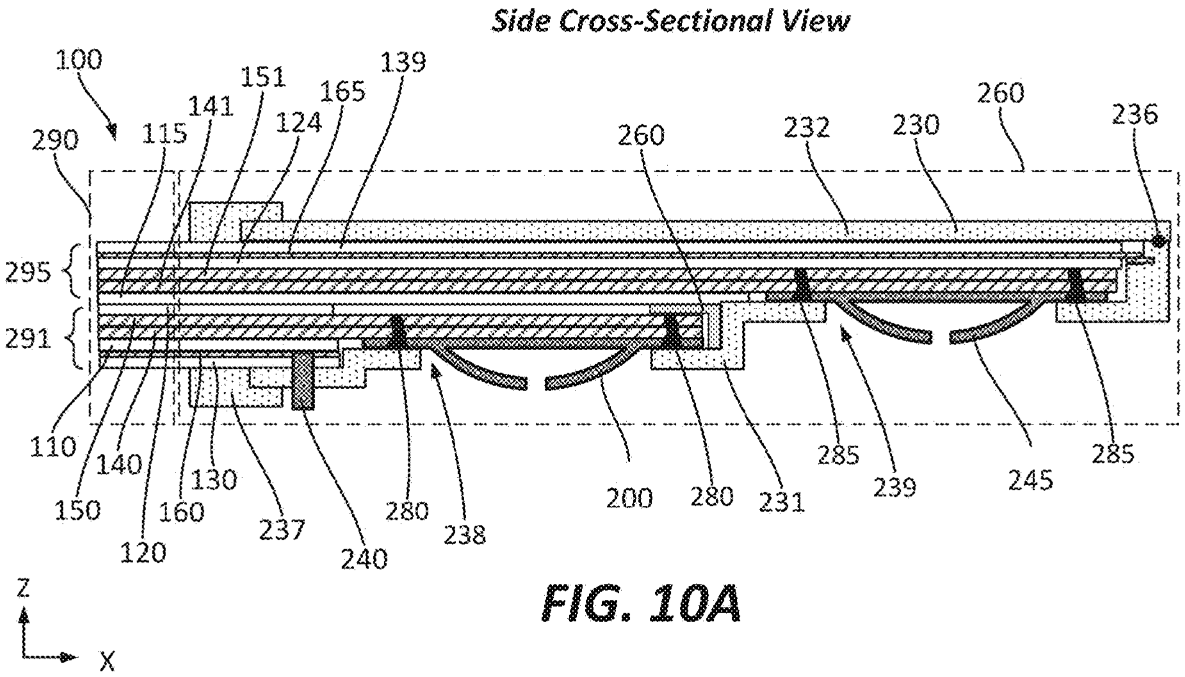
FIG. 10A is a side cross-sectional view of a flexible shielded high-current circuit comprising two conductive portions and two lamella contacts, each connected to a different conductive portion, in accordance with some examples.
Figure 10B:
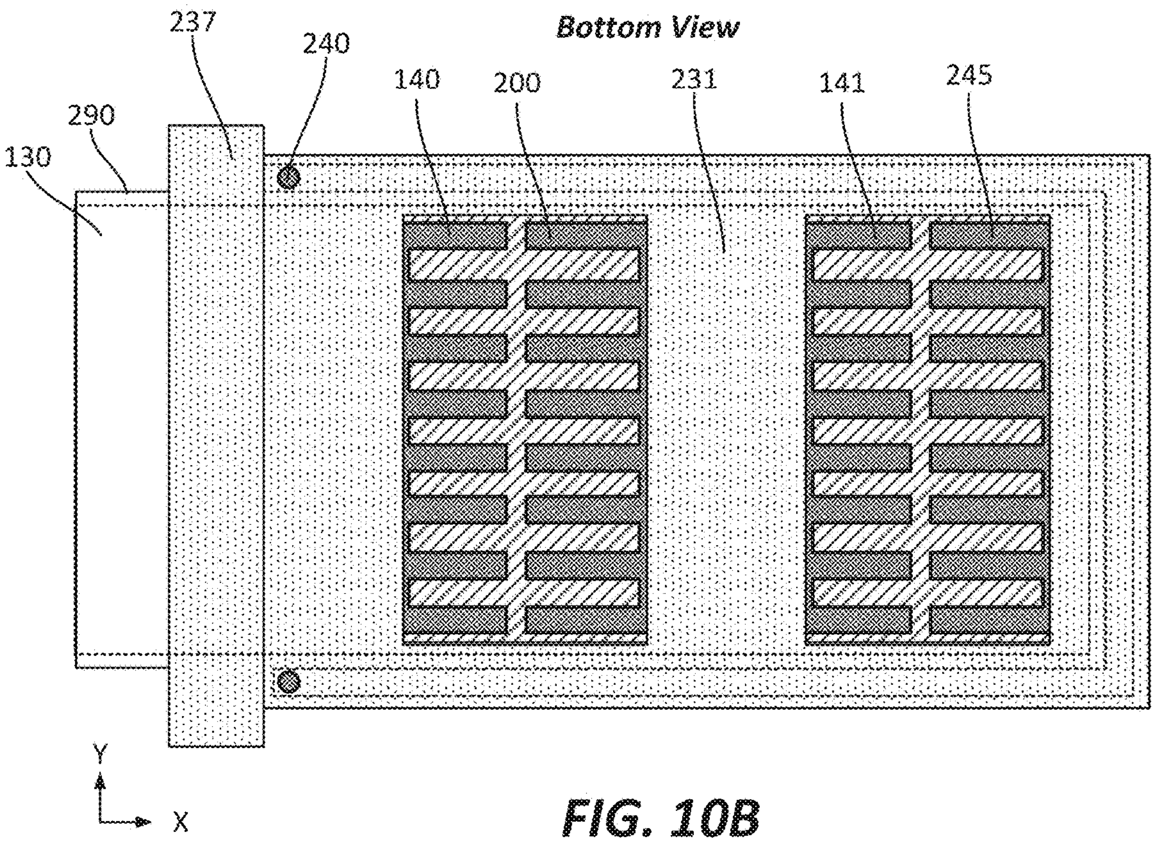
FIG. 10B is a bottom view of the flexible shielded high-current circuit in FIG. 10A, in accordance with some examples.
Figure 10C:
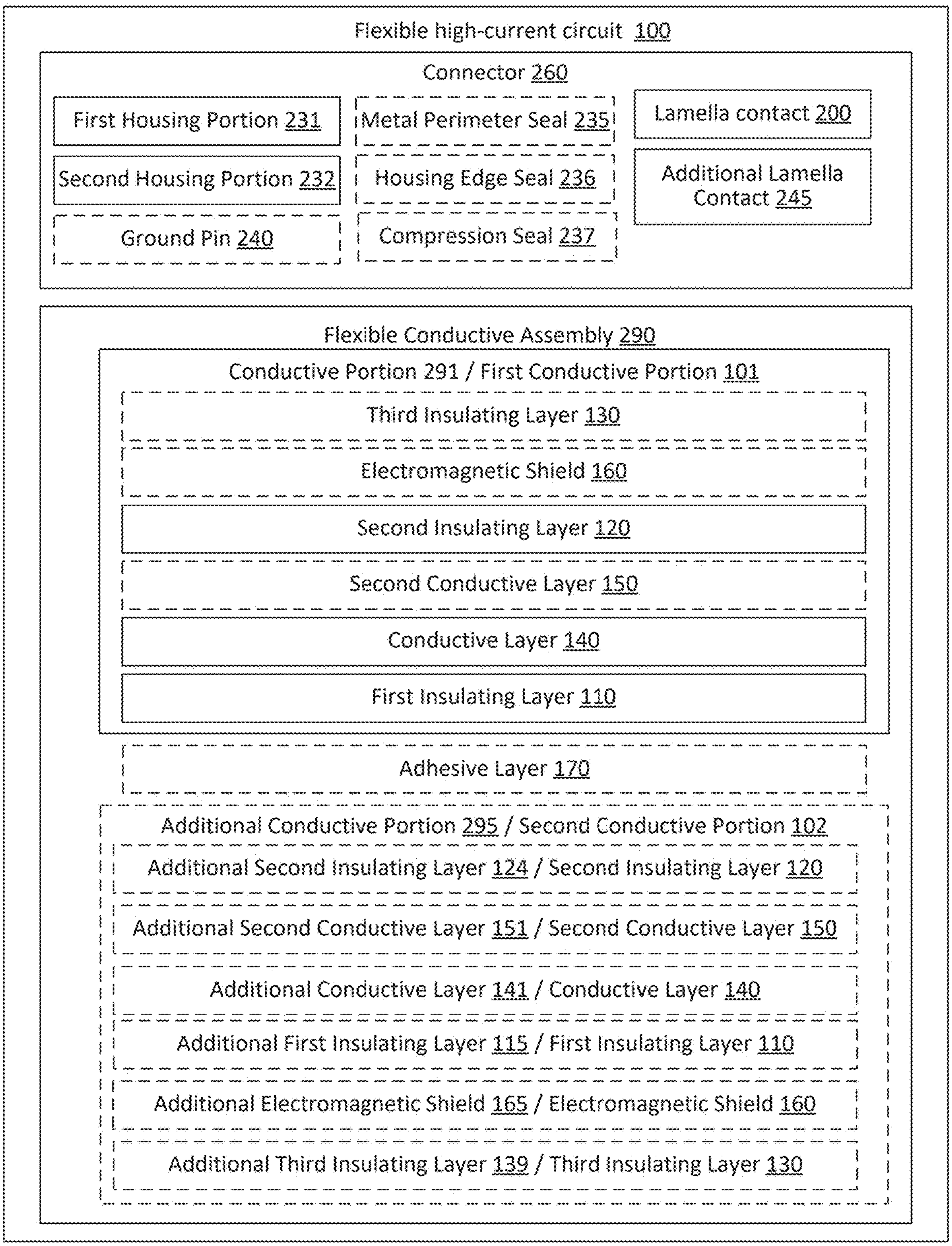
FIG. 10C is a block diagram with a flexible shielded high-current circuit comprising two conductive portions and two lamella contacts, in accordance with some examples.

FIG. 10A is a side cross-sectional view of a flexible shielded high-current circuit 100 comprising two conductive portions and two lamella contacts, each connected to a different conductive portion, in accordance with some examples. FIG. 10B is a bottom view of the flexible shielded high-current circuit 100 in FIG. 10A, in accordance with some examples. Finally, FIG. 10C is a block diagram with a flexible shielded high-current circuit 100 comprising two conductive portions and two lamella contacts, in accordance with some examples. It should be noted that a flexible shielded high-current circuit 100 with a single conductive portion/single lamella contact is also within the scope. Furthermore, a flexible shielded high-current circuit 100 comprising three or more conductive portions/lamella contacts is also within the scope.

FIGS. 10A and 10B illustrate both lamella contacts facing in the same direction (in the direction opposite of the Z-axis, which may also be referred to as "down" in FIG. 10A). However, examples in which at least two lamella contacts face in opposite directions are also within the scope. Lamellas are both on the same side, while the shields are on the opposite sides; the internal shield is not needed Various aspects of a flexible shielded high-current circuit 100, that are described above with reference to FIGS. 2A-5C, are also applicable to a flexible shielded high-current circuit 100 with sealed connectors. For example, a flexible shielded high-current circuit 100 comprises a flexible conductive assembly 290 and a connector 260. The flexible conductive assembly 290 comprises a first insulating layer 110, a second insulating layer 120, and a first conductive layer 140 positioned between the first insulating layer 110 and the second insulating layer 120. In some examples, the flexible conductive assembly 290 also comprises a second conductive layer 150 stacked with and directly interfacing with the first conductive layer 140.

The second conductive layer 150 is positioned between the first insulating layer 110 and the second insulating layer 120 together with the first conductive layer 140. The first conductive layer 140 is positioned between the second conductive layer 150 and the lamella contact 200. As noted above, a combination of the first conductive layer 140 and second conductive layer 150 helps to increase the current-carrying capabilities of the flexible shielded high-current circuit 100 while maintaining its flexibility (e.g., in comparison to a monolithic conductor that has a combined thickness of the first conductive layer 140 and second conductive layer 150).

In some examples, the flexible conductive assembly 290 further comprises an electromagnetic shield 160 and a third insulating layer 130. The electromagnetic shield 160 is positioned between the second insulating layer 120 and the third insulating layer 130. In some examples, the electromagnetic shield 160 is thinner than the first conductive layer 140. The second insulating layer 120 is positioned between the first conductive layer 140 and the electromagnetic shield 160. A combination of at least the first insulating layer 110, second insulating layer 120, and first conductive layer 140 as well as, optionally, second conductive layer 150, electromagnetic shield 160, and third insulating layer 130 may be referred to as a conductive portion 291 (or the first circuit portion 101 with reference to FIG. 3B). The conductive portion 291 may be viewed as one current carrying unit.

In some examples, the flexible conductive assembly 290 further comprises an additional conductive portion 295 (or the second circuit portion 102 with reference to FIG. 3B). The structure of the additional conductive portion 295 may be the same (e.g., a mirror image) as the conductive portion 291. For example, the additional conductive portion 295 may comprise at least an additional first insulating layer 115, an additional second insulating layer 124, and an additional first conductive layer 141 positioned between the additional first insulating layer 115 and the additional second insulating layer 124. The first insulating layer 110 and the additional first insulating layer 115 are positioned between the first conductive layer 140 and the additional first conductive layer 141. In some examples, the flexible conductive assembly 290 further comprises an adhesive layer 170 positioned between and bonding the first insulating layer 110 and the additional first insulating layer 115.

Additional features of various components of each conductive portion are described above.

Referring to FIGS. 10A-10C, a connector 260 comprises a lamella contact 200 and a connector housing 230. The connector housing 230 may be assembled using a first housing portion 231 and a second housing portion 232 with a housing edge seal 236 positioned in between the sealing the first housing portion 231 and second housing portion 232 relative to each other. The housing edge seal 236 may form a partial loop around the lamella contact 200. A portion of the flexible conductive assembly 290 protrudes into and sealed within the connector 260.

The connector housing 230 comprises a housing opening 238. The lamella contact 200 protrudes through the housing opening 238 to enable direct physical/electrical contact with the lamella contact 200. As shown in FIG. 10A, the lamella contact 200 directly interfaces and is welded to the first conductive layer 140 forming a weld seam 280 at least partially extending through the first conductive layer 140.

In some examples, the connector housing 230 comprises a compression seal 237 surrounding and compressing a length portion of the flexible conductive assembly 290 and also surrounding and compressing portions of the first housing portion 231 and the second housing portion 232.

Weld Seam Examples

As noted above, the first conductive layer 140 is welded to the lamella contact 200, e.g., forming a weld seam 280. In some examples, the weld seam 280 fully extends through the first conductive layer 140 (e.g., the weld to the lamella contact 200 may be formed from the side of the first conductive layer 140). In the same or other examples, the weld seam 280 may only partially extend through the lamella contact 200 (e.g., without reaching the connector housing 230). This partial extension may be relied on to preserve the sealing interface between the connector housing 230 and lamella contact 200.

When a second conductive layer 150 is presented, such that the first conductive layer 140 is stacked between the second conductive layer 150 and lamella contact 200, the weld seam 280 may protrude through both the second conductive layer 150 and first conductive layer 140 thereby interconnecting the second conductive layer 150 and first conductive layer 140 and also connecting these layers to the lamella contact 200.

In some examples, the weld seam 280 forms a continuous enclosed shape along the edges of the lamella contact 200.

In some examples, the connector 260 comprises an additional lamella contact 245 directly interfacing and welded to the additional first conductive layer 141 forming an additional weld seam 285 at least partially extending through the additional first conductive layer 141. The connector housing 230 comprises an additional housing opening 239 with the additional lamella contact 245 protruding through the additional housing opening 239. The connector housing 230 comprises an additional housing opening 239 with the additional lamella contact 245 protruding through the additional housing opening 239.

Examples of Interfaces between Circuit Shields to Connectors

In some examples, the connector 260 comprises a grounding pin 240 protruding through the connector housing 230 and forming an electrical connection to the electromagnetic shield 160. Thereby, an external connection (e.g., ground) can be made to the electromagnetic shield 160 through the connector 260.

In some examples, the flexible conductive assembly 290 further comprises an additional electromagnetic shield 165. The connector housing 230 may comprise a metal perimeter seal 235 at least partially surrounding the lamella contact 200 and the additional lamella contact 245. The additional electromagnetic shield 165 is welded to the metal perimeter seal 235 along the entire length of the metal perimeter seal 235.

Methods of Fabricating Flexible High-Current Circuits

Figure 11:
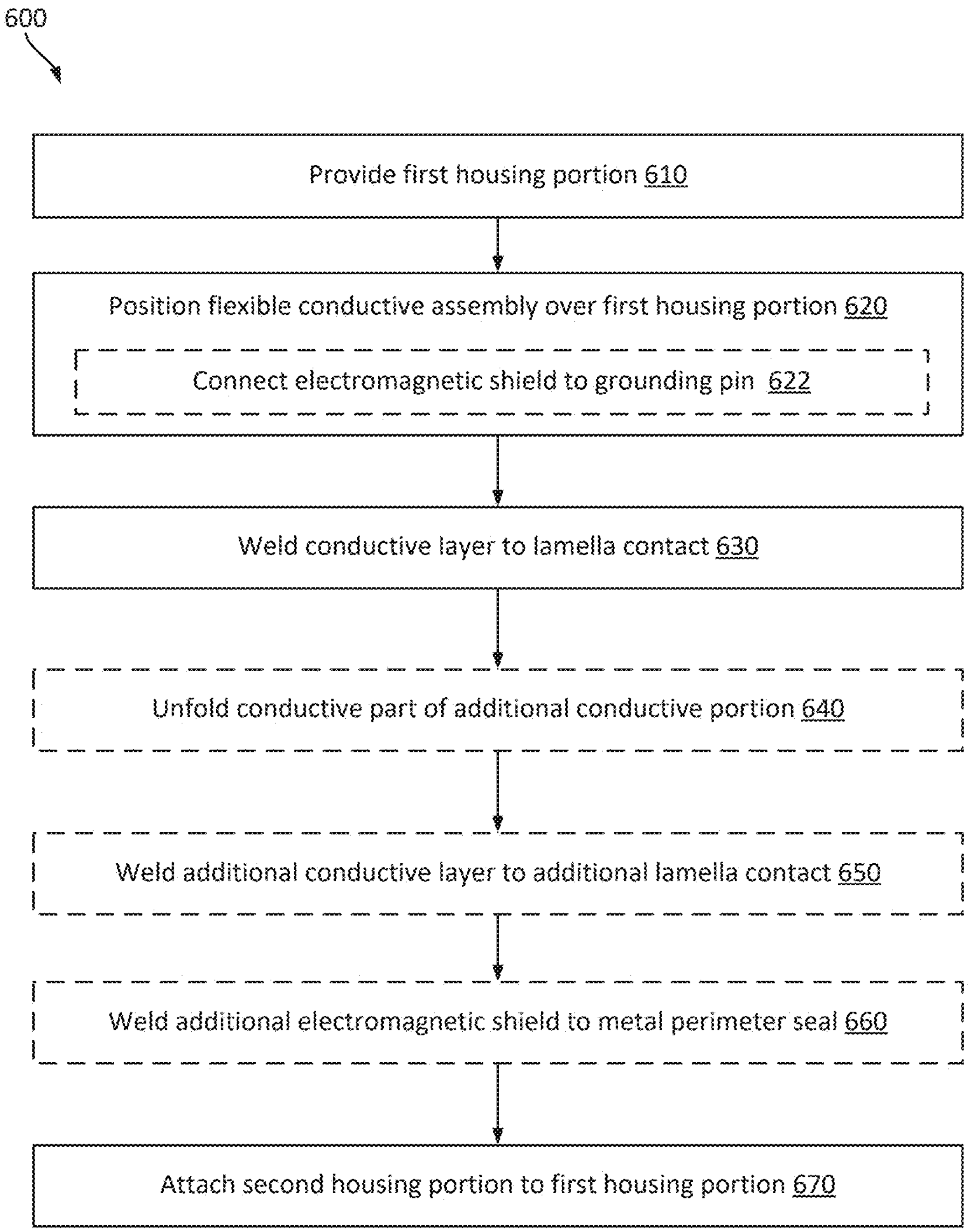
FIG. 11 is a process flowchart corresponding to a method of fabricating a flexible shielded high-current circuit, in accordance with some examples.

FIG. 11 is a process flowchart corresponding to a method 600 of fabricating a flexible shielded high-current circuit 100, in accordance with some examples. Various aspects of the flexible shielded high-current circuit 100 are described above. It should be noted that method 600 may vary depending on the design of the flexible shielded high-current circuit 100, e.g., the presence of the additional conductive portion 295.

Figure 12A:
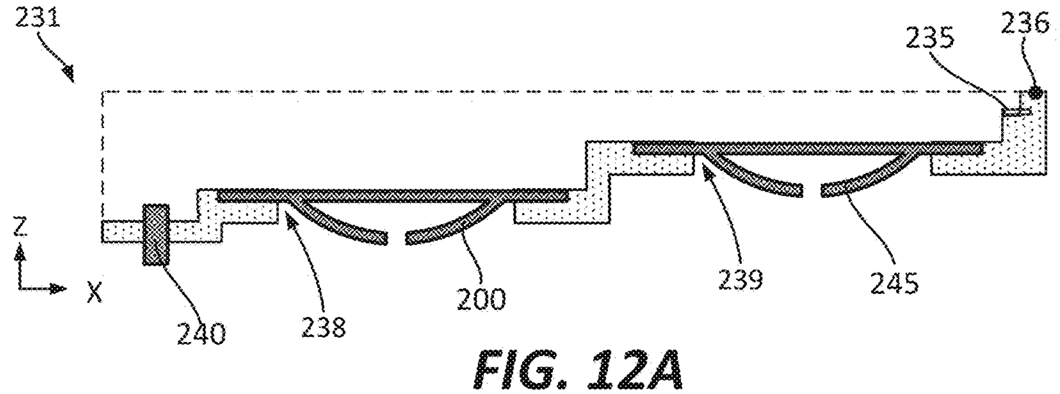
FIG. 12A is a schematic cross-sectional view of a flexible shielded high-current circuit comprising a lamella contact, in accordance with some examples.

The method 600 comprises (block 610) providing a first housing portion 231, one example of which is shown in FIG. 12A. Specifically, the first housing portion 231 comprises a lamella contact 200 and a housing opening 238 with a portion of the lamella contact 200 protruding through the housing opening 238. In some examples, when an additional/second connection is provided by the connector 260 or, more generally, by the flexible shielded high-current circuit 100, the first housing portion 231 may comprise an additional lamella contact 245 and an additional housing opening 239 with a portion of the additional lamella contact 245 protruding through the additional housing opening 239. In this example, both the lamella contact 200 and the additional lamella contact 245 are designed to form separate electrical connections on the same side of the connector 260 or, more generally, of the flexible shielded high-current circuit 100.

The lamella contact 200 and, if present, the additional lamella contact 245 may be integrated into the body of the first housing portion 231 (e.g., during the injection molding of the body), thereby forming seals between the body and each lamella contact, e.g., the enclosed boundary of each lamella contact that interfaces the body of the first housing portion 231. Additional seals are formed when the first conductive layer 140 is welded to the lamella contact 200 (and the additional first conductive layer 141 is welded to the additional lamella contact 245), thereby forming the seal between the first conductive layer 140 (and the 225) and the body of the first housing portion 231. It should be noted that each lamella contact may be open in the middle (i.e., within the enclosed boundary of each lamella contact that interfaces the body of the first housing portion 231).

Figure 12B:
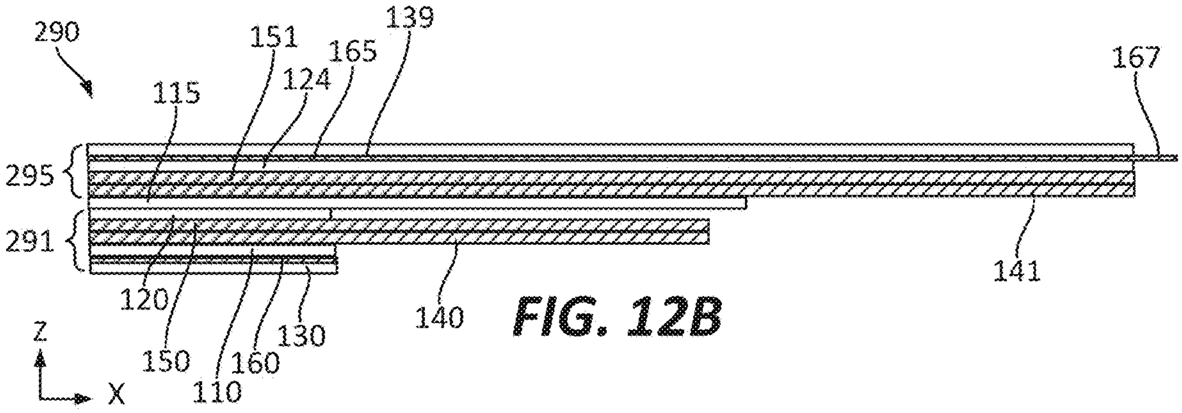
FIG. 12B is a schematic bottom view of a flexible shielded high-current circuit comprising a lamella contact, in accordance with some examples.
Figure 12C:
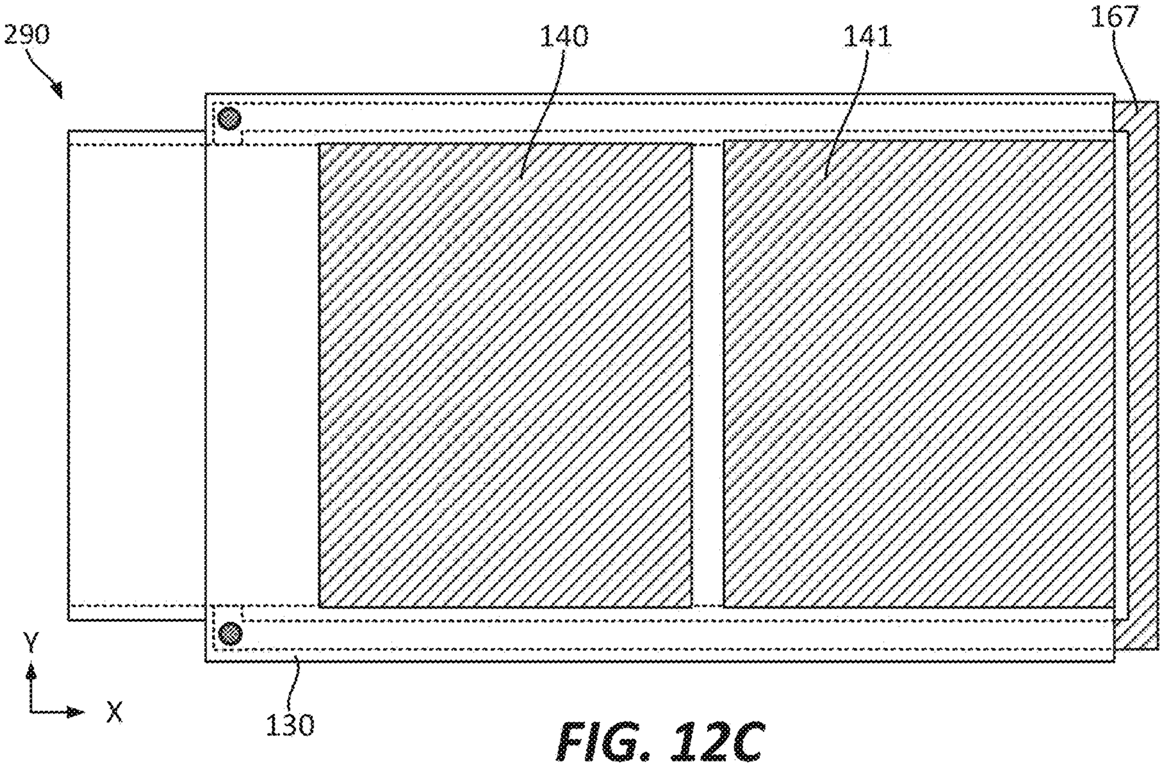
FIG. 12C is a schematic cross-sectional view of a flexible shielded high-current circuit comprising a lamella contact, in accordance with some examples.

This first housing portion 231 is used for attaching a flexible conductive assembly 290 shown in FIG. 12B (side cross-sectional view) and FIG. 12C (a bottom view). The flexible conductive assembly 290 comprises a first insulating layer 110, a second insulating layer 120, and a first conductive layer 140 positioned at least in part between the first insulating layer 110 and the second insulating layer 120 with a portion of the first conductive layer 140 extending past both of the first insulating layer 110 and the second insulating layer 120 and directly interfacing the lamella contact 200.

Figure 13A:
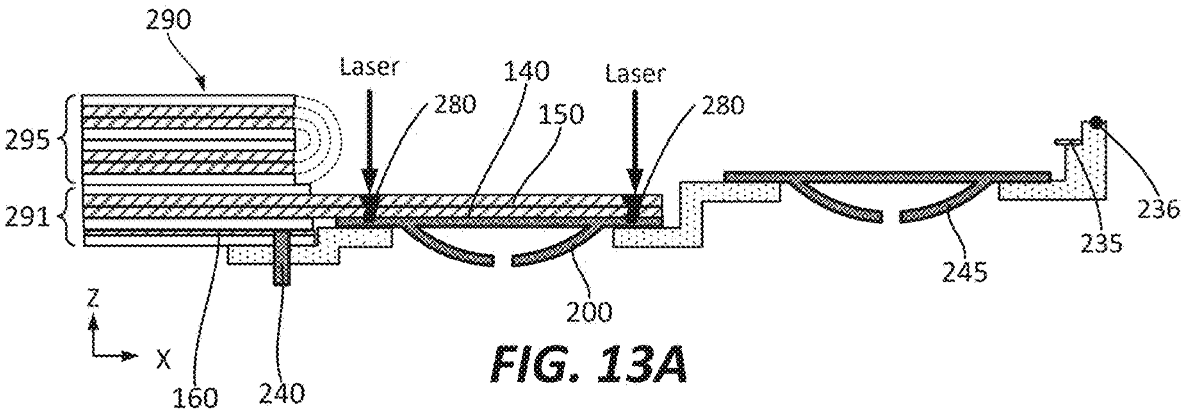
FIG. 13A is a side cross-sectional view of a flexible shielded high-current circuit comprising two conductive portions and two lamella contacts, each connected to a different conductive portion, in accordance with some examples.

Method 600 proceeds with (block 620) positioning a flexible conductive assembly 290 over the first housing portion 231, e.g., as shown in FIG. 13A. At this point, the first conductive layer 140 may come in direct contact with the lamella contact 200. For example, the stack of the first conductive layer 140 and second conductive layer 150 may be pressed over the lamella contact 200.

In some examples, the flexible conductive assembly 290 further comprises an electromagnetic shield 160 and a third insulating layer 130 as described above. The first-flexible-conductive-assembly positioning operation (block 620) may comprise (block 622) connecting the electromagnetic shield 160 to a grounding pin 240 protruding through the first housing portion 231, e.g., as shown in FIG. 13A. In some examples, the grounding pin 240 (e.g., multiple pins) may be used for alignment/registration of the flexible conductive assembly 290 relative to the first housing portion 231.

Method 600 proceeds with (block 630) welding the first conductive layer 140 to the lamella contact 200 forming a weld seam 280, e.g., as shown in FIG. 13A. For example, a laser welded may be used for this operation. The welding operation may be performed from the conductive layer side (rather than from the lamella contact side). In fact, the other side of the lamella contact (aligned with the weld seam 280) may be covered with the body of the first housing portion 231, e.g., as shown in FIG. 13A.

When the flexible conductive assembly 290 comprises an additional conductive portion 295, the additional conductive portion 295 is folded away from the weld zone to provide access to the first conductive layer 140 and, if present, the second conductive layer 150, e.g., as shown in FIG. 13A. For example, if the flexible conductive assembly 290 comprises an adhesive layer 170 between the conductive portion 291 and the additional conductive portion 295, the adhesive layer 170 may not extend into the part that is positioned over the first housing portion 231.

Figure 13B:
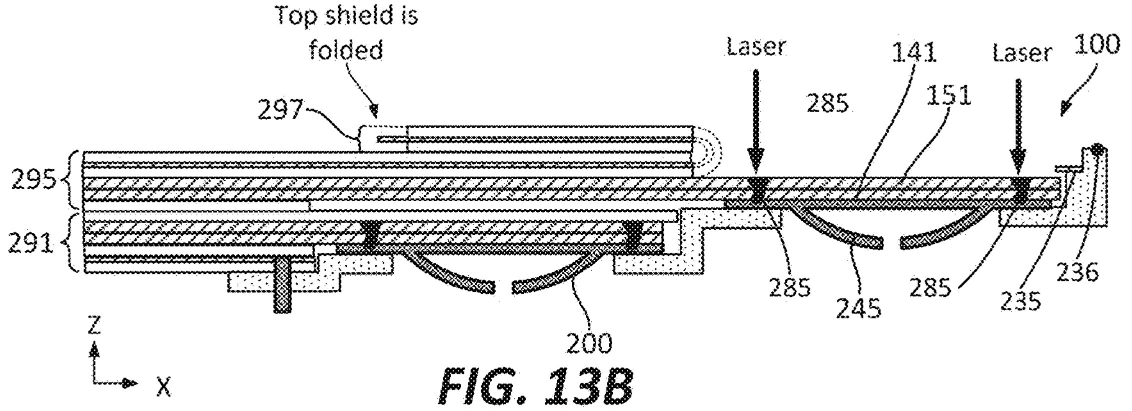
FIG. 13B is a bottom view of the flexible shielded high-current circuit in FIG. 5A, in accordance with some examples.

Furthermore, when the flexible conductive assembly 290 comprises an additional conductive portion 295, method 600 proceeds with (block 640) unfolding a conductive part of the additional conductive portion 295, e.g., as shown in FIG. 13B. After this unfolding operation, the additional first conductive layer 141 and, if present, an additional second conductive layer 151 are positioned over the additional lamella contact 245. Specifically, the additional first conductive layer 141 may directly interface and may even be pressed against the additional lamella contact 245. If present, the additional second conductive layer 151 may be pressed against the additional first conductive layer 141 thereby ensuring the quality weld among the stacked components.

It should be noted that a shield construction 297 comprising the additional second insulating layer 124 and, if present, the additional electromagnetic shield 165 and the additional third insulating layer 139 remain still folded, e.g., as shown in FIG. 13B. In some examples, the additional second conductive layer 151 may not extend to the additional lamella contact 245, while the additional electromagnetic shield 165 and the additional third insulating layer 139 may also not extend over the additional lamella contact 245 or may not be present at all. In these examples, the additional first conductive layer 141 or, if present, an additional second conductive layer 151 is exposed without the need for folding other layers. Furthermore, in these examples, a second housing portion 232 acts as a cover insulator.

In either case, method 600 may proceed with (block 650) welding the additional first conductive layer 141 or, if present, an additional second conductive layer 151 to the additional lamella contact 245, e.g., as shown in FIG. 13B. This operation may be similar to welding the first conductive layer 140 to the lamella contact 200 (described above with reference to block 630).

Figure 14A:
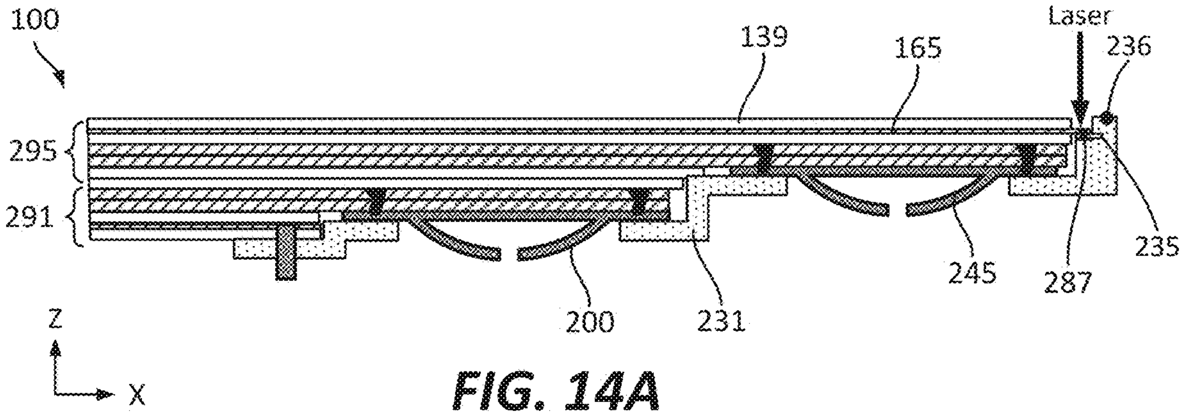
FIG. 14A and FIG. 14B are side cross-sectional and bottom views of a subassembly comprising a first housing portion and a flexible conductive assembly after welding the additional electromagnetic shield to the metal perimeter seal, in accordance with some examples.
Figure 14B:
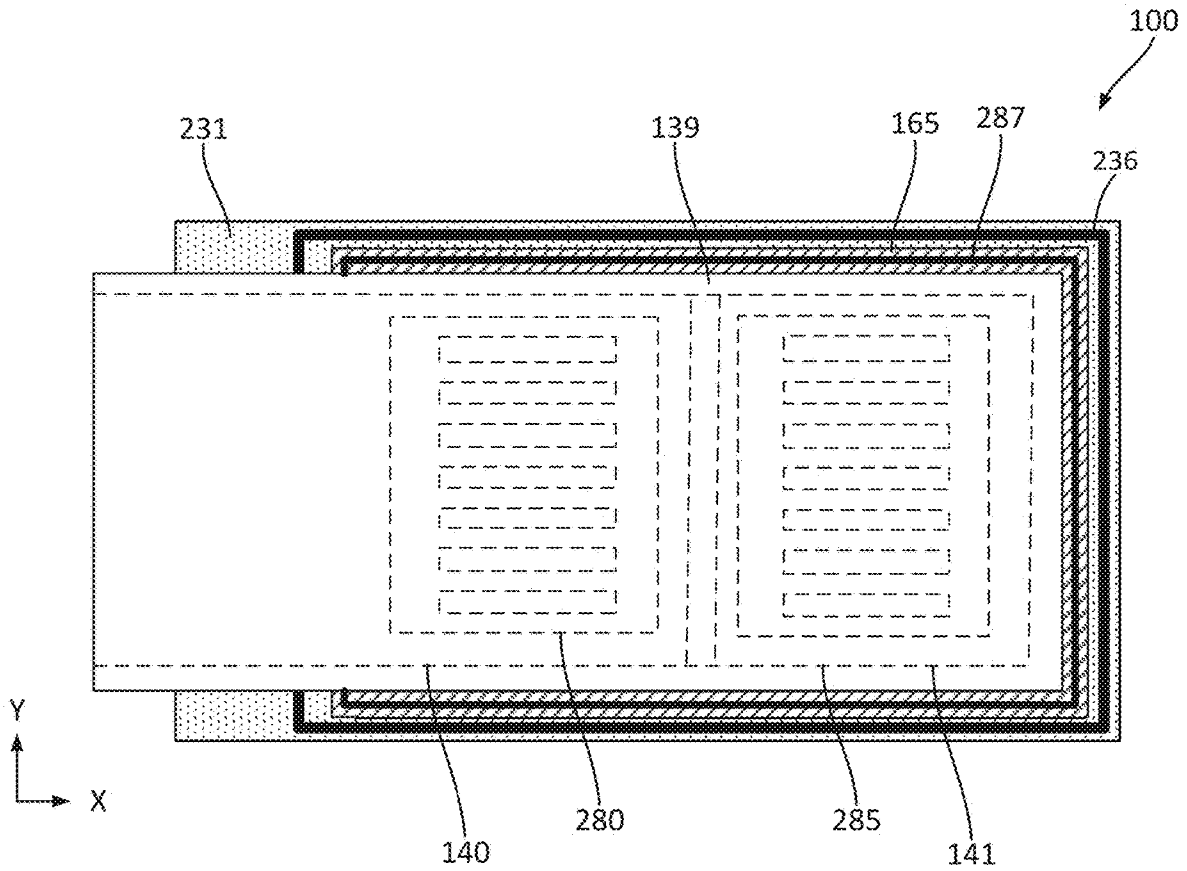

In some examples, the flexible conductive assembly 290 further comprises an additional electromagnetic shield 165 as described above. Method 600 may comprise (block 660) welding the additional electromagnetic shield 165 to the metal perimeter seal 235 along the entire length of the metal perimeter seal 235, e.g., as shown in FIGS. 14A-14B. Specifically, a portion of the additional electromagnetic shield 165 may extend outside of the boundaries of the conductive layers and insulators (in particular, the additional third insulating layer 139) of the flexible conductive assembly 290 and directly interface with the metal perimeter seal 235. This extension of the additional electromagnetic shield 165 and the metal perimeter seal 235 are welded, forming a perimeter weld 287 that provides additional sealing between the flexible conductive assembly 290 and the first housing portion 231. Specifically, the metal perimeter seal 235 may be integrated into the first housing portion 231 during the fabrication (e.g., injection molding) of the body of the first housing portion 231.

Figure 15A:
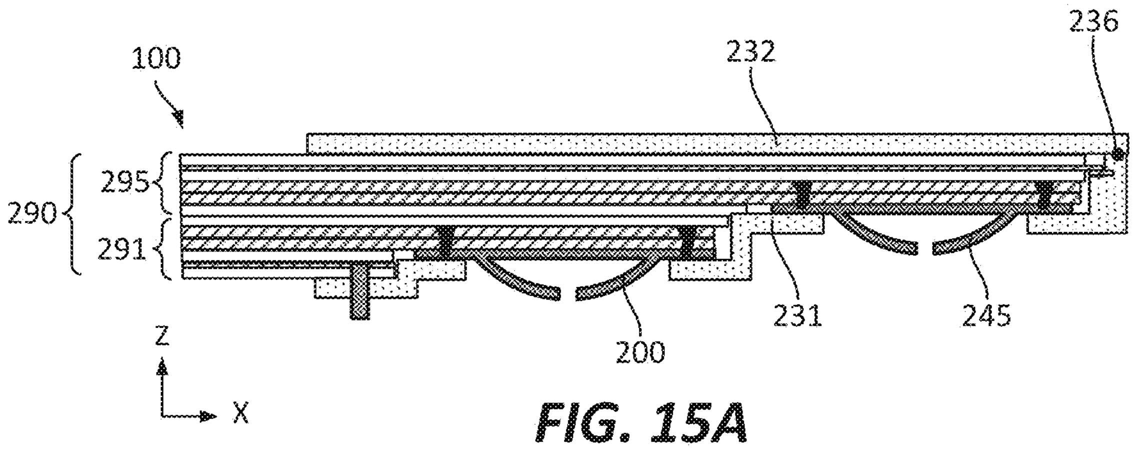
FIG. 15A is a side cross-sectional view of a subassembly comprising a first housing portion, a second housing portion, and a flexible conductive assembly after attaching the second housing portion to the first housing portion, in accordance with some examples.

Method 600 proceeds with (block 670) attaching a second housing portion 232 to the first housing portion 231 such that a portion of the flexible conductive assembly 290 extends between and sealed by the first housing portion 231 and the second housing portion 232, e.g., as shown in FIG. 15A.

Figure 15B:
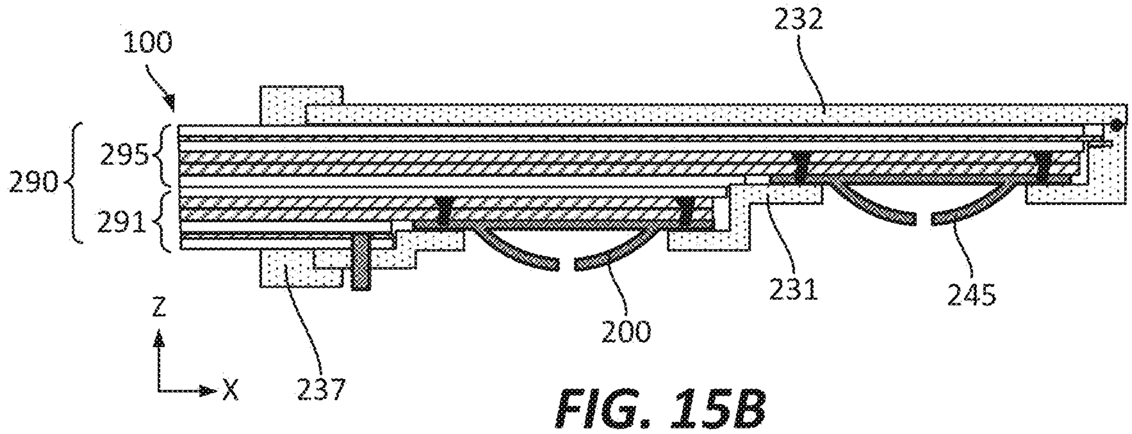
FIG. 15B is a side cross-sectional view of a flexible shielded high-current circuit after installing a compression seal over the first housing portion, second housing portion, and flexible conductive assembly to form various seals, in accordance with some examples.

Method 600 may also involve installing a compression seal 237 over the flexible conductive assembly 290 and over the combination of the first housing portion 231 and second housing portion 232, e.g., as shown in FIG. 15B. Specifically, the compression seal 237 may be sealed over each of the flexible conductive assembly 290, first housing portion 231, and second housing portion 232. Furthermore, the compression seal 237 may help to establish the seals between the flexible conductive assembly 290 and each of the first housing portion 231 and the second housing portion 232.

Examples of Flexible Conductive Assemblies

Figure 16A:
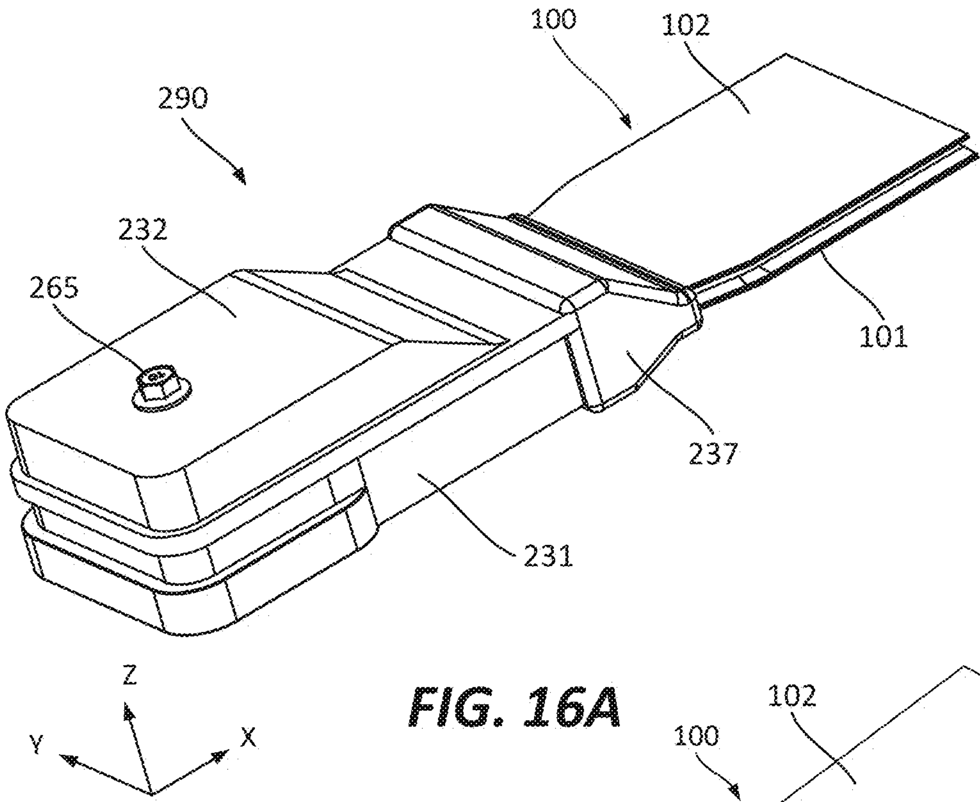
FIG. 16A and FIG. 16B are schematic perspective views of a flexible conductive assembly, in accordance with some examples.
Figure 16B:
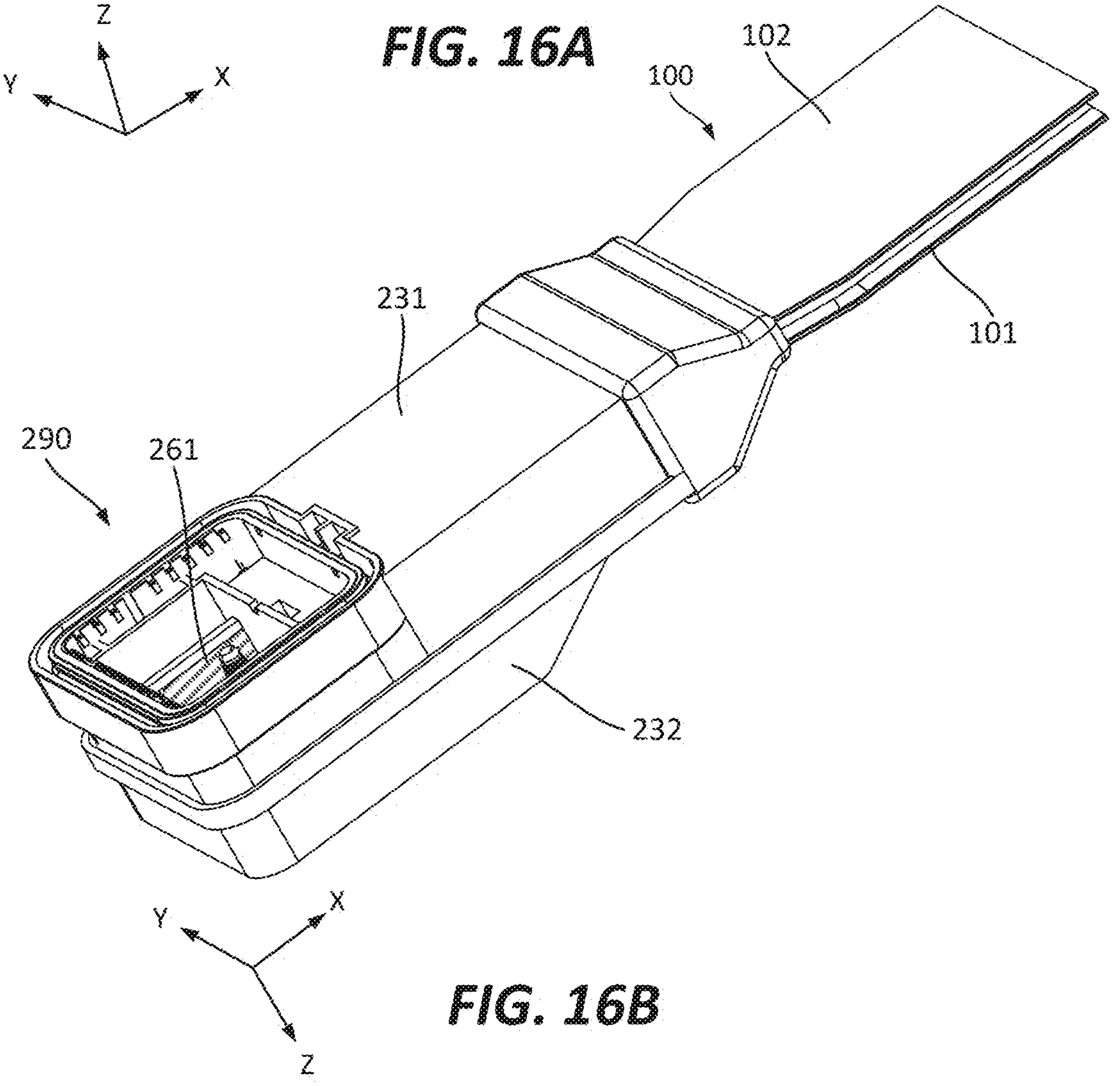
Figure 16C:
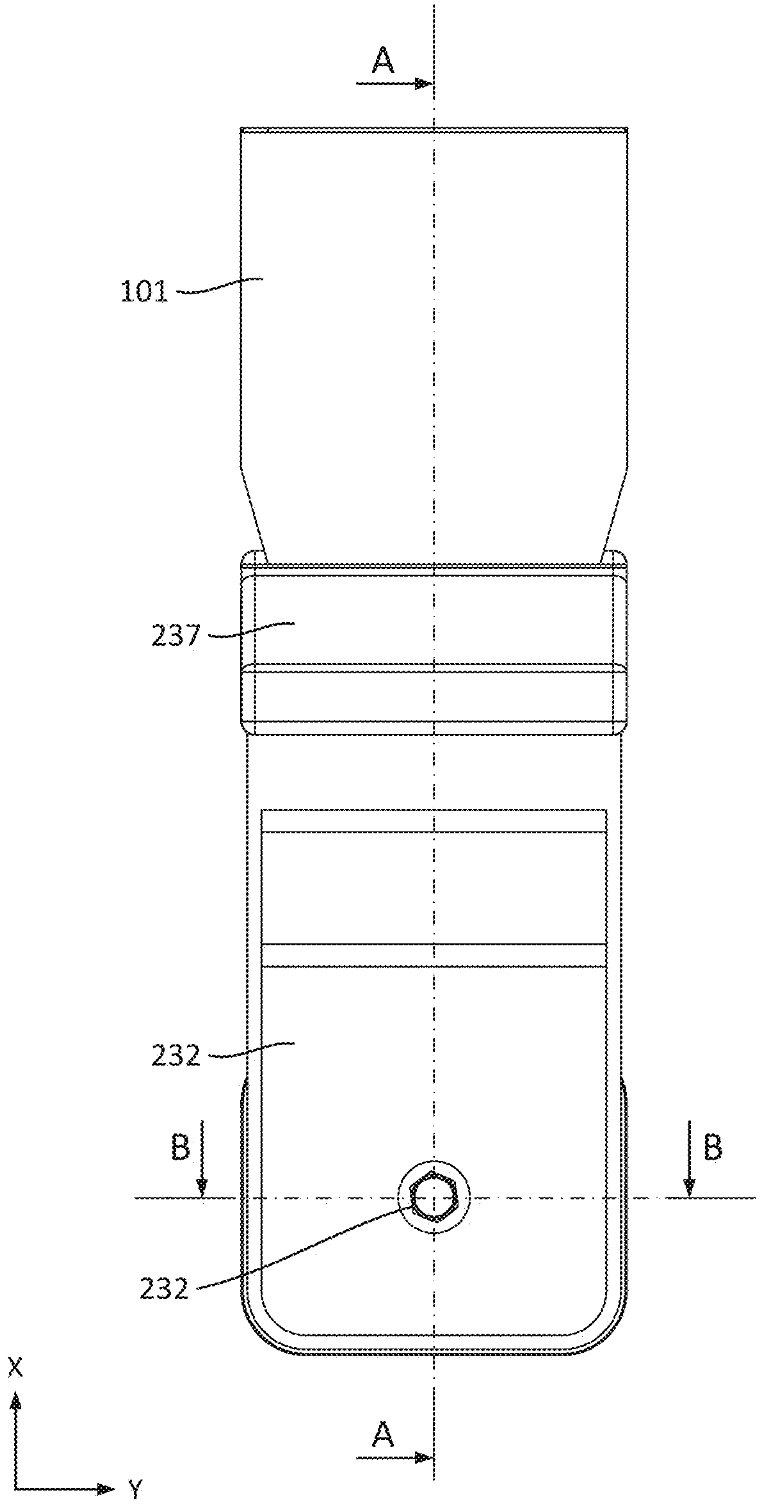
FIG. 16C is a top view of the flexible conductive assembly of FIG. 16A and FIG. 16B, in accordance with some examples.
Figure 16D:
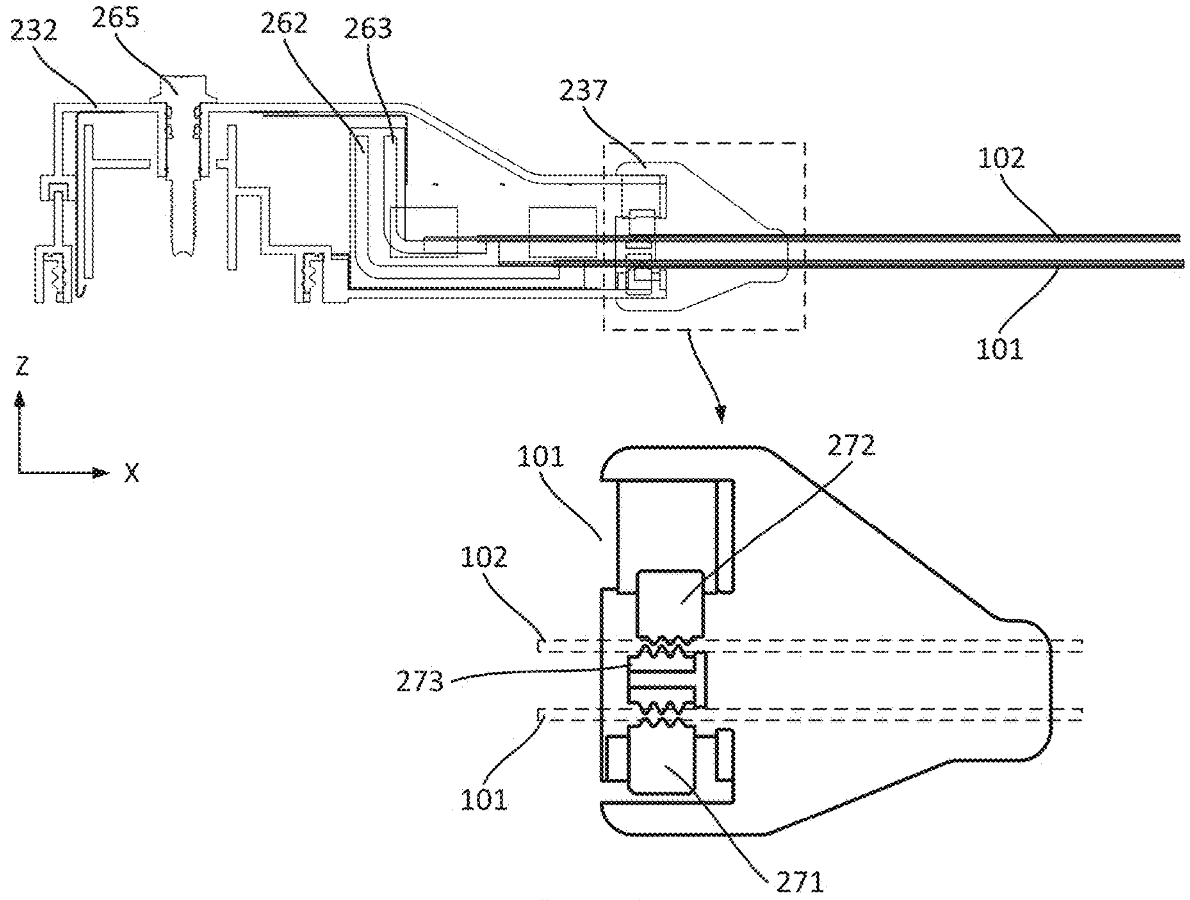
FIG. 16D is a cross-sectional side view of the flexible conductive assembly of FIG. 16A and FIG. 16B, in accordance with some examples.
Figure 16E:
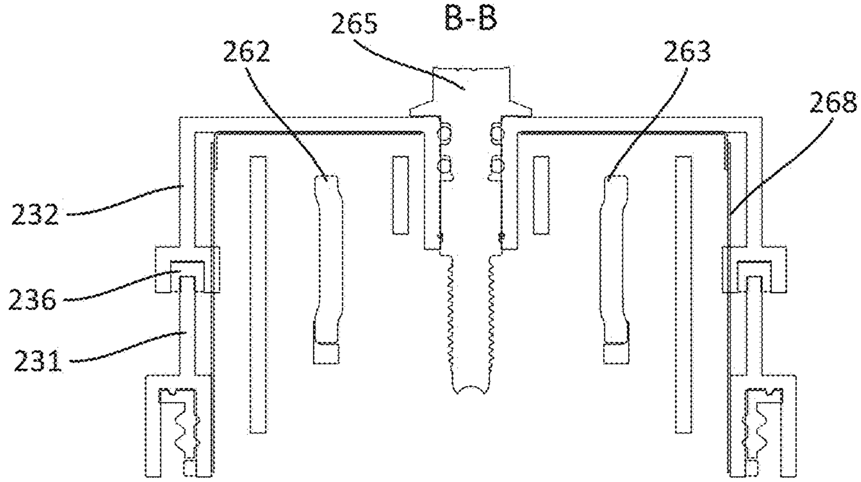
FIG. 16E is a cross-sectional top view of the flexible conductive assembly of FIG. 16A and FIG. 16B, in accordance with some examples.
Figure 16F:
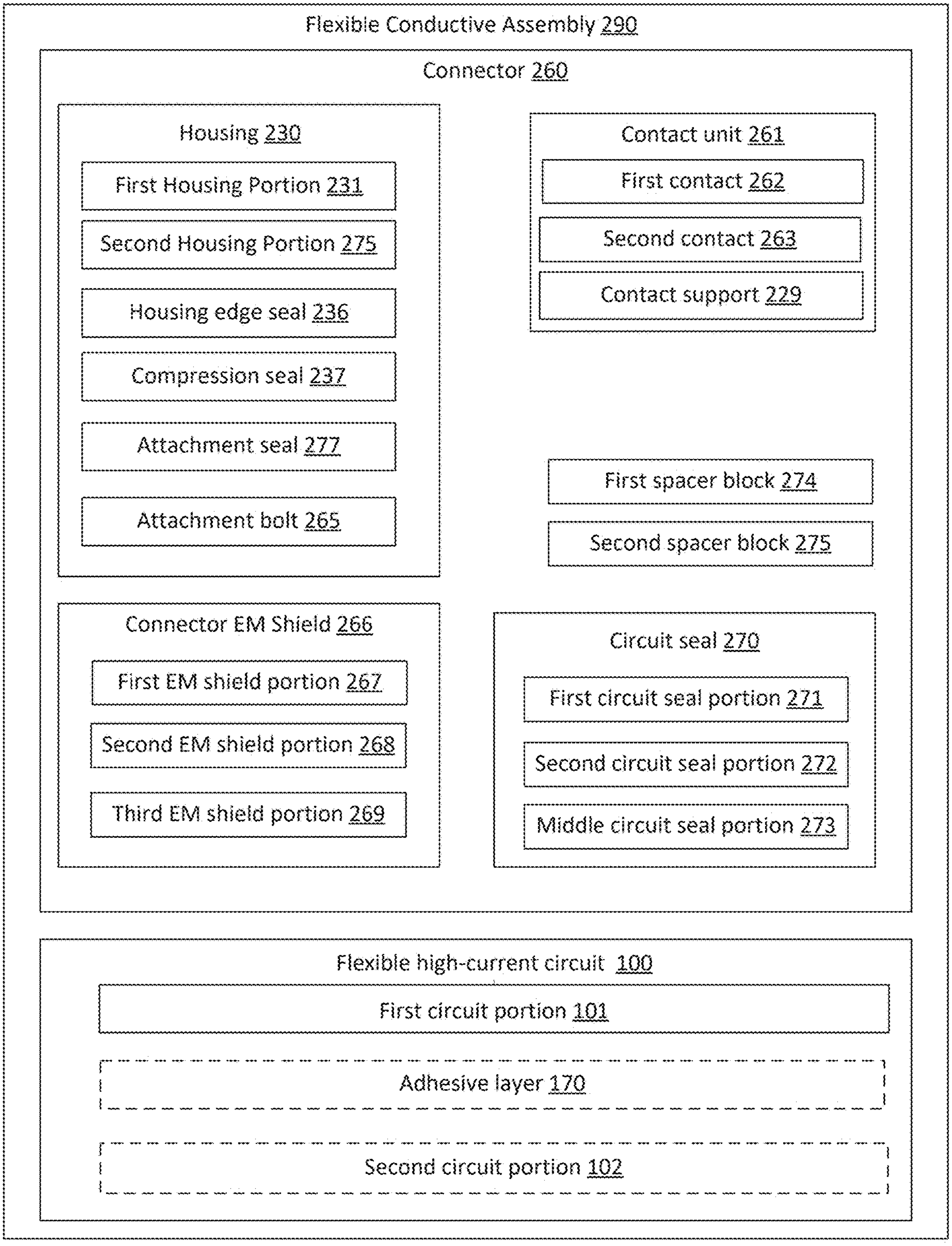
FIG. 16F is a block diagram showing components of the flexible conductive assembly of FIG. 16A and FIG. 16B, in accordance with some examples.
Figure 17A:
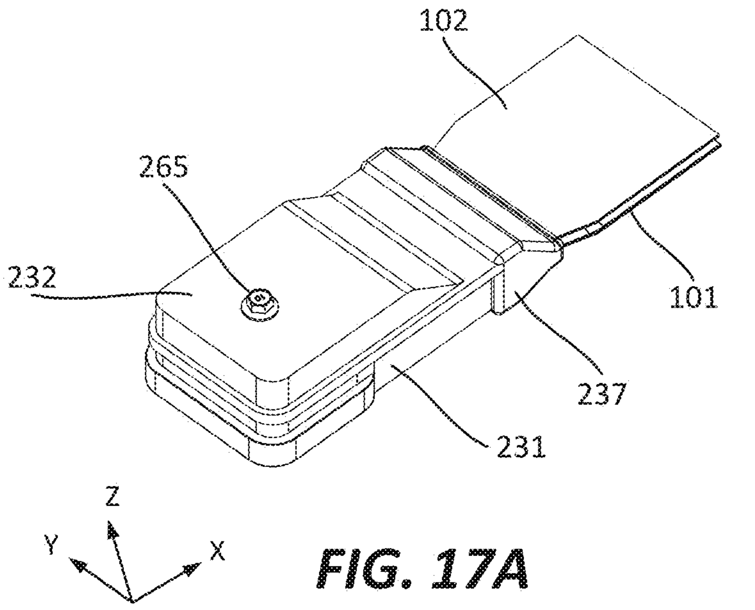
FIG. 17A is a schematic perspective view of a flexible conductive assembly, in accordance with some examples.
Figure 17B:
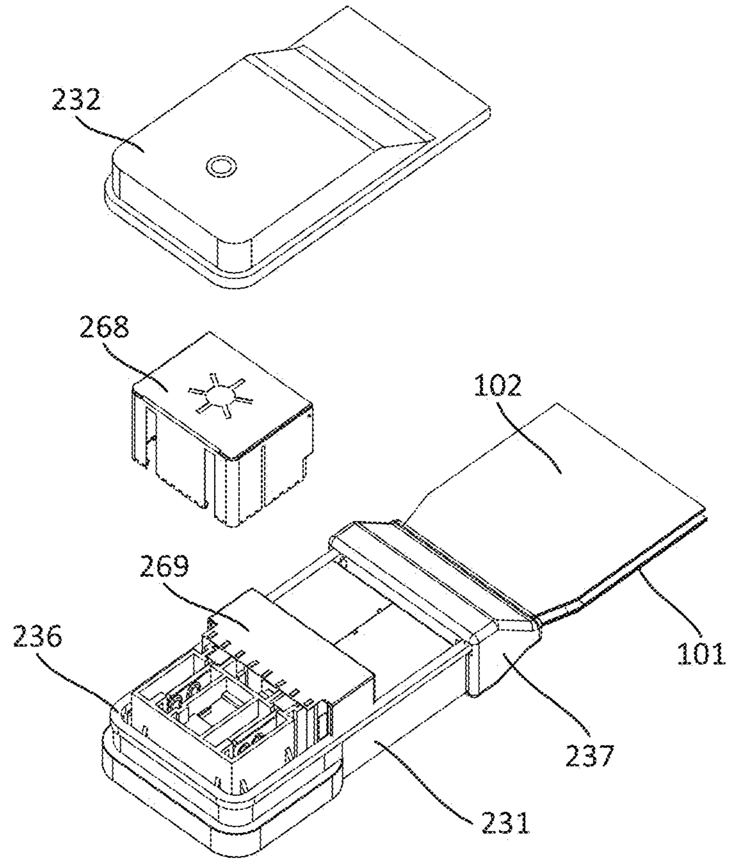
FIG. 17B is an exploded perspective view of the flexible conductive assembly of FIG. 17A, in accordance with some examples.
Figure 18:
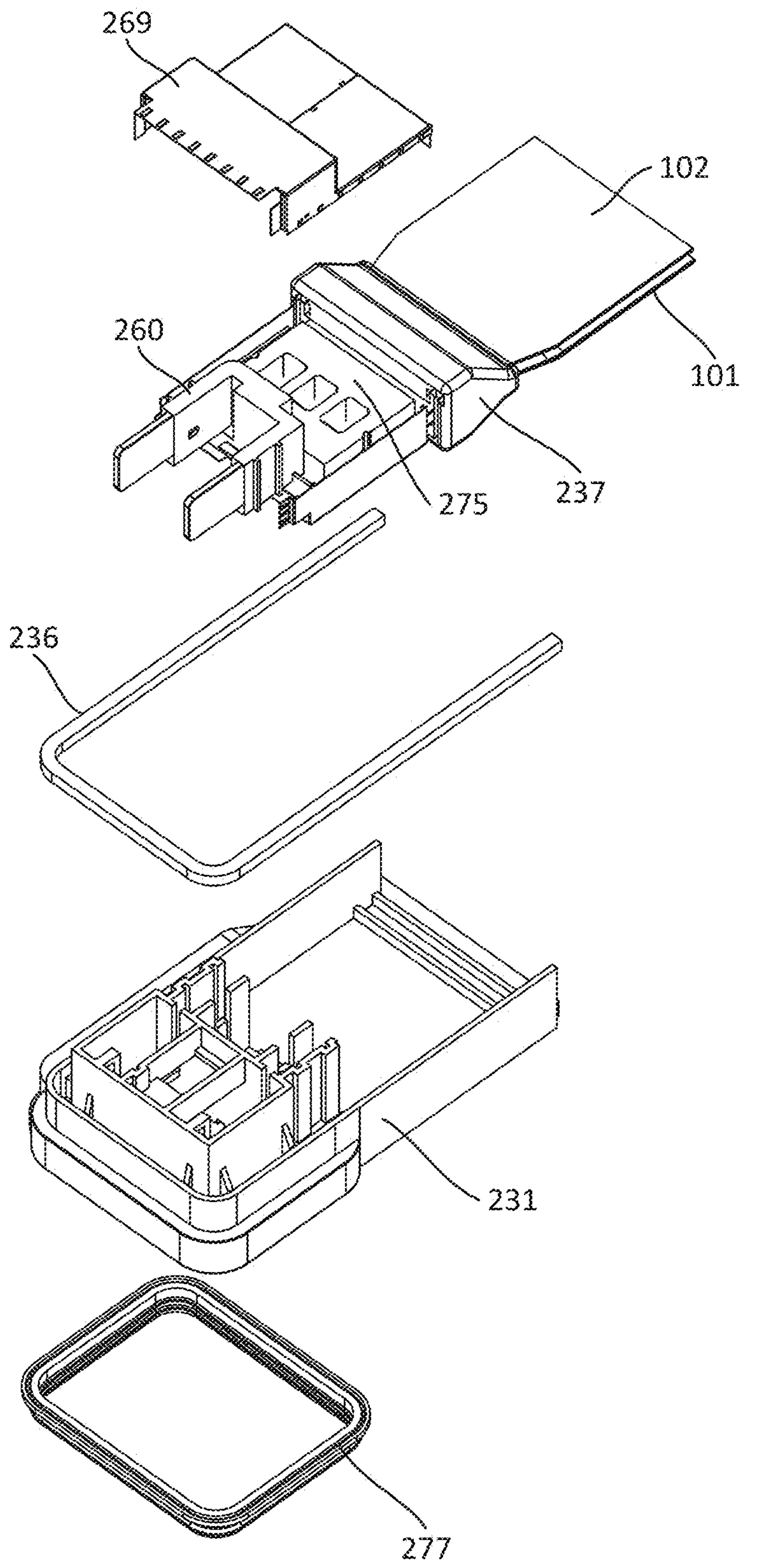
FIG. 18 is an exploded perspective view of a flexible conductive assembly, in accordance with some examples.
Figure 19A:
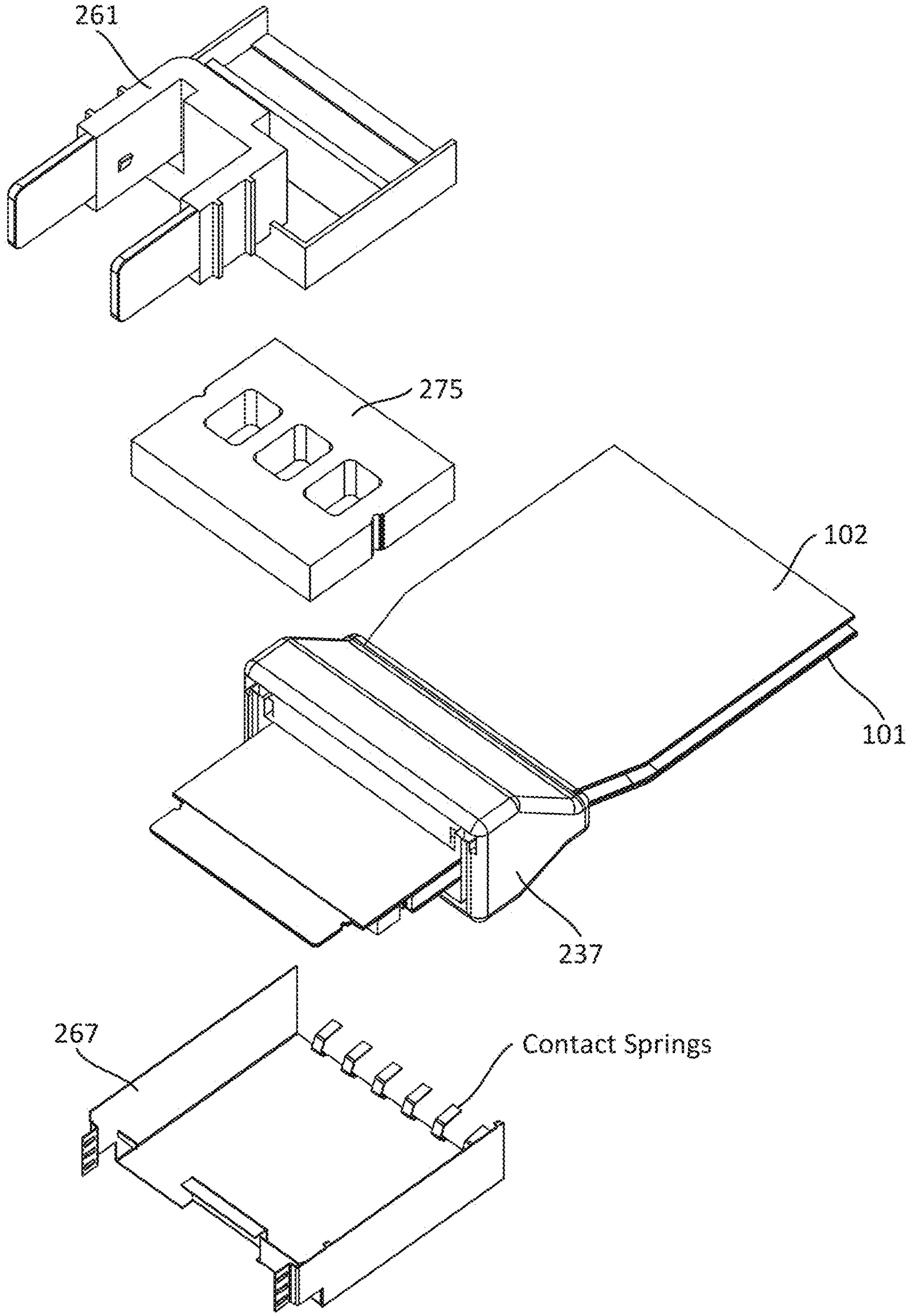
FIG. 19A is an exploded perspective view of components of a flexible conductive assembly, in accordance with some examples.
Figure 19B:
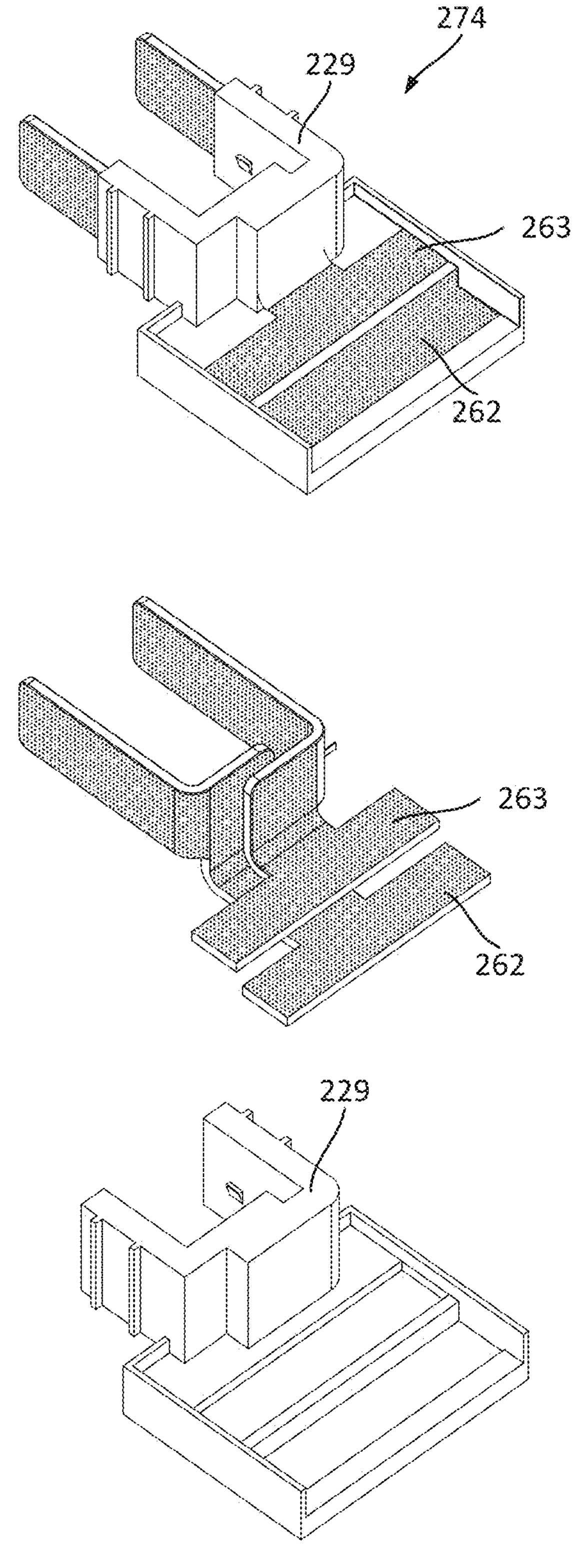
FIG. 19B is an exploded perspective view of components of a flexible conductive assembly, in accordance with some examples.
Figure 20A:
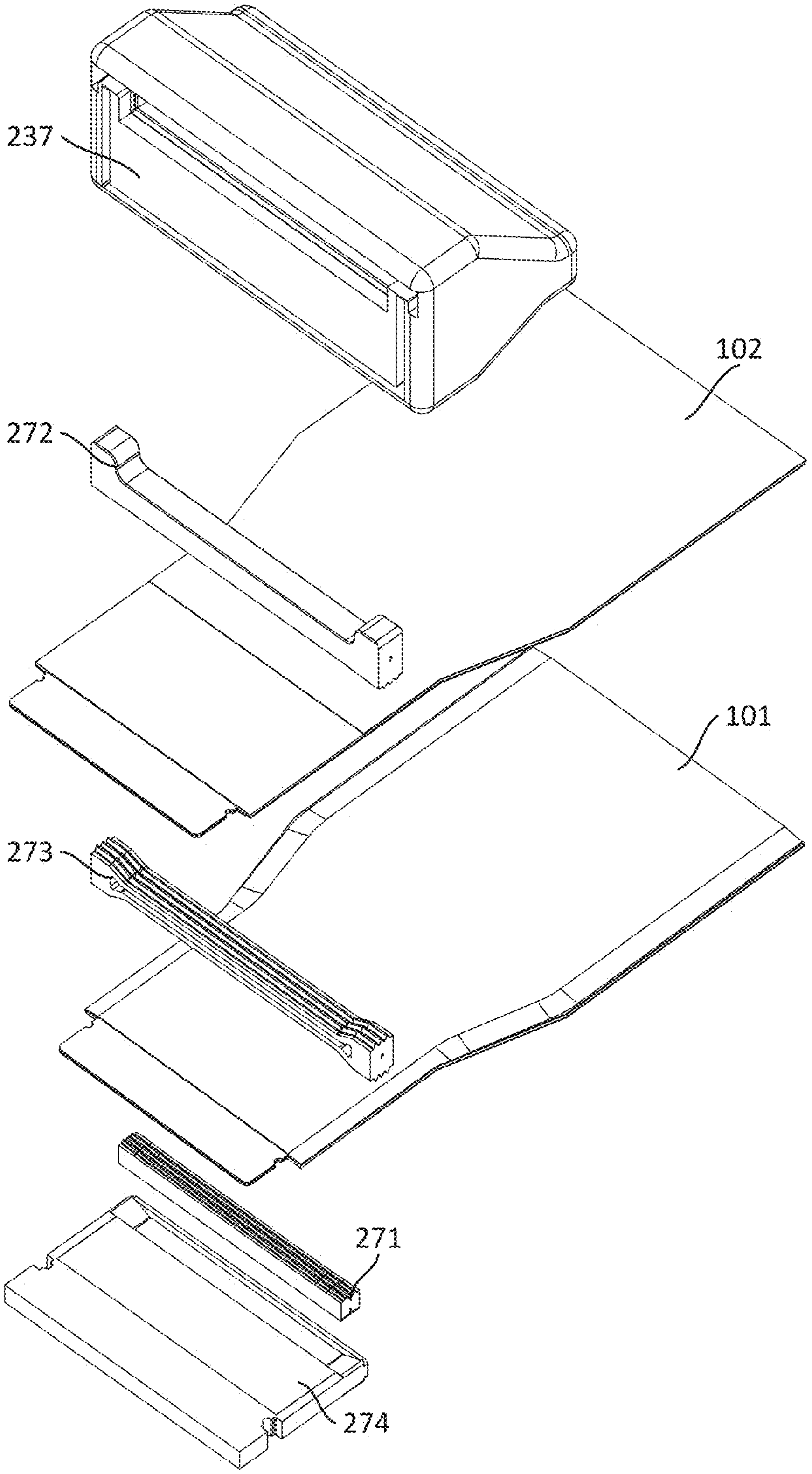
FIG. 20A is an exploded perspective view of components of a flexible conductive assembly, in accordance with some examples.
Figure 20B:
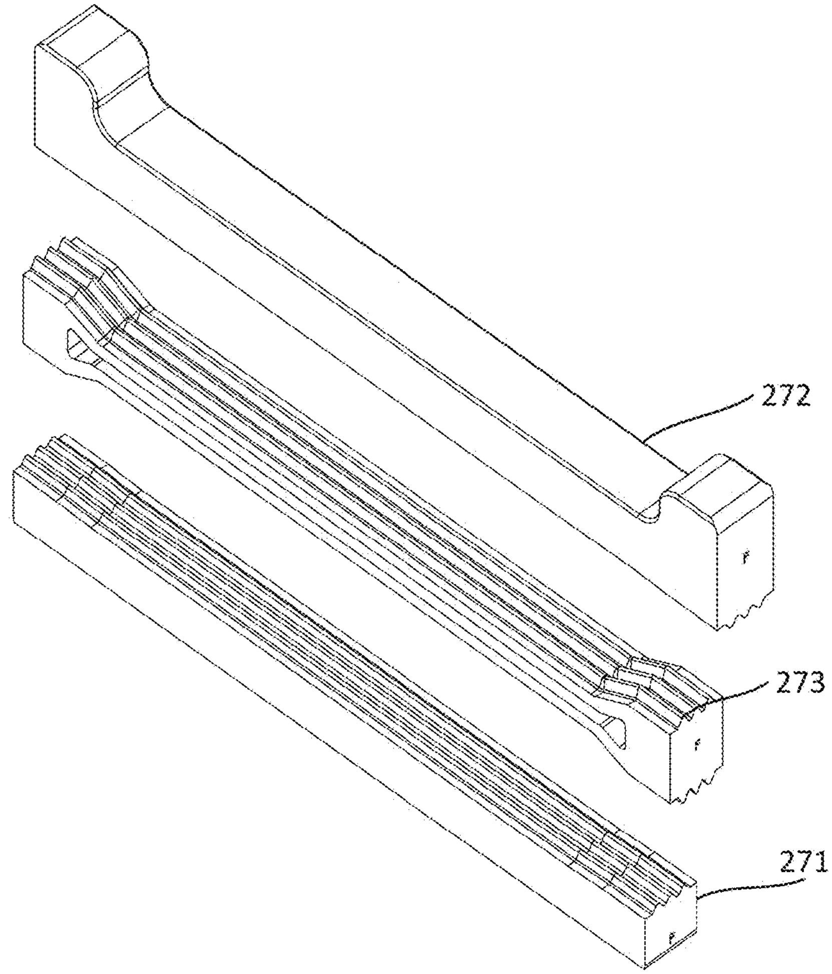
FIG. 20B is an exploded perspective view of components of a flexible conductive assembly, in accordance with some examples.
Figure 20C:
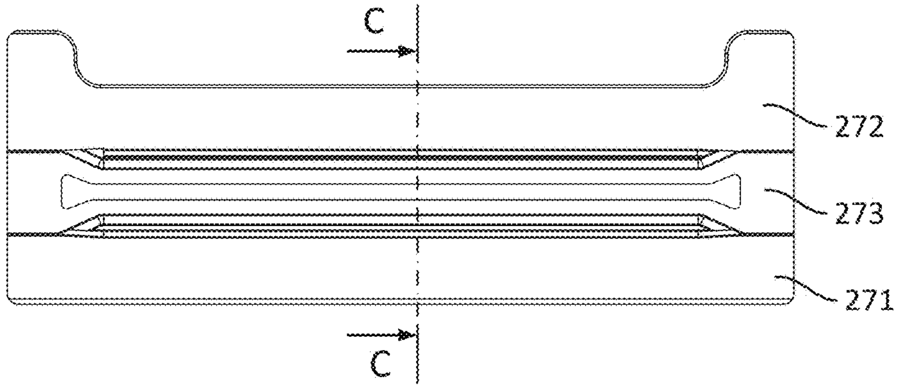
FIG. 20C and FIG. 20D are schematic side views of components of a flexible conductive assembly, in accordance with some examples.
Figure 20D:
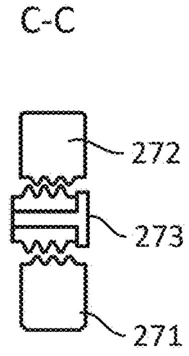

FIG. 16A and FIG. 16B are schematic perspective views of a flexible conductive assembly 290, in accordance with some examples. FIG. 16C is a top view of the flexible conductive assembly 290 of FIG. 16A and FIG. 16B, in accordance with some examples. FIG. 16D is a cross-sectional side view of the flexible conductive assembly 290 of FIG. 16A and FIG. 16B, in accordance with some examples. FIG. 16E is a cross-sectional top view of the flexible conductive assembly 290 of FIG. 16A and FIG. 16B, in accordance with some examples. FIG. 16F is a block diagram showing components of the flexible conductive assembly 290 of FIG. 16A and FIG. 16B, in accordance with some examples. FIG. 17A is a schematic perspective view of a flexible conductive assembly 290, in accordance with some examples. FIG. 17B is an exploded view of the flexible conductive assembly 290 of FIG. 17A, in accordance with some examples. FIG. 18 is an exploded view of a flexible conductive assembly 290, in accordance with some examples. FIG. 19A is an exploded view of components of a flexible conductive assembly 290, in accordance with some examples. FIG. 19B is an exploded view of components of a flexible conductive assembly 290, in accordance with some examples. FIG. 20A is an exploded view of components of a flexible conductive assembly 290, in accordance with some examples. FIG. 20B is an exploded view of components of a flexible conductive assembly 290, in accordance with some examples. FIG. 20C and FIG. 20D are schematic side views of components of a flexible conductive assembly 290, in accordance with some examples.

In some aspects, the techniques described herein relate to a flexible conductive assembly 290 including: a flexible shielded high-current circuit 100 including a first circuit portion 101 and a second circuit portion 102, wherein each of the first circuit portion 101 and the second circuit portion 102 includes a conductive layer 140 and a circuit electromagnetic shield 160; and a connector 260 including a contact unit 261, a housing 230, a connector electromagnetic shield 266, and a circuit seal 270, wherein: the contact unit 261 is positioned inside the housing 230 and includes a first contact 262 and a second contact 263 supported relative to each other and to the housing 230, the first contact 262 is mechanically and electrically coupled to the conductive layer 140 and the second contact 263 is mechanically and electrically coupled to the conductive layer 140 of the second circuit portion 102 of the flexible shielded high-current circuit 100, the connector electromagnetic shield 266 is electrically coupled to the circuit electromagnetic shield 160 of each of the first circuit portion 101 and the second circuit portion 102 and at least partially surrounds the first contact 262 and the second contact 263 of the contact unit 261, and each of the first circuit portion 101 and the second circuit portion 102 is at least partially protrudes into the housing 230 and sealed, relative to the housing 230 by the circuit seal 270.

In some aspects, the techniques described herein relate to a flexible conductive assembly 290, wherein: ach of the first circuit portion 101 and the second circuit portion 102 further includes a first insulating layer 110, a second insulating layer 120, a third insulating layer 130, and a second conductive layer 150, the first insulating layer 110, the first conductive layer 140, the second conductive layer 150, the second insulating layer 120, the electromagnetic shield 160, and the third insulating layer 130 are stacked along a stacking axis 109, the first conductive layer 140 and the second conductive layer 150 directly interface and form a stack 159 positioned between the first insulating layer 110 and the second insulating layer 120, and the electromagnetic shield 160 is positioned between the second insulating layer 120 and the third insulating layer 130 and is configured to block electromagnetic emissions produced by the stack 159 while transmitting the electric current.

In some aspects, the techniques described herein relate to a flexible conductive assembly 290, wherein the stack 159 is configured to transmit an electric current of more than 400 Amperes.

In some aspects, the techniques described herein relate to a flexible conductive assembly 290, wherein each of the first conductive layer 140 and the second conductive layer 150 includes aluminum.

In some aspects, the techniques described herein relate to a flexible conductive assembly 290, wherein each of the first conductive layer 140 and the second conductive layer 150 has a thickness, measured along the stacking axis 109, of at least 400 micrometers.

In some aspects, the techniques described herein relate to a flexible conductive assembly 290, wherein the first conductive layer 140 and the second conductive layer 150 have the same thickness.

In some aspects, the techniques described herein relate to a flexible conductive assembly 290, wherein each of the first insulating layer 110 and the second insulating layer 120 includes polypropylene (PP).

In some aspects, the techniques described herein relate to a flexible conductive assembly 290, wherein each of the first insulating layer 110 and the second insulating layer 120 further includes polyethylene (PE) such that the propylene (PP) forms a first sublayer 121 while the polyethylene (PE) forms a second sublayer 122 directly interfacing the first sublayer 121.

In some aspects, the techniques described herein relate to a flexible conductive assembly 290, wherein the polyethylene (PE) of each of the first insulating layer 110 and the second insulating layer 120 further forms a third sublayer directly interfacing the first sublayer such that the first sublayer is positioned between the second sublayer and the third sublayer.

In some aspects, the techniques described herein relate to a flexible conductive assembly 290, wherein the first sublayer has a larger thickness than each of the second sublayer and the third sublayer.

In some aspects, the techniques described herein relate to a flexible conductive assembly 290, wherein the third insulating layer 130 is formed from a polyethylene terephthalate (PET).

In some aspects, the techniques described herein relate to a flexible conductive assembly 290, wherein the third insulating layer 130 has a thickness of 20-150 micrometers.

In some aspects, the techniques described herein relate to a flexible conductive assembly 290, wherein each of the first insulating layer 110 and the second insulating layer 120 has a thickness of 100-400 micrometers.

In some aspects, the techniques described herein relate to a flexible conductive assembly 290, wherein the electromagnetic shield 160 is a metal sheet having a thickness, measured along the stacking axis 109, of 20-150 micrometers.

In some aspects, the techniques described herein relate to a flexible conductive assembly 290, wherein the metal sheet of the electromagnetic shield 160 is formed from aluminum.

In some aspects, the techniques described herein relate to a flexible conductive assembly 290, wherein the flexible shielded high-current circuit 100 has a thickness of less than 10 millimeters or even less than 5 millimeters.

In some aspects, the techniques described herein relate to a flexible conductive assembly 290, wherein the contact unit 261 further includes a contact support 229 made from an insulating material and supporting the first contact 262 and the second contact 263 relative to each other and to the housing 230.

In some aspects, the techniques described herein relate to a flexible conductive assembly 290, wherein each of the first contact 262 and the second contact 263 is formed from copper.

In some aspects, the techniques described herein relate to a flexible conductive assembly 290, wherein: the first contact 262 is welded to the conductive layer 140 of the first circuit portion 101 of the flexible shielded high-current circuit 100, and the second contact 263 is welded to the conductive layer 140 of the second circuit portion 102 of the flexible shielded high-current circuit 100.

In some aspects, the techniques described herein relate to a flexible conductive assembly 290, wherein the housing 230 includes a first housing portion 231 and a second housing portion 232 removably attached to each other and enclosing the contact unit 261, the connector electromagnetic shield 266, and a portion of each of the first circuit portion 101 and the second circuit portion 102 extending into the connector 260.

In some aspects, the techniques described herein relate to a flexible conductive assembly 290, wherein the first housing portion 231 includes an opening providing access to a portion of the first contact 262 and a portion of the second contact 263.

In some aspects, the techniques described herein relate to a flexible conductive assembly 290, wherein the housing 230 further includes a housing edge seal 236 compressed between the first housing portion 231 and the second housing portion 232.

In some aspects, the techniques described herein relate to a flexible conductive assembly 290, wherein the housing 230 further includes compression seal 237 enclosing a portion of each of the first housing portion 231, the second housing portion 232, the first circuit portion 101, and the second circuit portion 102.

In some aspects, the techniques described herein relate to a flexible conductive assembly 290, wherein the housing 230 further includes an attachment seal 277 and an attachment bolt 265 for sealing and attaching the connector 260 when connecting to an external device (e.g., a battery pack, charging port).

In some aspects, the techniques described herein relate to a flexible conductive assembly 290, wherein: the circuit seal 270 includes a first seal portion 271, a second seal portion 272, and a middle circuit seal portion 273; the first seal portion 271 is positioned between the first housing portion 231 and the first circuit portion 101, the second seal portion 272 is positioned between the second housing portion 232 and the second circuit portion 102, and the middle circuit seal portion 273 is positioned between the first circuit portion 101 and the second circuit portion 102.

In some aspects, the techniques described herein relate to a flexible conductive assembly 290, wherein each of the first seal portion 271, the second seal portion 272, and the middle circuit seal portion 273 includes a set of ribs interfacing and compressing against the first circuit portion 101 or the second circuit portion 102.

In some aspects, the techniques described herein relate to a flexible conductive assembly 290, wherein: the set of ribs of the first seal portion 271 is axially offset relative to the set of ribs on the middle circuit seal portion 273 facing the set of ribs of the first seal portion 271, and the set of ribs of the second seal portion 272 is axially offset relative to the set of ribs on the middle circuit seal portion 273 facing the set of ribs of the second seal portion 272.

Figure 28A:
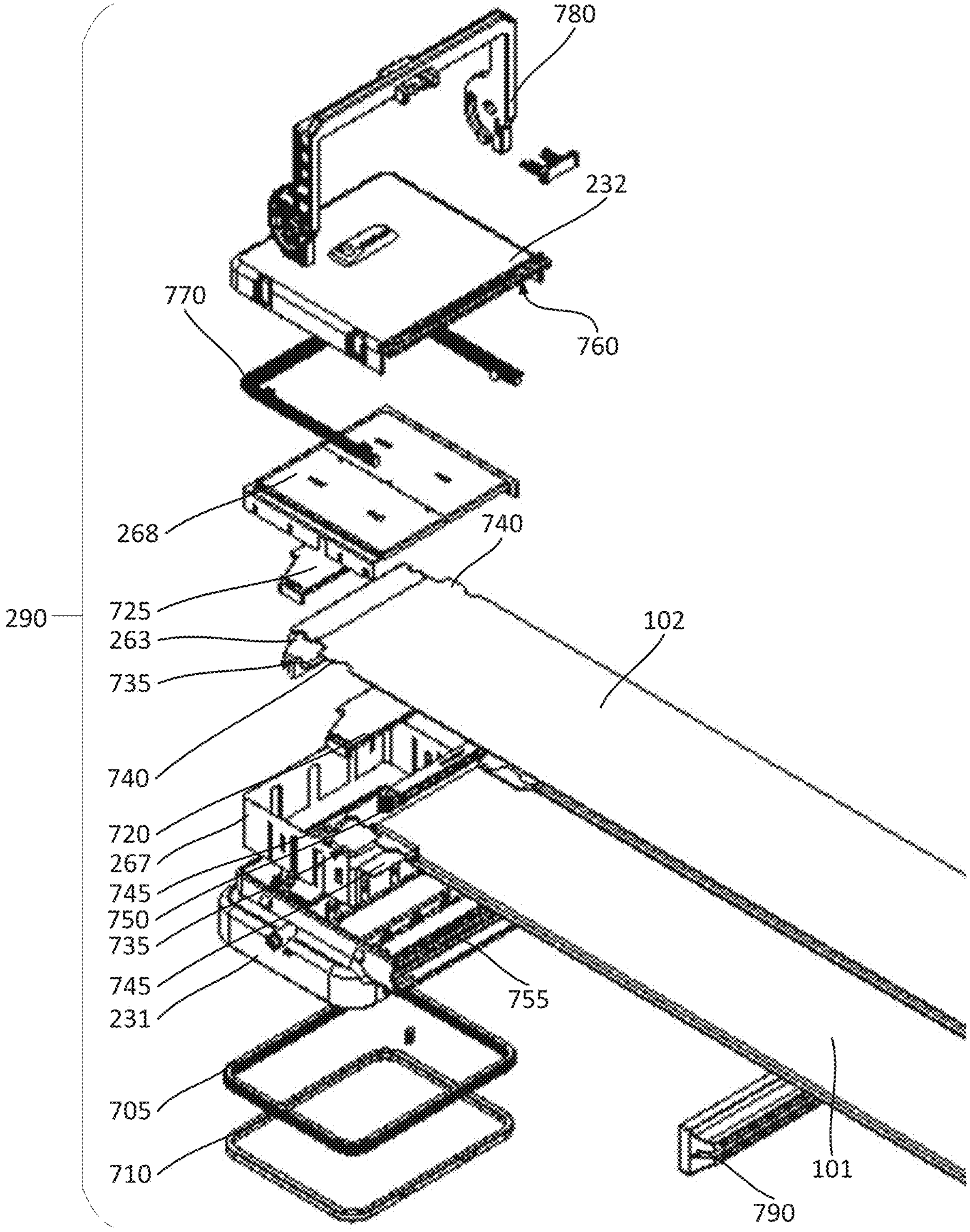
FIG. 28A is an exploded perspective view of a flexible conductive assembly, in accordance with some examples.

FIG. 28A is an exploded view of a flexible conductive assembly 290, in accordance with some examples. A flexible conductive assembly 290 includes a flexible shielded high-current circuit 100 comprising a first circuit portion 101 and a second circuit portion 102. Each circuit portion includes at least one first conductive layer 140 and a circuit electromagnetic shield 160. Various examples of flexible shielded high-current circuits 100, conductive layers 140, and electromagnetic shields 160 have been provided above. A first contact 262 is mechanically and electrically coupled to the first conductive layer 140 of the first circuit portion 101, and a second contact 263 is coupled to the first conductive layer 140 of the second circuit portion 102. The assembly further includes a connector 260 with a housing 230, which comprises a first housing portion 231, a first electromagnetic shield portion 267, and a wire seal 790. The first electromagnetic shield portion 267 is electrically coupled to the circuit electromagnetic shield 160 of both circuit portions and at least partially surrounds the first and second contacts. Each circuit portion extends at least partially into the housing 230 and is sealed relative to the housing by the wire seal 790.

This configuration provides several technical advantages. The integration of electromagnetic shielding directly into both the circuit portions and the housing minimizes electromagnetic interference (EMI) while maintaining a compact connector profile. The sealing with wire seal 790 prevents moisture or dust ingress, critical for automotive environments. Compared to bulky round wire harnesses, this solution allows high current transmission with reduced size and improved serviceability.

In some examples, each of the first circuit portion 101 and the second circuit portion 102 further comprises a first insulating layer 110, a second insulating layer 120, a third insulating layer 130, and a second conductive layer 150. The layers are stacked along a stacking axis 109 such that the first insulating layer 110, first conductive layer 140, second conductive layer 150, second insulating layer 120, electromagnetic shield 160, and third insulating layer 130 are sequentially positioned. Various examples of insulating layers, conductive layers, and electromagnetic shields have been described above. The first conductive layer 140 and the second conductive layer 150 directly interface, forming a stack 159 between the insulating layers. The electromagnetic shield 160 is positioned between the second insulating layer 120 and the third insulating layer 130.

This multilayer design allows high current transmission while controlling EMI. Stacking multiple conductors improves flexibility compared to a single thick conductor and enables thermal dissipation through broader surface area. The shield placement provides an effective barrier to emissions while maintaining low overall thickness. Alternatives include different stacking sequences (e.g., dual shields above and below the stack) or patterned conductive layers where one conductor supports signal transmission in addition to power.

In some embodiments, the stack 159 is configured to transmit more than 400 Amperes. In some embodiments, the stack may be configured to transmit more than 100 Amperes, more than 300 Amperes, more than 500 Amperes, or even more than 600 Amperes. High current capability addresses the need for rapid charging in electric vehicles and high-power transfer in aerospace and industrial equipment.

In some embodiments, each of the first conductive layer 140 and the second conductive layer 150 comprises aluminum. Aluminum provides weight reduction compared to copper, with adequate conductivity for high-current applications. While aluminum has higher resistivity than copper, its lower density enables larger cross-sections at reduced mass. In some embodiments, one or more of the conductive layers comprises aluminum, copper, or clad metals to balance conductivity, cost, and mechanical properties.

In some embodiments, each of the first conductive layer 140 and the second conductive layer 150 has a thickness of at least 400 micrometers along the stacking axis 109. In some embodiments, any one of the first conductive layer 140 and the second conductive layer 150 has a thickness of 100-1000 micrometers, 250-750 micrometers, or even 300-600 micrometers. This thickness ensures adequate current-carrying capacity while allowing mechanical flexibility. A rectangular cross-section conductor of this thickness provides better heat dissipation compared to round wires of equivalent cross-sectional area.

In some examples, the first conductive layer 140 and the second conductive layer 150 have the same thickness. Equal thickness promotes uniform current distribution and simplifies manufacturing. However, in some examples, the first conductive layer 140 and the second conductive layer 150 have different thicknesses. One conductive layer may be thicker to carry the majority of current while another is thinner.

In some examples, each of the first insulating layer 110 and the second insulating layer 120 comprises polypropylene (PP). Polypropylene (PP) is lightweight and cost-effective, providing thermal and electrical insulation. Various examples of materials that may be used to form insulating layers have been described above, including polyimide (PI), and polyethylene (PE). In some examples, each of the first insulating layer 110 and the second insulating layer 120 further comprises polyethylene (PE), forming a second sublayer 122 directly interfacing the polypropylene first sublayer 121. The polyethylene (PE) sublayer improves adhesion to metallic conductors, addressing the relatively low surface energy of polypropylene (PP). In some examples, the polyethylene (PE) further forms a third sublayer 123 directly interfacing the first sublayer 121 such that the polypropylene (PP) sublayer is sandwiched between PE sublayers. This structure enhances bonding strength and provides additional mechanical stability. In alternative embodiments, other thermoplastics may be used as the outer sublayers. In some examples, the first sublayer 121 has a larger thickness than each of the second sublayer 122 and third sublayer 123. A thicker first sublayer 121 maintains cost-effectiveness by maximizing polypropylene (PP) content while using thin polyethylene (PE) layers only to increase adhesion. In some examples, the third sublayer 123 is formed from polyethylene terephthalate (PET). Polyethylene terephthalate (PET) offers durability and improved thermal resistance.

In some examples, the third insulating layer 130 has a thickness of 20-150 micrometers. In some examples, the third insulating layer 130 has a thickness of between 40-80 micrometers or 80-120 micrometers. Insulating layer thickness balances insulation with flexibility. Thinner films provide greater flexibility, while thicker films improve dielectric strength.

In some examples, each of the first insulating layer 110 and the second insulating layer 120 has a thickness of 100-400 micrometers. In some examples, one or both of the first insulating layer 110 and the second insulating layer 120 has a thickness of 150-300 micrometers or 200-350 micrometers. This range provides insulation strong enough to prevent shorts from burrs or edges of conductors while minimizing bulk of the flexible shielded high-current circuit 100.

In some examples, the electromagnetic shield 160 is a metal sheet having a thickness of 20-150 micrometers. In some examples, the electromagnetic shield 160 has a thickness of between 30-100 micrometers or 50-125 micrometers. This ensures EMI suppression while maintaining flexibility.

In some examples, the metal sheet of the electromagnetic shield 160 is formed from aluminum. Aluminum balances shielding effectiveness with weight reduction. Copper shields may be used in higher frequency applications requiring superior conductivity.

In some examples, the flexible shielded high-current circuit 100 has a thickness of less than 10 millimeters or even less than 5 millimeters. This compact form factor allows integration into tight vehicle packaging spaces, unlike bulky round-wire harnesses. In some examples, the flexible shielded high-current circuit 100 may have a thickness of less than 3 millimeters.

Figure 29A:
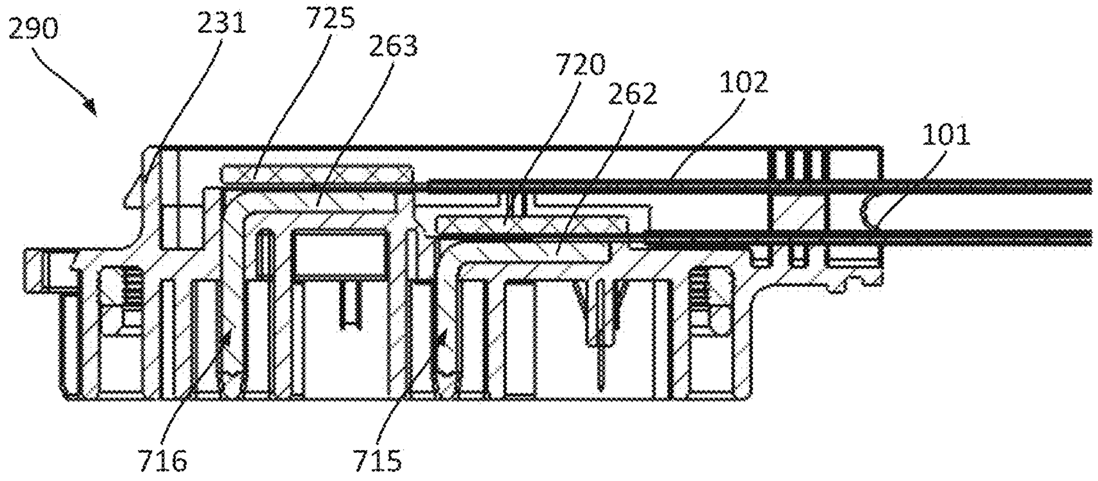
FIG. 29A is a schematic cross-sectional side view of a flexible conductive assembly, in accordance with some examples.
Figure 29B:
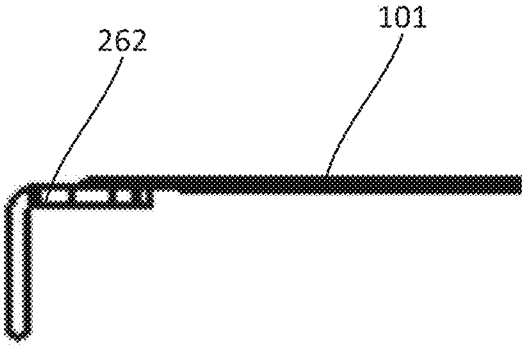
FIG. 29B is a schematic side view of a connector welded to a circuit portion, in accordance with some examples.
Figure 29C:
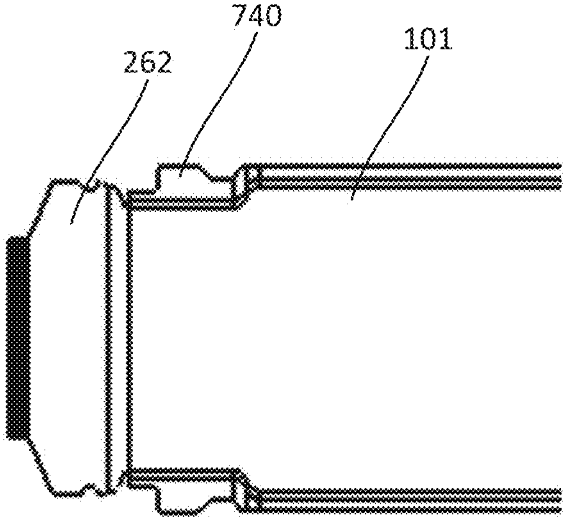
FIG. 29C is a top view of the connector and circuit portion of FIG. 29B, in accordance with some examples.
Figure 29D:
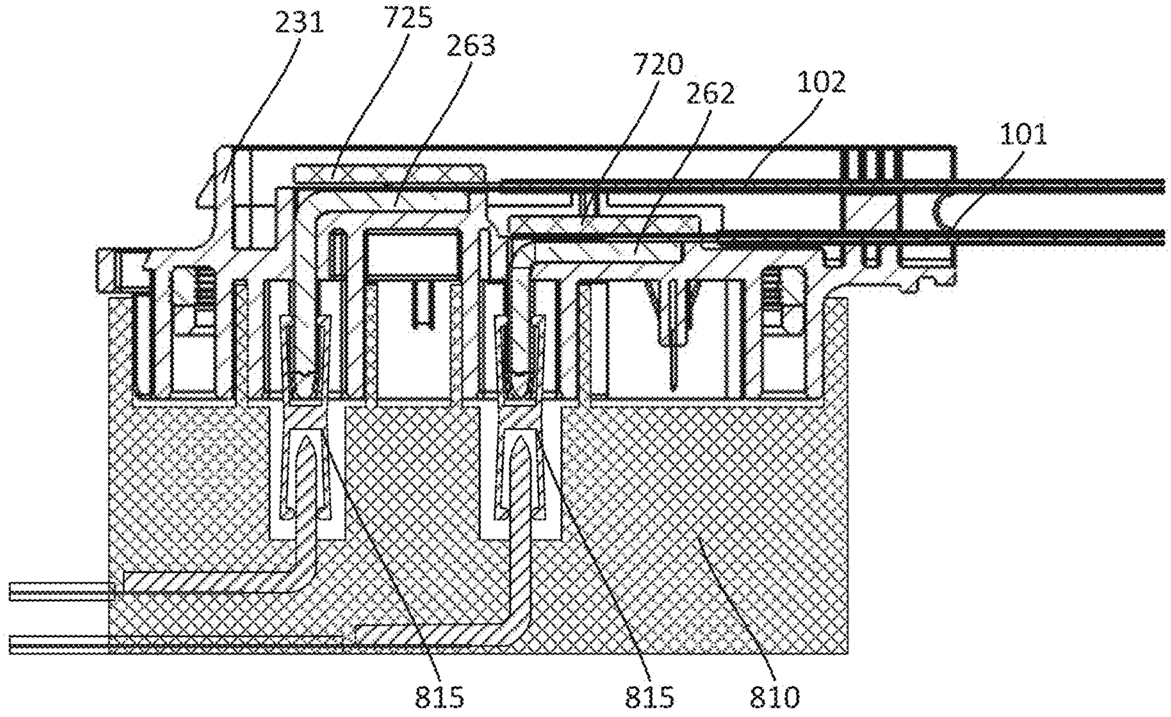
FIG. 29D is a schematic cross-sectional side view of a flexible conductive assembly coupled to another electrical component, in accordance with some examples.

FIG. 29A is a schematic cross-sectional side view of a flexible conductive assembly 290, in accordance with some examples. FIG. 29B is a schematic side view of a connector welded to a circuit portion, in accordance with some examples. FIG. 29C is a top view of the connector and circuit portion of FIG. 29B, in accordance with some examples. As shown in FIG. 29A and FIG. 29B, in some examples, at least a portion of the first contact 262 extends away from the first circuit portion 101 in a direction perpendicular to a plane of the first circuit portion. In some examples, at least a portion of the second contact 263 extends away from the second circuit portion 102 in the same direction as the portion of the first contact 262. This geometry allows low-profile flat circuits to connect efficiently to other electrical components, such as with vertical busbars or headers. This geometry also allows the flexible shielded high-current circuit 100 to connect with connectors of varying length in the direction perpendicular to the plane of the first circuit portion. FIG. 29D is a schematic cross-sectional side view of a flexible conductive assembly 290 coupled to another electrical component, in accordance with some examples. As shown in FIG. 29D, electrical contact may be made between the first contact 262 and the second contact 263 with other electrical components 810 having contacting components 815 of various lengths in the direction that the portions of the first contact 262 and the second contact 263 extend.

In some examples, each of the first contact 262 and the second contact 263 is formed from copper. Copper provides high conductivity and wear resistance at the interface. Alternatives include plated aluminum or bimetal contacts combining copper with nickel or silver plating.

In some examples, the connector 260 further comprises a blocker positioned between the first contact 262 and the wire seal 790. In some examples, the wire seal 790 is positioned between the first circuit portion 101 and the second circuit portion 102. The blocker prevents sealant ingress and ensures creepage and clearance distances between conductors, improving safety.

Returning to FIG. 28A, in some examples, the housing 230 comprises a first housing portion 231 and a second housing portion 232. The second housing portion 232 is removably attached to the first housing portion 231. The housing 230 encloses the contacts, the connector electromagnetic shield 266, and portions of the circuits. This two-piece housing facilitates assembly and serviceability of the housing 230 compared to, for example, overmolded connectors. In some examples, the housing 230 further comprises a cover seal 770 compressed between the first and second housing portions.

In some examples, the first housing portion 231 includes an opening providing access to portions of the first and second contacts. In some examples, the housing 230 further comprises a circuit seal 250 enclosing portions of both housing portions and the circuit portions. The seals provide protection from environmental exposure by sealing against moisture and contaminants. In some examples, the housing 230 further comprises a ring seal 705 for sealing and attaching the connector to an external device such as a battery pack or charge port. This ensures a robust interface with system components, protecting both electrical and mechanical connection integrity.

Figure 28B:
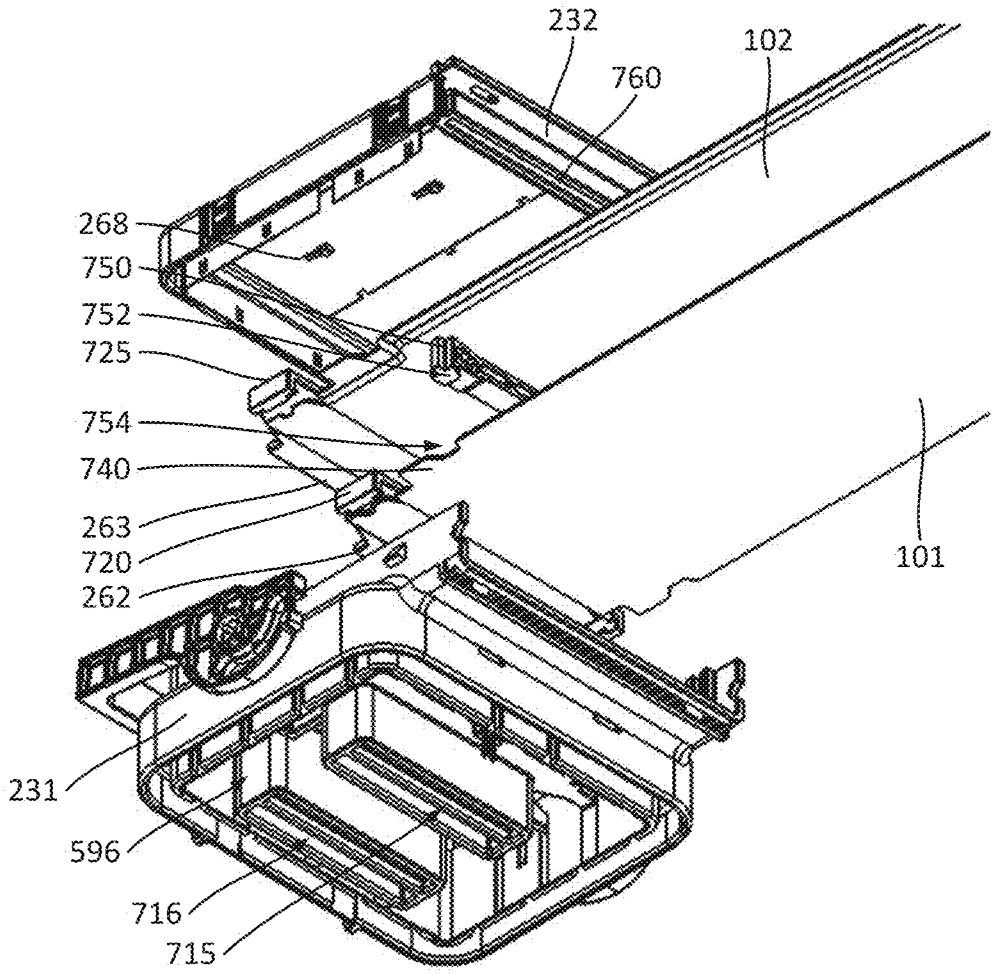
FIG. 28B is an exploded perspective view of a flexible conductive assembly, in accordance with some examples.

In some examples, the circuit seal 250 comprises a blocker 750 and a wire seal 790, with the blocker positioned between the first and second circuit portions and extending between the housing portions. This configuration prevents ingress of sealing material into conductor regions and maintains electrical isolation. As shown in FIGS. 28A and 28B, in some examples, the first housing portion 231 comprises a first set of ribs 755, the second housing portion 232 comprises a second set of ribs 760, and the blocker 750 comprises a set of blocker ribs. The ribs interface with and compress against the circuit portions. The ribs improve sealing effectiveness and provide mechanical strain relief. Alternatives include smooth interfaces with adhesive layers or molded-in-place gaskets, examples of which have been described above. As shown in FIG. 28B, the blocker 750 may comprise one or more blocker protrusions 752. One or more of the one or more blocker protrusions 752 may extend towards the first circuit portion 101 and or the second circuit portion 102. The one or more blocker protrusions 752 may have a shape in a plane parallel with a plane of the first circuit portion 101. One or both of the first circuit portion 101 and the second circuit portion 102 may comprise blocker alignment notches 754, which may be positioned at an edge of the first circuit portion 101 or the second circuit portion 102. The blocker alignment notches 754 may be formed from a shape cut from an edge of the first circuit portion 101 or the second circuit portion 102. The shape of the blocker alignment notches 754 and the shape of the one or more blocker protrusions 752 may match, providing alignment of the blocker 750 with one or both of the first circuit portion 101 and the second circuit portion 102.

As shown in FIG. 28B, in some examples, the first housing portion 231 comprises an interface opening 596. As shown in FIG. 28B and FIG. 30B, in some examples, the first housing portion 231 comprises a first connector opening 715 and a second connector opening 716 that extend through a thickness of the first housing portion 231. Specifically, the first connector opening 715 and the second connector opening 716 may intersect the interface opening 596.

Figure 30A:
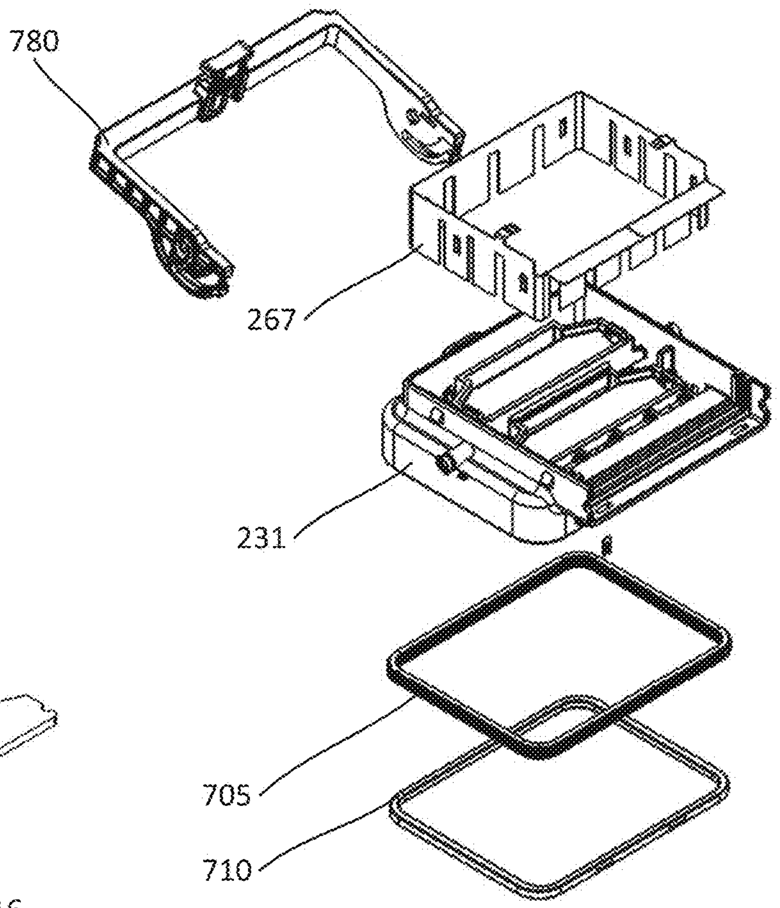
FIG. 30A is an exploded perspective view of some components of the flexible conductive assembly, including the lever, the first electromagnetic shield portion, the first housing portion, the ring seal, and the ring seal retainer, in accordance with some examples.
Figure 30B:
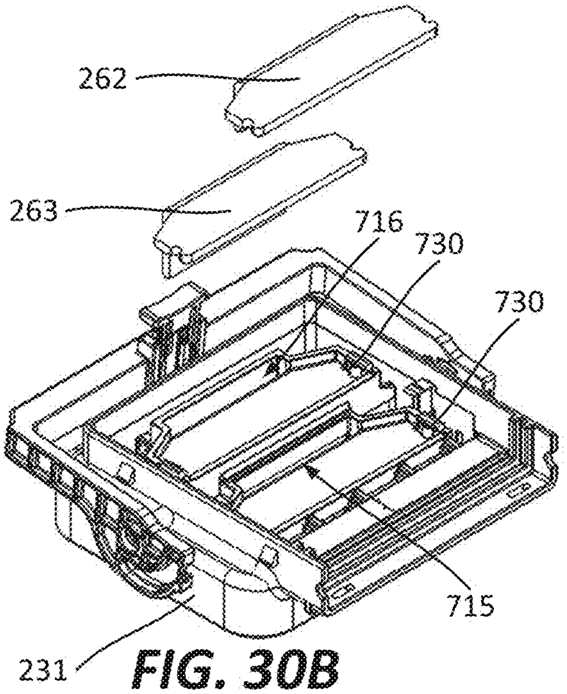
FIG. 30B is an exploded perspective view of some of the components of the flexible conductive assembly, including the first housing portion, the first contact, and the second contact, in accordance with some examples.
Figure 30C:
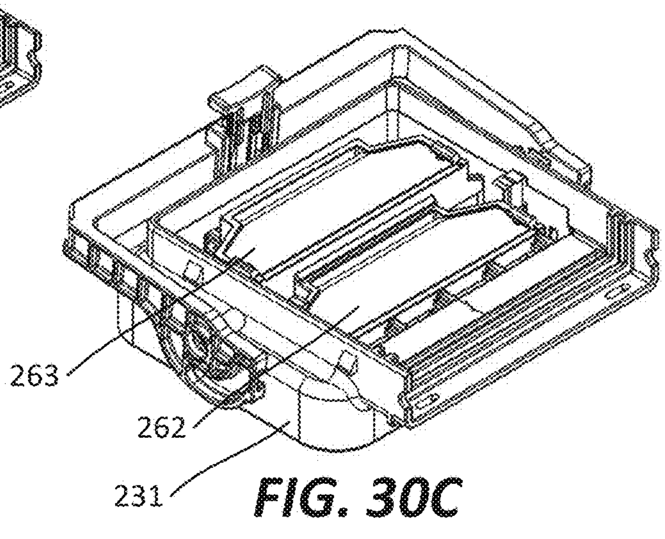
FIG. 30C is a schematic perspective view of the first housing portion with the first contact and the second contact positioned within the first connector opening and the second connector opening, in accordance with some examples.

FIG. 30A is an exploded view of some components of the flexible conductive assembly 290, including the lever 780, the first electromagnetic shield portion 267, the first housing portion 231, the ring seal 705, and the ring seal retainer 710, in accordance with some examples. FIG. 30B is an exploded view of some of the components of the flexible conductive assembly 290, including the first housing portion 231, the first contact 262, and the second contact 263, in accordance with some examples. FIG. 30C is a schematic perspective view of the first housing portion 231 with the first contact 262 and the second contact 263 positioned within the first connector opening 715 and the second connector opening 716, in accordance with some examples. As shown in FIG. 30B, in some examples, the first housing portion 231 comprises connector alignment protrusions 730. As shown in FIG. 28A, the first contact 262 and second contact 263 comprise connector alignment notches 735. The protrusions extend into the notches. As shown in FIG. 30C, the intersection of the connector alignment protrusions 730 with the connector alignment notches 735 ensures correct positioning of the connectors with the first housing portion 231 and reduces the risk of misalignment during assembly. Variations include keyed slots or asymmetrical notch patterns.

In some examples, the electromagnetic shield 160 of the first circuit portion 101 is mechanically and electrically coupled with the first electromagnetic shield portion 267. In some examples, the electromagnetic shield 160 of the second circuit portion 102 is mechanically and electrically coupled with the first electromagnetic shield portion 267. Electrical coupling ensures continuous EMI shielding. As shown in FIG. 28A, in some examples, the electromagnetic shield 160 of one or both of the first circuit portion 101 and the second circuit portion 102 comprises a shield wing 740 protruding from between the insulating layers. The shield wing 740 provides an accessible feature for welding or mechanical attachment to external shields. In some examples, the first electromagnetic shield portion 267 comprises a weld tab 745, and the shield wing 740 is welded to the weld tab. This provides a robust mechanical and electrical connection. Alternatives include riveting, soldering, or conductive adhesives.

Figure 31A:
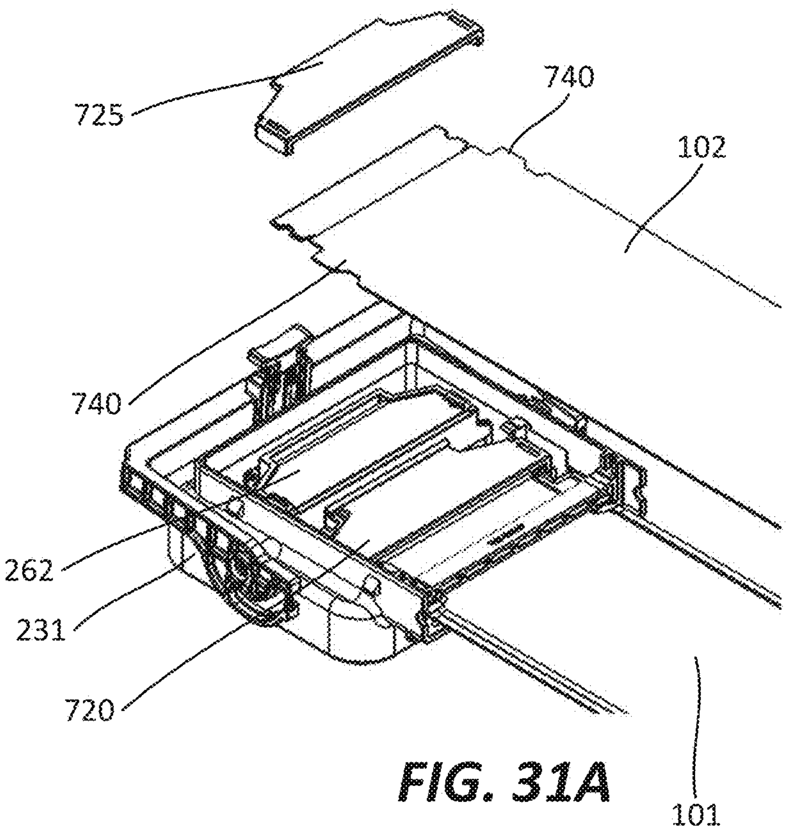
FIG. 31A is an exploded perspective view of the flexible conductive assembly showing the first housing portion, the second circuit portion, and the device before assembly, in accordance with some examples.
Figure 31B:
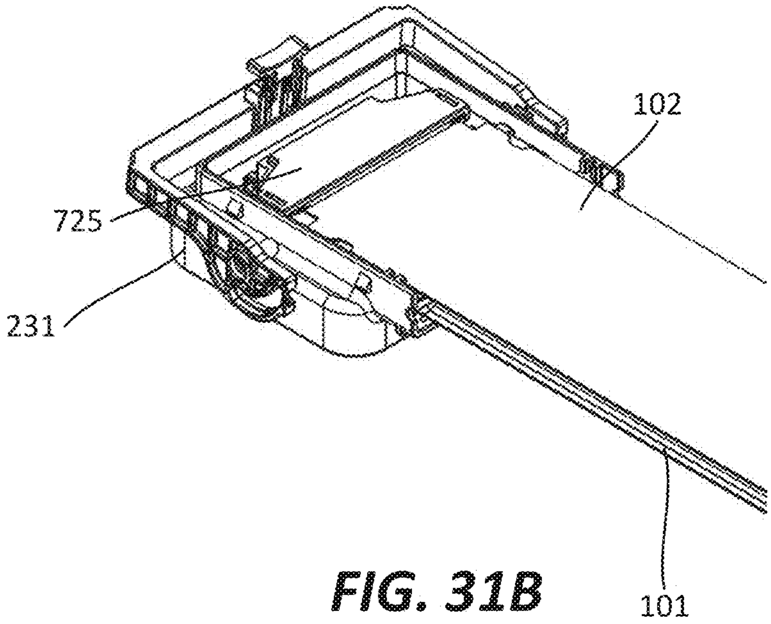
FIG. 31B is a schematic perspective view of the components of the flexible conductive assembly shown in FIG. 31A after assembly, in accordance with some examples.
Figure 32A:
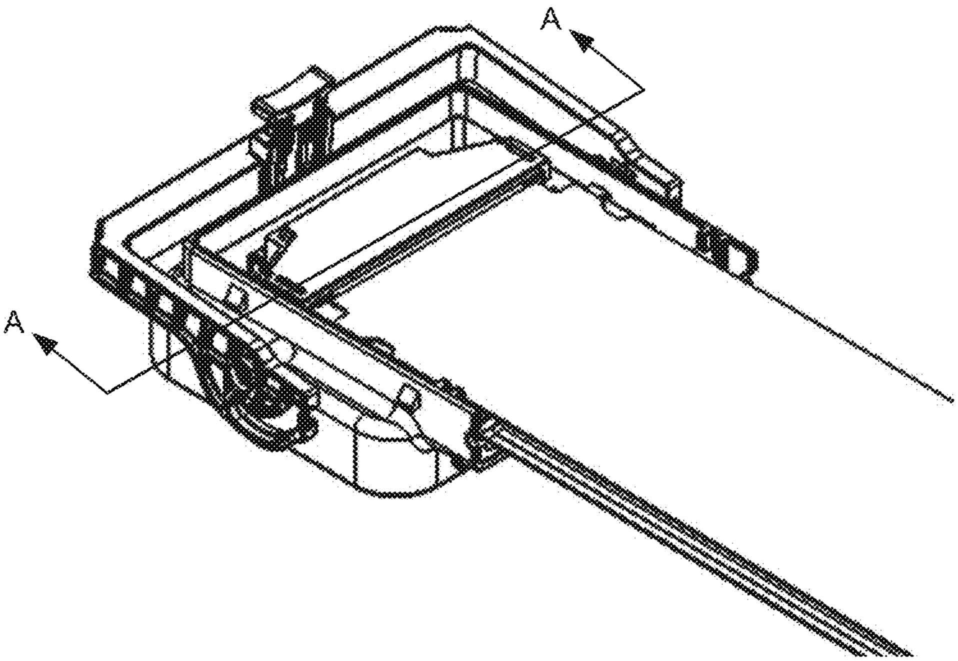
FIG. 32A is a schematic perspective view of a first circuit portion and a second circuit portion positioned in a first housing portion, in accordance with some examples.
Figure 32B:
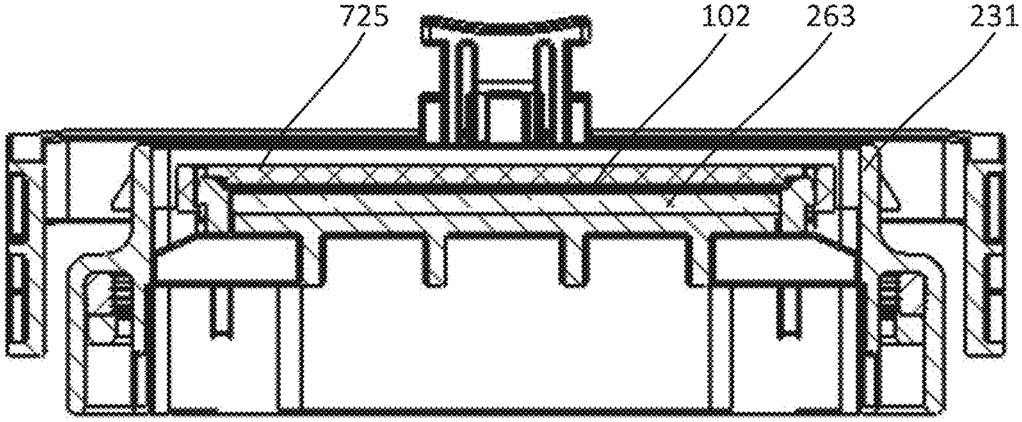
FIG. 32B is a schematic cross-sectional side view at the line A-A of FIG. 32A, in accordance with some examples.

FIG. 32A is a schematic perspective view of a first circuit portion 101 and a second circuit portion 102 positioned in a first housing portion 231, in accordance with some examples. FIG. 32B is a schematic cross-sectional side view at the line A-A of FIG. 32A, in accordance with some examples. In some examples, the flexible conductive assembly 290 further comprises a first terminal position assurance (TPA) device 720 positioned between a contact and the second circuit portion 102 and mechanically coupled with the first housing portion 231. FIG. 31A is an exploded view of the flexible conductive assembly 290 showing the first housing portion 231, the second circuit portion 102, and the device 725 before assembly, in accordance with some examples. FIG. 31B is a schematic perspective view of the components of the flexible conductive assembly 290 shown in FIG. 31A after assembly, in accordance with some examples. The terminal position assurance (TPA) device ensures proper contact positioning and prevents accidental back-out. In some examples, the flexible conductive assembly 290 further comprises a second terminal position assurance (TPA) device 725 positioned between the second contact 263 and the second electromagnetic shield portion 268 and mechanically coupled with the first housing portion 231.

Examples of Methods of Forming Flexible Conductive Assemblies

Figure 21:
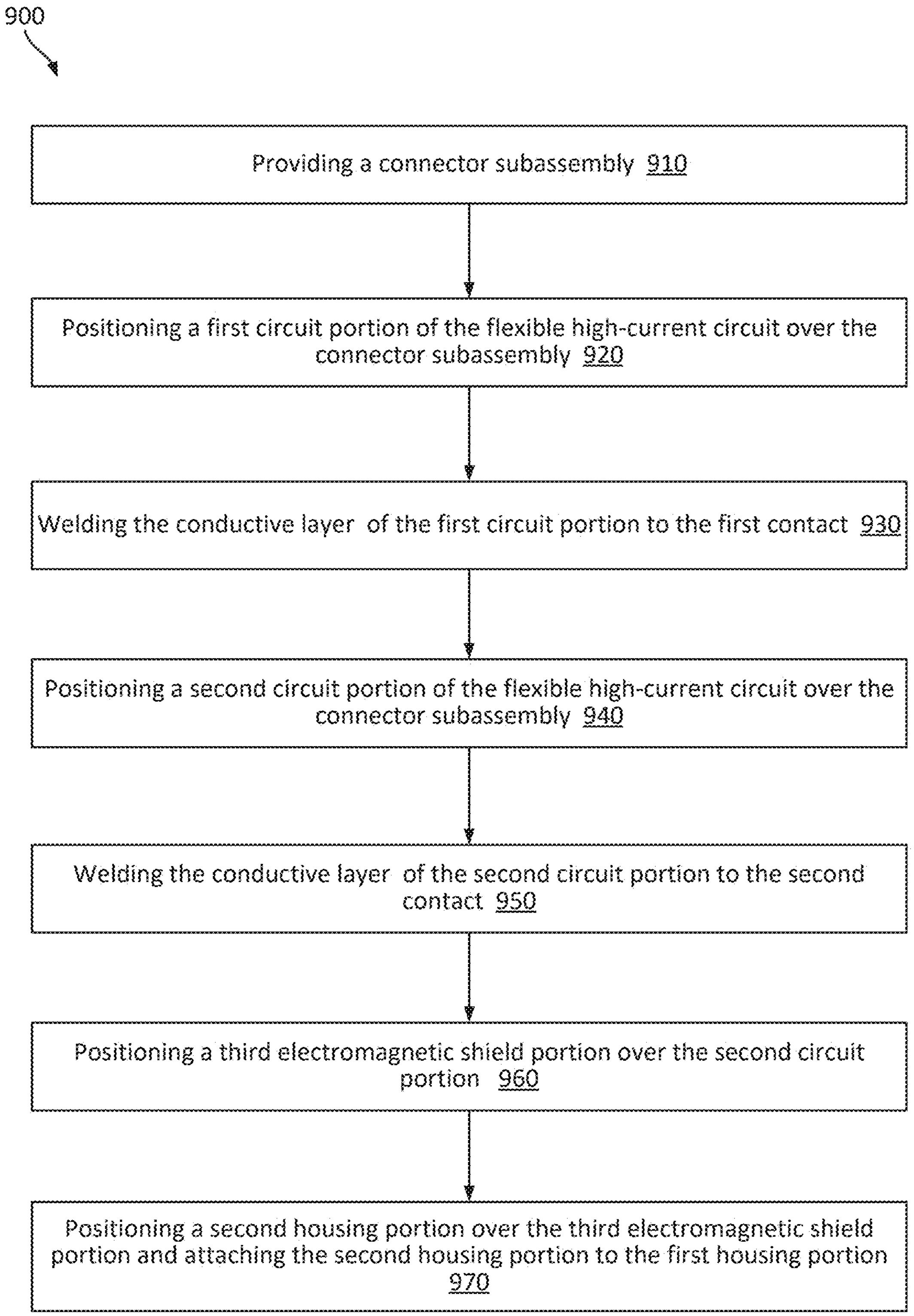
FIG. 21 is a process flowchart corresponding to a method of forming a flexible conductive assembly including a flexible shielded high-current circuit, in accordance with some examples.

FIG. 21 is a process flowchart corresponding to method 900 of forming a flexible conductive assembly 290 including a flexible shielded high-current circuit 100, in accordance with some examples. Various examples of the flexible conductive assembly 290 are described above.

Referring to FIG. 21, method 900 may comprise (block 910) providing a connector subassembly 276 including a contact unit 261, a first housing portion 231, a first electromagnetic shield portion 267, and a second electromagnetic shield portion 268, wherein the contact unit 261 includes a first contact 262 and a second contact 263 supported relative to each other and to the housing 230

Referring to FIG. 21, method 900 may comprise (block 920) positioning a first circuit portion 101 of the flexible shielded high-current circuit 100 over the connector subassembly 276, wherein the first circuit portion 101 includes a conductive layer 140 and a circuit electromagnetic shield 160 such that the conductive layer 140 interfaces the first contact 262 and such that the circuit electromagnetic shield 160 interfaces the first electromagnetic shield portion 267

Referring to FIG. 21, method 900 may comprise (block 930) welding the conductive layer 140 of the first circuit portion 101 to the first contact 262.

Referring to FIG. 21, method 900 may comprise (block 940) positioning a second circuit portion 102 of the flexible shielded high-current circuit 100 over the connector subassembly 276, wherein the second circuit portion 102 includes a conductive layer 140 and a circuit electromagnetic shield 160 such that the conductive layer 140 interfaces the second contact 263.

Referring to FIG. 21, method 900 may comprise (block 950) welding the conductive layer 140 of the second circuit portion 102 to the first contact 262.

Referring to FIG. 21, method 900 may comprise (block 960) positioning a third electromagnetic shield portion 269 over the second circuit portion 102 and the contact unit 261 such that the circuit electromagnetic shield 160 of the second circuit portion 102 interfaces the third electromagnetic shield portion 269.

Referring to FIG. 21, method 900 may comprise (block 970) positioning a second housing portion 232 over the third electromagnetic shield portion 269 and attaching the second housing portion 232 to the first housing portion 231.

In some aspects, the techniques described herein relate to method 900, wherein: the connector subassembly 276 further includes a housing edge seal 236, and attaching the second housing portion 232 to the first housing portion 231 includes compressing the housing edge seal 236 between the first housing portion 231 and the second housing portion 232.

Figure 22A:
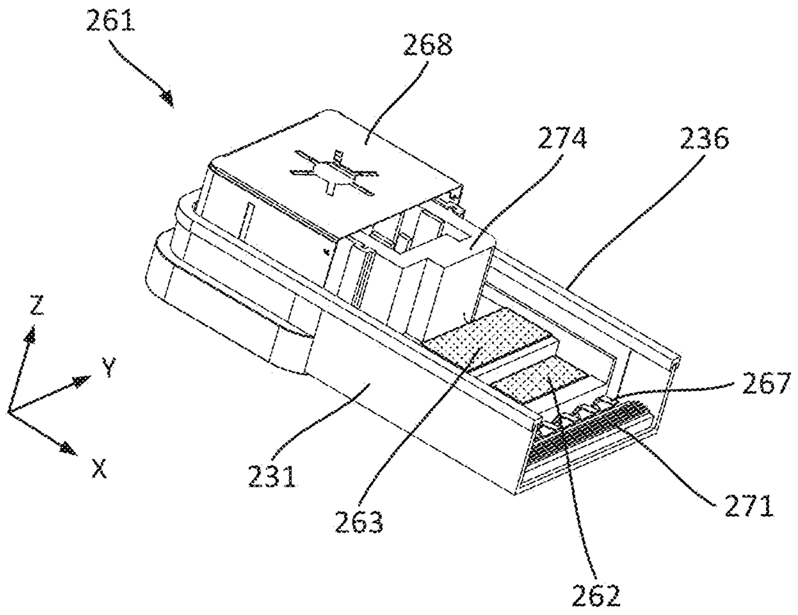
FIG. 22A is a schematic perspective view of a contact unit of a flexible conductive assembly, in accordance with some examples.
Figure 22B:
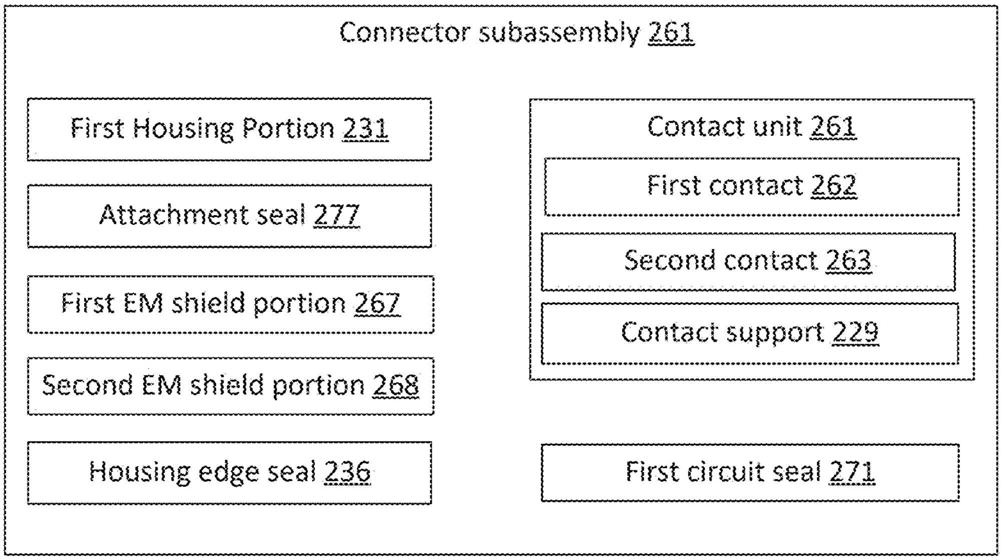
FIG. 22B is a schematic block diagram showing components of a contact unit of a flexible conductive assembly, in accordance with some examples.
Figure 23:
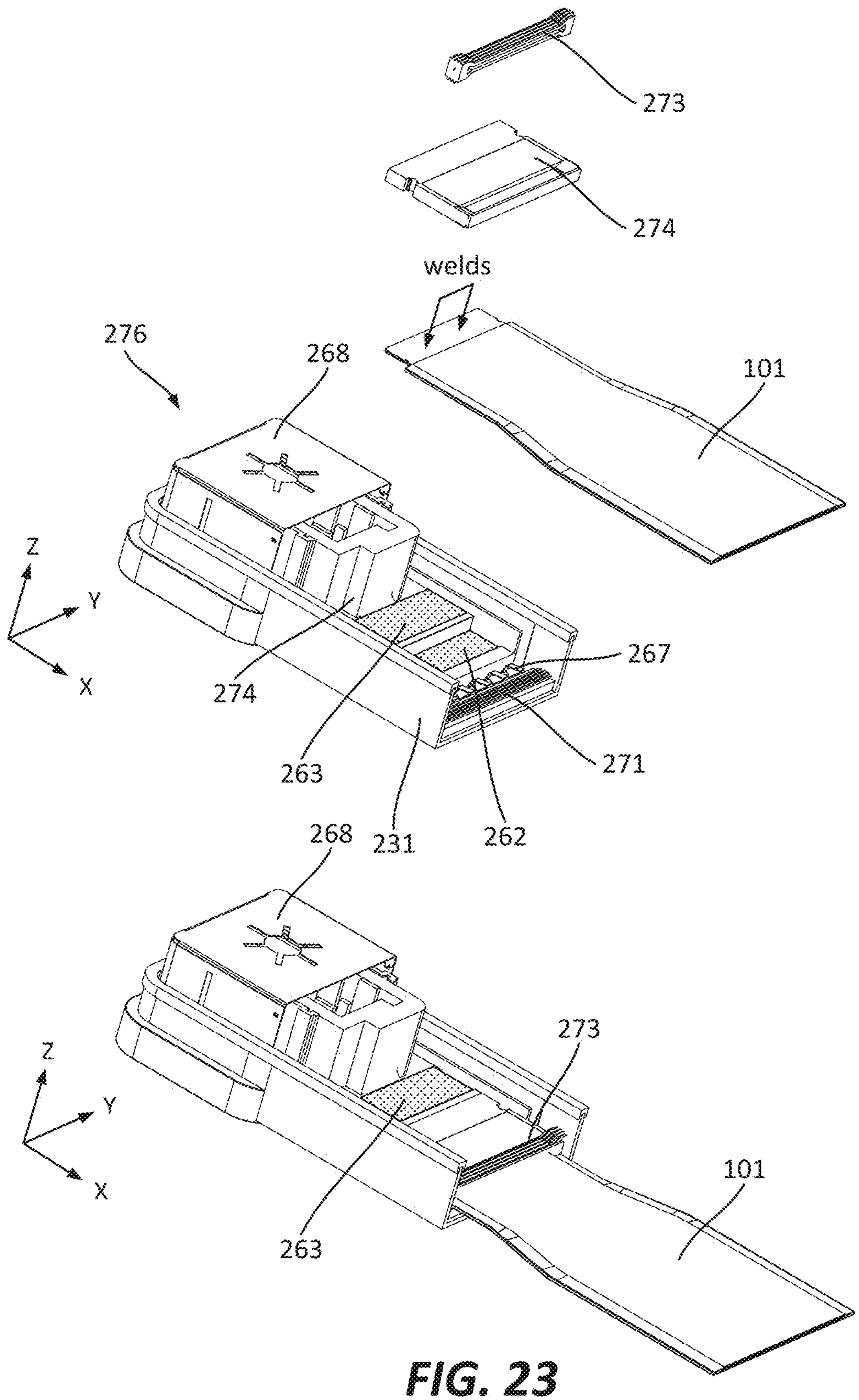
FIG. 23, FIG. 24, FIG. 25, FIG. 26A, and FIG. 27A are exploded views of contact units of flexible conductive assemblies, in accordance with some examples.
Figure 24:
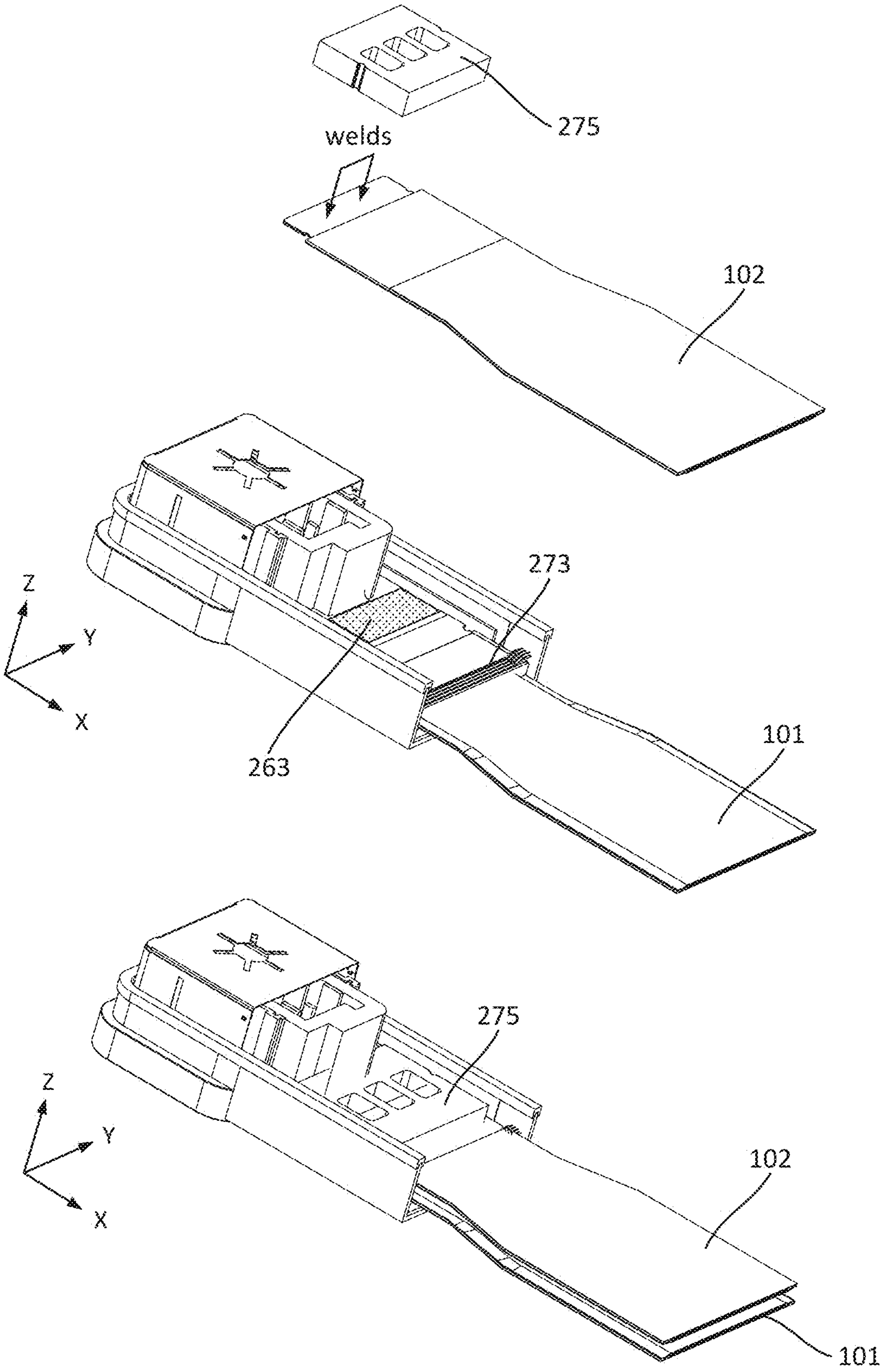
Figure 25:
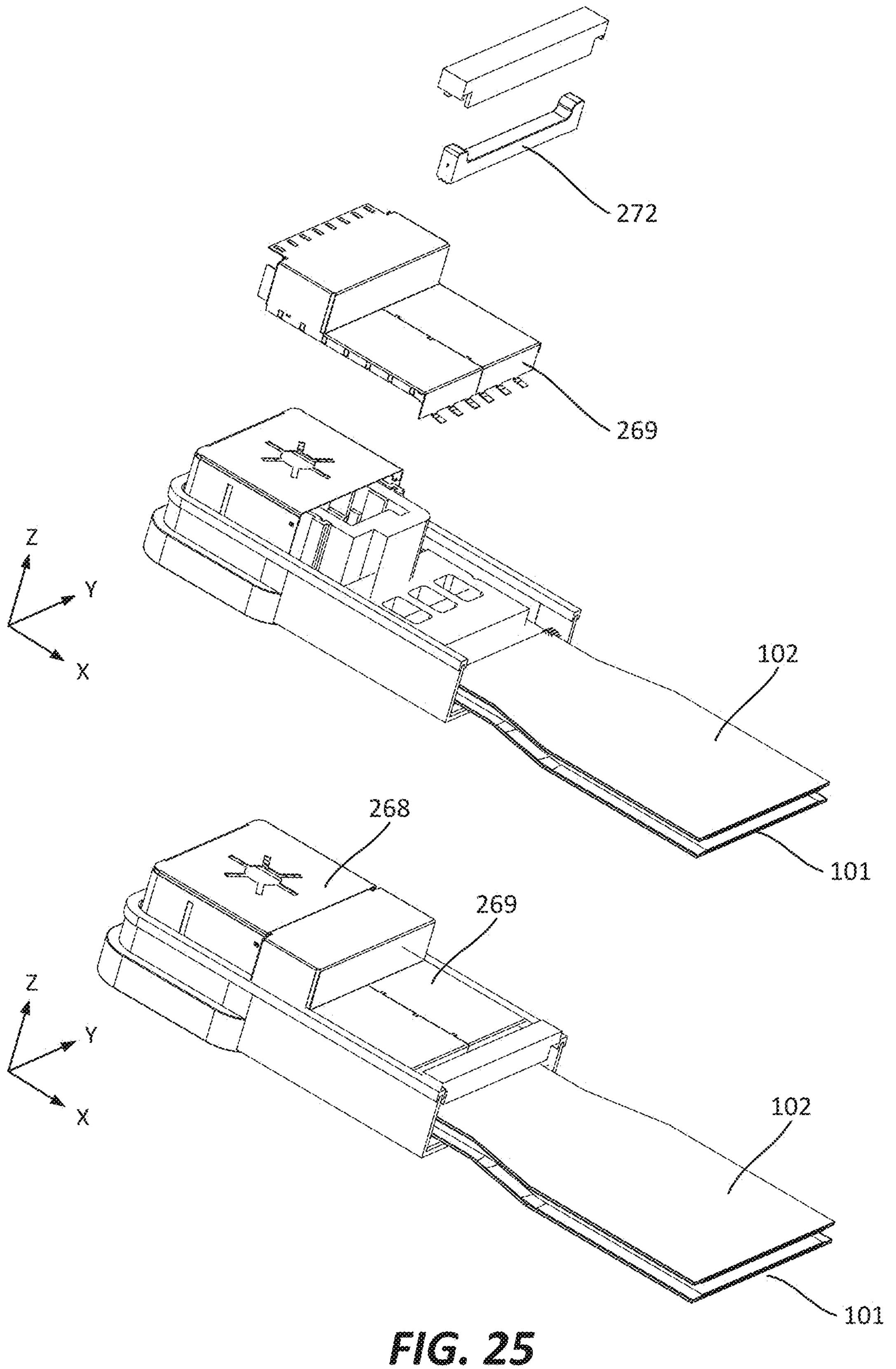
Figure 26A:
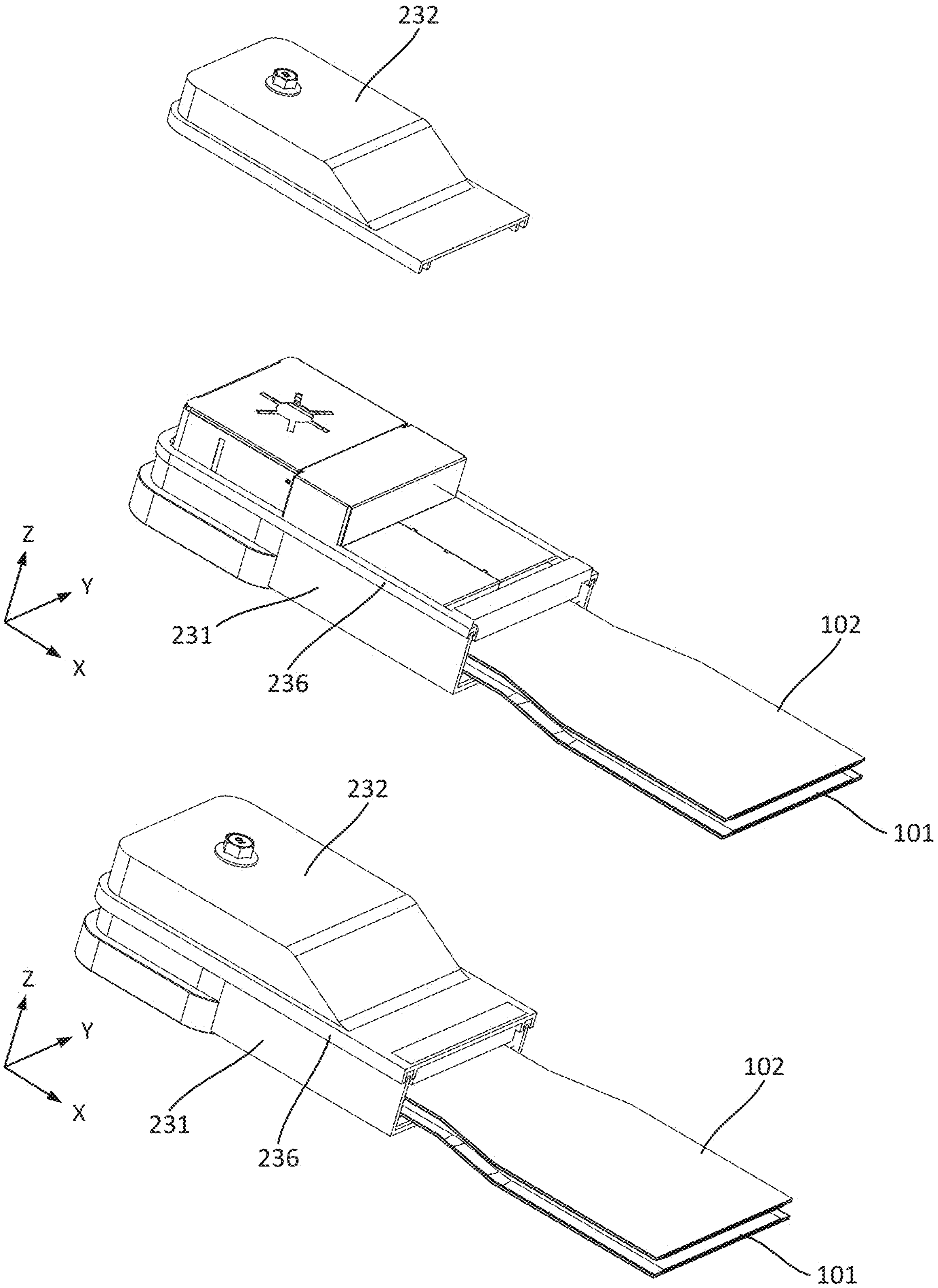
Figure 26B:
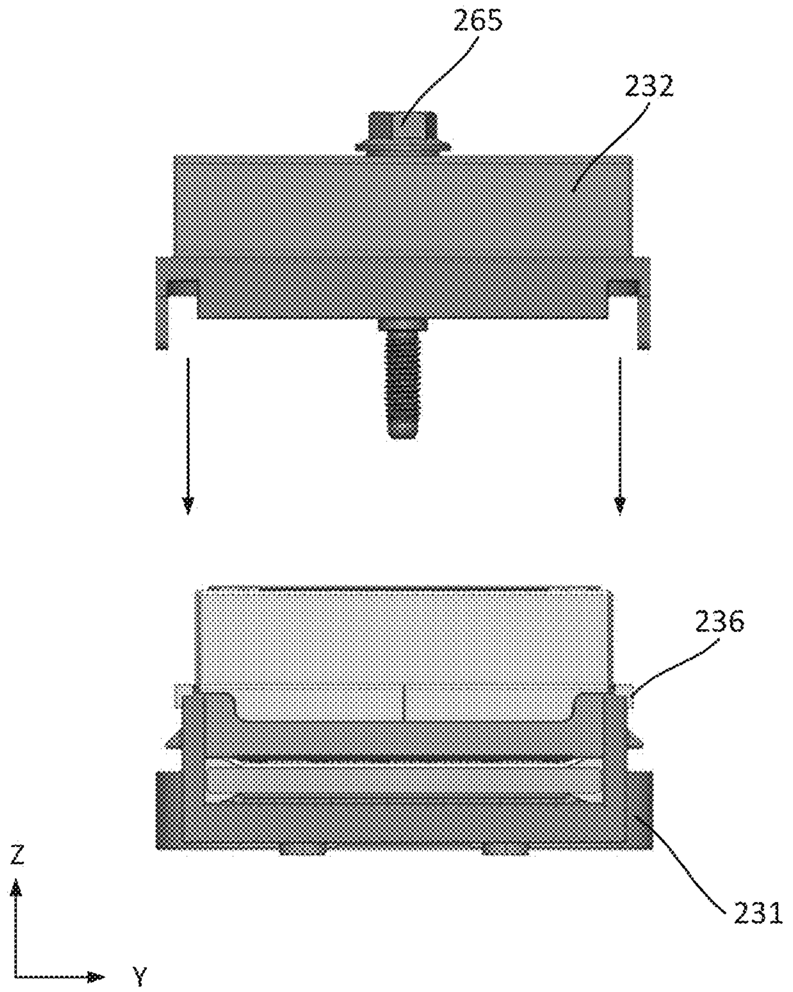
FIG. 26B is a side view of components of a contact unit of a flexible conductive assembly, in accordance with some examples.
Figure 27A:
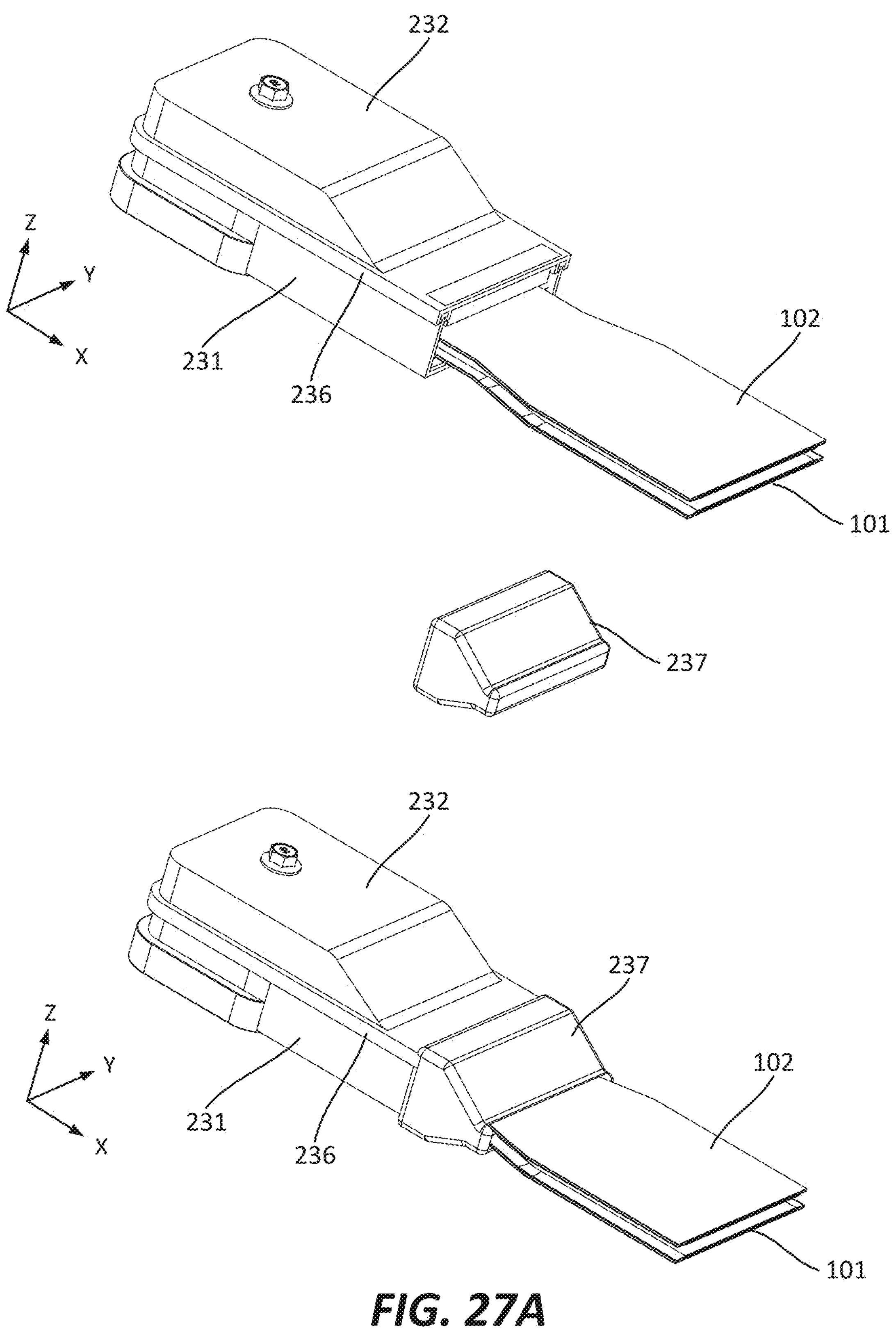

FIG. 22A is a schematic perspective view of a contact unit 261 of a flexible conductive assembly 290, in accordance with some examples. FIG. 22B is a schematic block diagram showing components of a contact unit 261 of a flexible conductive assembly 290, in accordance with some examples. FIG. 23, FIG. 24, FIG. 25, FIG. 26A, and FIG. 27A, are exploded views of contact units of flexible conductive assemblies, in accordance with some examples. FIG. 26B is a side view of components of a contact unit of a flexible conductive assembly, in accordance with some examples. FIG. 27B is a schematic perspective view showing a flexible conductive assembly in various steps of assembly, in accordance with some examples.

In some aspects, the techniques described herein relate to method 900, wherein the housing edge seal 236 is compressed along at least two axes when attaching the second housing portion 232 to the first housing portion 231.

In some aspects, the techniques described herein relate to method 900, wherein the first contact 262 and the second contact 263 are offset relative to each other along a primary axis (X-axis) of the flexible conductive assembly 290.

In some aspects, the techniques described herein relate to a method 900, wherein: the first contact 262 is positioned within a first plane; the second contact 263 is positioned within a second plane offset relative to the first plane.

In some aspects, the techniques described herein relate to method 900, wherein the first electromagnetic shield portion 267 includes a set of spring contacts directly interfacing and biasing against the circuit electromagnetic shield 160 of the first circuit portion 101.

In some aspects, the techniques described herein relate to method 900, wherein the connector subassembly 276 further includes a first seal portion 271 compressed between the first housing portion 231 and the first circuit portion 101 when the second housing portion 232 is attached to the first housing portion 231.

In some aspects, the techniques described herein relate to method 900, wherein: the first electromagnetic shield portion 267 extends at least in part between the first housing portion 231 and the first circuit portion 101 and directly interfaces with each of the first electromagnetic shield portion 267 and the third electromagnetic shield portion 269; the second electromagnetic shield portion 268 extends between the contact unit 261 and the second housing portion 232 and directly interfaces with the third electromagnetic shield portion 269.

In some aspects, the techniques described herein relate to method 900, further including, after welding the conductive layer 140 of the first circuit portion 101 to the first contact 262 and before positioning the second circuit portion 102, positioning a first spacer block 274 over the first circuit portion 101, wherein, after positioning the second circuit portion 102, the first spacer block 274 is positioned between the first circuit portion 101 and the second circuit portion 102.

In some aspects, the techniques described herein relate to method 900, further including, after positioning the first spacer block 274 and before positioning the second circuit portion 102, positioning a middle circuit seal portion 273 over the first spacer block 274, wherein after positioning the second circuit portion 102, the middle circuit seal portion 273 is positioned between the first spacer block 274 and the second circuit portion 102.

In some aspects, the techniques described herein relate to method 900, wherein: the first spacer block 274 includes a seal retention opening, and the middle circuit seal portion 273 is positioned into the seal retention opening of the first spacer block 274.

In some aspects, the techniques described herein relate to method 900, wherein: the first spacer block 274 includes a first set of first-spacer locating features, and the first housing portion 231 includes a second set of first-spacer locating features, engaging the first set of first-spacer locating features when the first spacer block 274 is positioned over the first circuit portion 101 thereby restricting the movement of the first spacer block 274 relative to the first housing portion 231 to one axis.

In some aspects, the techniques described herein relate to method 900, further including, after welding the conductive layer 140 of the second circuit portion 102 and before positioning the third electromagnetic shield portion 269, positioning a second spacer block 275 over the second circuit portion 102, wherein, after positioning the third electromagnetic shield portion 269, the second spacer block 275 is positioned between the second circuit portion 102 and the third electromagnetic shield portion 269.

In some aspects, the techniques described herein relate to method 900, wherein: the second spacer block 275 includes a first set of second-spacer locating features, and the first housing portion 231 includes a second set of second-spacer locating features, engaging the first set of second-spacer locating features when the second spacer block 275 is positioned over the second circuit portion 102 thereby restricting the movement of the second spacer block 275 relative to the first housing portion 231 to one axis.

In some aspects, the techniques described herein relate to method 900, further including, after positioning the third electromagnetic shield portion 269 and before positioning the second housing portion 232, positioning a second seal portion 272 over the second circuit portion 102 such that the second seal portion 272 is compressed between the second circuit portion 102 and the second housing portion 232.

In some aspects, the techniques described herein relate to method 900, wherein attaching the second housing portion 232 to the first housing portion 231 includes interlocking the first housing portion 231 and the second housing portion 232.

In some aspects, the techniques described herein relate to method 900, wherein each of the first housing portion 231 and the second housing portion 232 includes interlocking latches.

In some aspects, the techniques described herein relate to method 900, wherein: one of the first housing portion 231 and the second housing portion 232 includes a set of barbed dowl pins, and another one of the first housing portion 231 and the second housing portion 232 includes a set of opening receiving the set of barbed dowl pins while attaching the second housing portion 232 to the first housing portion 231 and interlocking the first housing portion 231 and the second housing portion 232.

In some aspects, the techniques described herein relate to method 900, further including, after attaching the second housing portion 232 to the first housing portion 231, installing a compression seal 237 to surround the first housing portion 231, the second housing portion 232, the first circuit portion 101, and the second circuit portion 102.

In some aspects, the techniques described herein relate to method 900, wherein installing the compression seal 237 includes hot melting or, more specifically, hot melting.

In some aspects, the techniques described herein relate to method 900, wherein the compression seal 237 includes multiple components that are assembled into the compression seal 237 while installing the compression seal 237.

Figure 33:
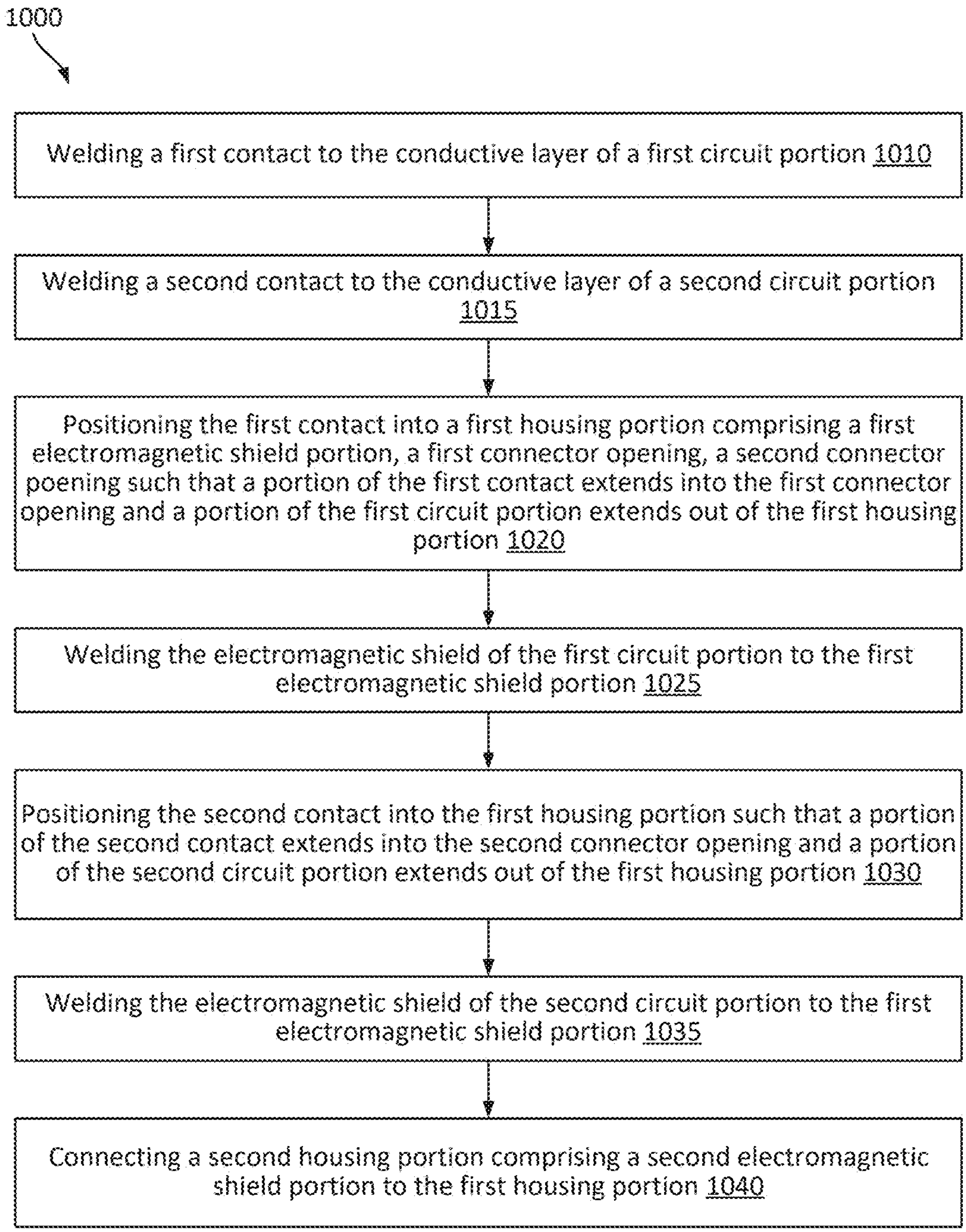
FIG. 33 is a process flowchart corresponding to a method of forming a flexible conductive assembly, in accordance with some examples.

FIG. 33 is a process flowchart corresponding to method 1000 of forming a 290, in accordance with some examples. Various examples of the flexible conductive assembly 290 are described above.

Referring to FIG. 33, method 1000 may comprise (block 1010) welding a first contact 262 to a first conductive layer 140 of a first circuit portion 101. The first circuit portion 101 comprises an electromagnetic shield 160, a first insulating layer 110, a second insulating layer 120, a third insulating layer 130, and a second conductive layer 150, all stacked along stacking axis 109.

Referring to FIG. 33, method 1000 may comprise (block 1015) welding a second contact 263 to the first conductive layer 140 of a second circuit portion 102. The second circuit portion 102 comprises an electromagnetic shield 160, a first insulating layer 110, a second insulating layer 120, a third insulating layer 130, and a second conductive layer 150, all stacked along stacking axis 109. In some examples, the first contact 262 may be welded to a first conductive layer 140 of a first circuit portion 101 before the second contact 263 is welded to the first conductive layer 140 of a second circuit portion 102. In other examples, the 263/may be welded to the first conductive layer 140 of a second circuit portion 102 before the first contact 262 is welded to the first conductive layer 140 of a first circuit portion 101.

Referring to FIG. 33, method 1000 may comprise (block 1020) positioning the first contact 262 within a first housing portion 231 having a first electromagnetic shield portion 267, a first connector opening 715, and a second connector opening 716. A portion of the first contact extends into the first connector opening 715, while part of the circuit portion extends outward.

Referring to FIG. 33, method 1000 may comprise (block 1025) welding the electromagnetic shield 160 of the first circuit portion 101 to the first electromagnetic shield portion 267.

Referring to FIG. 33, method 1000 may comprise (block 1030) positioning the second contact 263 within the first housing portion 231, with part of the contact extending into the second connector opening 716.

Referring to FIG. 33, method 1000 may comprise (block 1035) welding the shield of the second circuit portion 102 to the first electromagnetic shield portion 267.

Referring to FIG. 33, method 1000 may comprise (block 1040) attaching a housing portion 232 comprising a second electromagnetic shield portion 268 to the first housing portion 231, such that the second shield portion 268 is positioned between the circuit portion and the housing and electrically contacts the first shield portion 267.

This method provides a structured assembly process ensuring electrical integrity and environmental sealing. By welding the shield wings to shield portions of the housing, continuity of EMI protection is maintained.

In some examples, the electromagnetic shield 160 comprises a shield wing 740 protruding from between the second insulating layer 120 and the third insulating layer 130. The first electromagnetic shield portion 267 comprises a weld tab 745. Welding may be performed to connect the shield wing 740 and the weld tab 745. This feature ensures a reliable mechanical and electrical joint between internal shield layers and shield structures of the housing. Alternative methods of attachment may include riveting, swaging, or conductive adhesives.

In some examples, the first housing portion 231 comprises connector alignment protrusions 730. Both the first contact 262 and the second contact 263 comprise connector alignment notches 735. During assembly, the protrusions extend through the notches, restricting movement of the contacts relative to the housing along all but one axis. This ensures precise positioning of contacts, preventing rotational or lateral displacement that could compromise electrical connection or sealing. Alternatives may use keyed slots or asymmetrical profiles to achieve the same effect.

In some examples, the housing 230 further comprises a cover seal 770. Attaching the second housing portion 232 to the first housing portion 231 comprises compressing the cover seal 770 between them. This creates a robust environmental barrier against ingress of water, dust, or chemical contaminants. Alternatives include using O-rings or molded-in-place elastomer gaskets.

In some examples, before attaching the second housing portion 232, a blocker 750 is positioned between the first circuit portion 101 and the second circuit portion 102, and between the housing portions 231 and 232. Examples of blockers have been described above. The blocker 750 prevents sealant flow into conductor regions during formation of the wire seal 790, maintaining creepage and clearance distances.

In some examples, the first housing portion 231, the second housing portion 232, and the blocker 750 each comprise a set of ribs. Attaching the housing portions together compresses these ribs against the circuit portions 101 and 102. The ribs distribute compressive force and create mechanical strain relief at the circuit-housing interface.

In some examples, the first contact 262 and the second contact 263 are offset relative to each other along the primary axis (X-axis) of the flexible conductive assembly 290. Offsetting contacts reduces the risk of arcing and allows more compact packaging in the connector housing.

In some examples, after positioning the first contact 262 in the housing portion 231, a first terminal position assurance (TPA) device 720 is placed over the first contact and coupled with the housing. After positioning the second contact 263, the first terminal position assurance (TPA) device 720 is located between the first contact 262 and the second circuit portion 102. In some examples, after positioning the second contact 263 and before attaching the second housing portion 232, a second terminal position assurance (TPA) device 725 is placed over the second contact 263 and coupled with the housing portion 231. In some examples, the terminal position assurance (TPA) devices are configured to prevent their insertion into the first housing portion 231 if the adjacent connector is not correctly installed. After assembly, the second terminal position assurance (TPA) device 725 is positioned between the second contact 263 and the second electromagnetic shield portion 268. The second terminal position assurance (TPA) devices provide redundancy in contact security, ensure the contact is correctly seated, and add retention strength against dislodgement.

In some examples, attaching the second housing portion 232 to the first housing portion 231 includes interlocking the two portions. This interlocking design simplifies assembly while ensuring robust mechanical coupling. In some examples, the first housing portion 231 comprises latch protrusions, and the second housing portion 232 comprises a latch. The latch interlocks with the protrusions. This latch system provides a repeatable and serviceable closure mechanism. Variations may use cantilevered arms, tongue-and-groove locks, or metallic fasteners, depending on application requirements.

Conclusion

Although the foregoing concepts have been described in some detail for purposes of clarity of understanding, it will be apparent that certain changes and modifications may be practiced within the scope of the appended claims. It should be noted that there are many alternative ways of implementing processes, systems, and apparatuses. Accordingly, the present embodiments are to be considered illustrative and not restrictive.

The invention claimed is:

1. A flexible conductive assembly comprising:

a flexible shielded high-current circuit comprising a first circuit portion and a second circuit portion, wherein each of the first circuit portion and the second circuit portion comprises a first conductive layer, which is a metal sheet, a circuit electromagnetic shield, a first contact mechanically and electrically coupled to the first conductive layer of the first circuit portion, and a second contact mechanically and electrically coupled to the first conductive layer of the second circuit portion; and a connector comprising a housing comprising a first housing portion, a first electromagnetic shield portion, and a wire seal, wherein:

the first electromagnetic shield portion is electrically coupled to the circuit electromagnetic shield of each of the first circuit portion and the second circuit portion and at least partially surrounds the first contact and the second contact, and each of the first circuit portion and the second circuit portion at least partially protrudes into the housing and is sealed, relative to the housing, by the wire seal.

2. The flexible conductive assembly of claim 1, wherein:

each of the first circuit portion and the second circuit portion further comprises a first insulating layer, a second insulating layer, a third insulating layer, and a second conductive layer, the first insulating layer, the first conductive layer, the second conductive layer, the second insulating layer, the electromagnetic shield, and the third insulating layer are stacked along a stacking axis, the first conductive layer and the second conductive layer directly interface and form a stack positioned between the first insulating layer and the second insulating layer, and the electromagnetic shield is positioned between the second insulating layer and the third insulating layer and is configured to block electromagnetic emissions produced by the stack while transmitting an electric current.

3. The flexible conductive assembly of claim 2, wherein the stack is configured to transmit an electric current of more than 400 Amperes.

4. The flexible conductive assembly of claim 2, wherein each of the first conductive layer and the second conductive layer comprises aluminum.

5. The flexible conductive assembly of claim 2, wherein each of the first conductive layer and the second conductive layer has a thickness, measured along the stacking axis, of at least 400 micrometers.

6. The flexible conductive assembly of claim 2, wherein the first conductive layer and the second conductive layer have the same thickness.

7. The flexible conductive assembly of claim 2, wherein each of the first insulating layer and the second insulating layer comprises polypropylene (PP).

8. The flexible conductive assembly of claim 7, wherein each of the first insulating layer and the second insulating layer further comprises polyethylene (PE) such that the polypropylene (PP) forms a first sublayer while the polyethylene (PE) forms a second sublayer directly interfacing the first sublayer.

9. The flexible conductive assembly of claim 2, wherein the electromagnetic shield is a metal sheet having a thickness, measured along the stacking axis, of 20-150 micrometers.

10. The flexible conductive assembly of claim 2, wherein the electromagnetic shield of the first circuit portion is mechanically and electrically coupled with the first electromagnetic shield portion.

11. The flexible conductive assembly of claim 1, wherein at least a portion of the first contact extends away from the first circuit portion in a direction perpendicular to a plane parallel with a portion of the first circuit portion.

12. The flexible conductive assembly of claim 1, wherein each of the first contact and the second contact is formed from copper.

13. The flexible conductive assembly of claim 1, wherein:

the connector further comprises a blocker positioned between the first contact and the wire seal, the first contact is welded to the first conductive layer of the first circuit portion of the flexible shielded high-current circuit, and the second contact is welded to the first conductive layer of the second circuit portion of the flexible shielded high-current circuit.

14. The flexible conductive assembly of claim 1, wherein the housing comprises a first housing portion and a second housing portion removably attached to each other and enclosing the first contact, the second contact, the first electromagnetic shield portion, and a portion of each of the first circuit portion and the second circuit portion extending into the connector.

15. The flexible conductive assembly of claim 14, wherein the housing further comprises a circuit seal enclosing a portion of each of the first housing portion, the second housing portion, the first circuit portion, and the second circuit portion.

16. The flexible conductive assembly of claim 15, wherein:

the circuit seal comprises a blocker and a wire seal, and a portion of the blocker is positioned between the first circuit portion and the second circuit portion and a portion of the blocker extends from the first housing portion to the second housing portion.

17. The flexible conductive assembly of claim 16, wherein the first housing portion, the second housing portion, and blocker each comprise a set of ribs interfacing and compressed against the first circuit portion or the second circuit portion.

18. The flexible conductive assembly of claim 1, wherein:

the first housing portion comprises connector alignment protrusions, the first contact comprises connector alignment notches, and the connector alignment protrusions protrude into a volume defined by the connector alignment notches.

19. The flexible conductive assembly of claim 1, wherein the flexible conductive assembly further comprises a first terminal position assurance (TPA) device positioned between the first contact and the second circuit portion and mechanically coupled with the first housing portion, thereby securing the first contact to the first housing portion.

20. A method of forming a flexible conductive assembly comprising a flexible shielded high-current circuit, the method comprising:

welding a first contact to a first conductive layer of a first circuit portion comprising an electromagnetic shield, a first insulating layer, a second insulating layer a third insulating layer, and a second conductive layer, wherein the first insulating layer, the first conductive layer, the second conductive layer, the second insulating layer, the electromagnetic shield, and the third insulating layer are stacked along a stacking axis;

welding a second contact to a first conductive layer of a second circuit portion comprising an electromagnetic shield, a first insulating layer, a second insulating layer, a third insulating layer and a second conductive layer, wherein the first insulating layer, the first conductive layer, the second conductive layer, the second insulating layer, the electromagnetic shield, and the third insulating layer are stacked along a stacking axis;

positioning the first contact within a first housing portion comprising a first electromagnetic shield portion, a first connector opening, and a second connector opening such that a portion of the first contact extends into the first connector opening and a portion of the first circuit portion extends out of the first housing portion;

welding the electromagnetic shield of the first circuit portion to the first electromagnetic shield portion;

positioning the second contact within the first housing portion such that a portion of the second contact extends into the second connector opening and a portion of the second circuit portion extends out of the first housing portion;

welding the electromagnetic shield of the second circuit portion to the first electromagnetic shield portion; and attaching a second housing portion comprising a second electromagnetic shield portion with first housing portion such that the second electromagnetic shield portion is positioned between a portion of the second circuit portion and the second housing portion and the second electromagnetic shield portion electrically contacts the first electromagnetic shield portion.

* * * * *